(12) United States Patent
Saito

(10) Patent No.: US 10,689,576 B2
(45) Date of Patent: *Jun. 23, 2020

(54) LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventor: Masayuki Saito, Chiba (JP)

(73) Assignees: JNC CORPORATION, Tokyo (JP); JNC PETROCHEMICAL CORPORATION, Tokyo (JP)

(*) Notice: Subject to any disclaimer, the term of this patent is extended or adjusted under 35 U.S.C. 154(b) by 76 days.

This patent is subject to a terminal disclaimer.

(21) Appl. No.: 15/745,996

(22) PCT Filed: Jun. 20, 2016

(86) PCT No.: PCT/JP2016/068221
§ 371 (c)(1),
(2) Date: Jan. 19, 2018

(87) PCT Pub. No.: WO2017/013981
PCT Pub. Date: Jan. 26, 2017

(65) Prior Publication Data
US 2018/0208849 A1    Jul. 26, 2018

(30) Foreign Application Priority Data
Jul. 23, 2015  (JP) ................. 2015-145455

(51) Int. Cl.
| | | |
|---|---|---|
| *G02F 1/1333* | (2006.01) | |
| *C09K 19/54* | (2006.01) | |
| *G02F 1/137* | (2006.01) | |
| *C09K 19/42* | (2006.01) | |
| *G02F 1/13* | (2006.01) | |
| *C09K 19/38* | (2006.01) | |
| *C09K 19/32* | (2006.01) | |
| *C09K 19/34* | (2006.01) | |

(Continued)

(52) U.S. Cl.
CPC .......... *C09K 19/542* (2013.01); *C09K 19/12* (2013.01); *C09K 19/14* (2013.01); *C09K 19/20* (2013.01); *C09K 19/30* (2013.01); *C09K 19/3003* (2013.01); *C09K 19/3066* (2013.01); *C09K 19/32* (2013.01); *C09K 19/34* (2013.01); *C09K 19/3402* (2013.01); *C09K 19/38* (2013.01); *C09K 19/42* (2013.01); *C09K 19/54* (2013.01); *G02F 1/13* (2013.01); *G02F 1/137* (2013.01); *G02F 1/1337* (2013.01); *C09K 2019/301* (2013.01); *C09K 2019/3004* (2013.01); *C09K 2019/3009* (2013.01); *C09K 2019/3422* (2013.01); *C09K 2019/3425* (2013.01); *C09K 2019/548* (2013.01); *G02F 2001/13712* (2013.01); *G02F 2001/13775* (2013.01)

(58) Field of Classification Search
CPC ...... C09K 19/542; C09K 19/12; C09K 19/14; C09K 19/20; C09K 19/30; C09K 19/3003; C09K 19/3066; C09K 19/32; C09K 19/34; C09K 19/3402; C09K 19/38; C09K 19/42; C09K 19/54; C09K 2019/3004; C09K 2019/3009; C09K 2019/301; C09K 2019/3422; C09K 2019/3425; C09K 2019/548; G02F 1/13; G02F 1/137; G02F 1/1333; G02F 1/1337; G02F 2001/13712; G02F 2001/13775
USPC ..................................................... 252/299.5
See application file for complete search history.

(56) References Cited

U.S. PATENT DOCUMENTS 10,385,269 B2 * 8/2019 Saito ............... C09K 19/3001
2013/0182202 A1   7/2013 Graziano et al.
(Continued)

FOREIGN PATENT DOCUMENTS

| JP | S50-35076 | 4/1975 |
|---|---|---|
| JP | 2014524951 | 9/2014 |

(Continued)

OTHER PUBLICATIONS

"International Search Report (Form PCT/ISA/210) of PCT/JP2016/068221", dated Sep. 20, 2016, with English translation thereof, pp. 1-5.

(Continued)

*Primary Examiner* — Geraldina Visconti
(74) *Attorney, Agent, or Firm* — JCIPRNET

(57) ABSTRACT

Provided are a liquid crystal composition that contains a polar compound having a polymerizable group, in which vertical alignment of liquid crystal molecules can be achieved by action of the compound (or polymer), and a liquid crystal display device including the composition. The composition satisfies at least one of characteristics such as high maximum temperature, low minimum temperature, small viscosity, suitable optical anisotropy, large negative dielectric anisotropy, large specific resistance, high stability to ultraviolet light and heat.
The composition is a nematic liquid crystal composition that has negative dielectric anisotropy and contains the polar compound as a first additive, and may contain a specific liquid crystal compound having large negative dielectric anisotropy as a first component, a specific liquid crystal compound having high maximum temperature or small viscosity as a second component and a polymerizable compound as a second additive, and the liquid crystal display device includes the composition.

20 Claims, No Drawings

(51) Int. Cl.
   *C09K 19/30* (2006.01)
   *C09K 19/12* (2006.01)
   *G02F 1/1337* (2006.01)
   *C09K 19/14* (2006.01)
   *C09K 19/20* (2006.01)

(56) References Cited

U.S. PATENT DOCUMENTS

| | | | |
|---|---|---|---|
| 2013/0314655 A1 | 11/2013 | Archetti et al. | |
| 2015/0252265 A1 | 9/2015 | Archetti et al. | |
| 2017/0174993 A1* | 6/2017 | Saito | C09K 19/20 |
| 2018/0023001 A1* | 1/2018 | Tanaka | C07C 69/54 |
| | | | 252/299.4 |
| 2018/0057747 A1* | 3/2018 | Matsuda | C08F 2/44 |
| 2018/0355249 A1* | 12/2018 | Saito | C09K 19/12 |

FOREIGN PATENT DOCUMENTS

| | | |
|---|---|---|
| JP | 2015168826 | 9/2015 |
| WO | 2009019656 | 2/2009 |
| WO | 2012038026 | 3/2012 |
| WO | 2012104008 | 8/2012 |
| WO | 2013004372 | 1/2013 |
| WO | 2014090362 | 6/2014 |
| WO | 2014094959 | 6/2014 |
| WO | 2016015803 | 2/2016 |
| WO | 2016114093 | 7/2016 |

OTHER PUBLICATIONS

"Search Report of Europe Counterpart Application", dated Jan. 28, 2019, p. 1-p. 6.
"Office Action of Taiwan Counterpart Application," with English translation thereof, dated Nov. 14, 2019, p. 1-p. 11.

* cited by examiner

LIQUID CRYSTAL COMPOSITION AND LIQUID CRYSTAL DISPLAY DEVICE

CROSS-REFERENCE TO RELATED APPLICATION

This application is a 371 application of International PCT application serial no. PCT/JP2016/068221, filed on Jun. 20, 2016, which claims the priority benefit of Japan application no. 2015-145455, filed on Jul. 23, 2015. The entirety of each of the abovementioned patent applications is hereby incorporated by reference herein and made a part of this specification.

TECHNICAL FIELD

The invention relates to a liquid crystal composition, a liquid crystal display device including the composition, and so forth. In particular, the invention relates to a liquid crystal composition that has negative dielectric anisotropy, contains a polar compound (or a polymer thereof) having a polymerizable group, in which vertical alignment of liquid crystal molecules can be achieved by action of the compound, and a liquid crystal display device.

BACKGROUND ART

In a liquid crystal display device, a classification based on an operating mode for liquid crystal molecules includes a phase change (PC) mode, a twisted nematic (TN) mode, a super twisted nematic (STN) mode, an electrically controlled birefringence (ECB) mode, an optically compensated bend (OCB) mode, an in-plane switching (IPS) mode, a vertical alignment (VA) mode, a fringe field switching (FFS) mode and a field-induced photo-reactive alignment (FPA) mode. A classification based on a driving mode in the device includes a passive matrix (PM) and an active matrix (AM). The PM is classified into static, multiplex and so forth, and the AM is classified into a thin film transistor (TFT), a metal insulator metal (MIM) and so forth. The TFT is further classified into amorphous silicon and polycrystal silicon. The latter is classified into a high temperature type and a low temperature type based on a production process. A classification based on a light source includes a reflective type utilizing natural light, a transmissive type utilizing backlight and a transflective type utilizing both the natural light and the backlight.

The liquid crystal display device includes a liquid crystal composition having a nematic phase. The composition has suitable characteristics. An AM device having good characteristics can be obtained by improving characteristics of the composition. Table 1 below summarizes a relationship in characteristics therebetween. The characteristics of the composition will be further described based on a commercially available AM device. A temperature range of the nematic phase relates to a temperature range in which the device can be used. A preferred maximum temperature of the nematic phase is about 70° C. or higher, and a preferred minimum temperature of the nematic phase is about −10° C. or lower. Viscosity of the composition relates to a response time in the device. A short response time is preferred for displaying moving images on the device. A shorter response time even by one millisecond is desirable. Accordingly, a small viscosity in the composition is preferred. A small viscosity at low temperature is further preferred.

TABLE 1

Characteristics of Composition and AM Device

| No. | Characteristics of Composition | Characteristics of AM Device |
|---|---|---|
| 1 | Wide temperature range of a nematic phase | Wide device-usable temperature range |
| 2 | Small viscosity | Short response time |
| 3 | Suitable optical anisotropy | Large contrast ratio |
| 4 | Large positive or negative dielectric anisotropy | Low threshold voltage and small electric power consumption Large contrast ratio |
| 5 | Large specific resistance | Large voltage holding ratio and large contrast ratio |
| 6 | High stability to ultraviolet light and heat | Long service life |

Optical anisotropy of the composition relates to a contrast ratio in the device. According to a mode of the device, large optical anisotropy or small optical anisotropy, more specifically, suitable optical anisotropy is required. A product (Δn×d) of the optical anisotropy (Δn) of the composition and a cell gap (d) in the device is designed so as to maximize the contrast ratio. A suitable value of the product depends on a type of the operating mode. In a device having the VA mode, the value is in the range of about 0.30 micrometer to about 0.40 micrometer, and in a device having the IPS mode or the FFS mode, the value is in the range of about 0.20 micrometer to about 0.30 micrometer. In the above case, a composition having large optical anisotropy is preferred for a device having a small cell gap. Large dielectric anisotropy in the composition contributes to low threshold voltage, small electric power consumption and a large contrast ratio in the device. Accordingly, the large dielectric anisotropy is preferred. Large specific resistance in the composition contributes to a large voltage holding ratio and the large contrast ratio in the device. Accordingly, a composition having the large specific resistance at room temperature and also at a temperature close to the maximum temperature of the nematic phase in an initial stage is preferred. The composition having the large specific resistance at room temperature and also at a temperature close to the maximum temperature of the nematic phase even after the device has been used for a long period of time is preferred. Stability of the composition to ultraviolet light and heat relates to a service life of the device. In the case where the stability is high, the device has a long service life. Such characteristics are preferred for an AM device for use in a liquid crystal projector, a liquid crystal television and so forth.

In a general-purpose liquid crystal display device, vertical alignment of liquid crystal molecules is achieved by a specific polyimide alignment film. In a liquid crystal display device having a polymer sustained alignment (PSA) mode, a polymer is combined with the alignment film. First, a composition to which a small amount of a polymerizable compound is added is injected into the device. Next, the composition is irradiated with ultraviolet light while voltage is applied between substrates of the device. The polymerizable compound is polymerized to form a network structure of the polymer in the composition. In the composition, alignment of the liquid crystal molecules can be controlled by the polymer, and therefore the response time in the device is shortened and also image persistence is improved. Such an effect of the polymer can be expected for a device having the mode such as the TN mode, the ECB mode, the OCB mode, the IPS mode, the VA mode, the FFS mode and the FPA mode.

On the other hand, in a liquid crystal display device having no alignment film, a liquid crystal composition containing a polar compound having no polymer and no polymerizable group is used. First, a composition to which a small amount of a polymerizable compound and a small amount of a polar compound are added is injected into the device. Here, the polar compound is adsorbed onto a substrate surface to be arranged. Liquid crystal molecules are aligned according to the arrangement. Next, the composition is irradiated with ultraviolet light while voltage is applied between substrates of the device. Here, the polymerizable compound is polymerized to stabilize alignment of the liquid crystal molecules. In the composition, alignment of the liquid crystal molecules can be controlled by the polymer and the polar compound, and therefore the response time in the device is shortened and also image persistence is improved. Further, in the device having no alignment film, a step of forming an alignment film is unnecessary. The device has no alignment film, and therefore electric resistance of the device is not decreased by interaction between the alignment film and the composition. Such an effect due to a combination of the polymer and the polar compound can be expected for a device having the mode such as the TN mode, the ECB mode, the OCB mode, the IPS mode, the VA mode, the FFS mode and the FPA mode.

A composition having positive dielectric anisotropy is used in an AM device having the TN mode. A composition having negative dielectric anisotropy is used in an AM device having the VA mode. In an AM device having the IPS mode or the FFS mode, a composition having positive or negative dielectric anisotropy is used. In an AM device having a polymer sustained alignment mode, a composition having positive or negative dielectric anisotropy is used. Examples of a liquid crystal composition having negative dielectric anisotropy are disclosed in Patent literature Nos. 1 to 6 described below. In the invention, in place of the polymer and the polar compound, a polar compound having a polymerizable group is combined with a liquid crystal compound, and the resulting composition is used in the liquid crystal display device having no alignment film.

CITATION LIST

Patent Literature

Patent literature No. 1: WO 2014/090362 A.
Patent literature No. 2: WO 2014/094959 A.
Patent literature No. 3: WO 2013/004372 A.
Patent literature No. 4: WO 2012/104008 A.
Patent literature No. 5: WO 2012/038026 A.
Patent literature No. 6: JP S50-35076 A.

SUMMARY OF INVENTION

Technical Problem

One of aims of the invention is to provide a liquid crystal composition containing a polar compound (or a polymer thereof) having a polymerizable group, in which the polar compound has high compatibility with a liquid crystal compound. Another aim is to provide a liquid crystal composition in which vertical alignment of liquid crystal molecules can be achieved by action of a polymer generated from the polar compound. Another aim is to provide a liquid crystal composition satisfying at least one of characteristics such as high maximum temperature of a nematic phase, low minimum temperature of the nematic phase, small viscosity, suitable optical anisotropy, large negative dielectric anisotropy, large specific resistance, high stability to ultraviolet light and high stability to heat. Another aim is to provide a liquid crystal composition having a suitable balance regarding at least two of the characteristics. Another aim is to provide a liquid crystal display device including such a composition. Another aim is to provide an AM device having characteristics such as a short response time, a large voltage holding ratio, low threshold voltage, a large contrast ratio and a long service life.

Solution to Problem

The invention concerns a liquid crystal composition that has negative dielectric anisotropy, and contains at least one compound selected from the group of polar compounds represented by formula (1) as a first additive, and a liquid crystal display device including the composition:

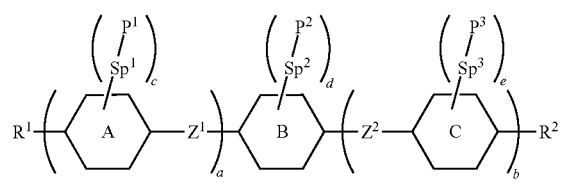

(1)

wherein, in formula (1), $R^1$ is hydrogen, fluorine, chlorine or alkyl having 1 to 25 carbons, and in the alkyl, at least one piece of —$CH_2$— may be replaced by —$NR^0$—, —O—, —S—, —CO—, —CO—O—, —O—CO—, —O—CO—O— or cycloalkylene having 3 to 8 carbons, and at least one tertiary carbon (>CH—) may be replaced by nitrogen (>N—), and in the groups, at least one hydrogen may be replaced by fluorine or chlorine, in which $R^0$ is hydrogen or alkyl having 1 to 12 carbons; $R^2$ is a polar a group having at least one of an oxygen atom having an OH structure, a sulfur atom having an SH structure and a nitrogen atom having a primary, secondary or tertiary amine structure; ring A, ring B and ring C are independently 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine; $Z^1$ and $Z^2$ are independently a single bond or alkylene having 1 to 10 carbons, and in the alkylene, at least one piece of —$CH_2$— may be replaced by —O—, —CO—, —COO— or —OCO—, and at least one piece of —$CH_2$—$CH_2$— may be replaced by —CH=CH—, —C($CH_3$)=CH—, —CH=C($CH_3$)— or —C($CH_3$)=C($CH_3$)—, and in the groups, at least one hydrogen may be replaced by fluorine or chlorine; $P^1$, $P^2$ and $P^3$ are a polymerizable group; $Sp^1$, $Sp^2$ and $Sp^3$ are independently a single bond or alkylene having 1 to 10 carbons, and in the alkylene, at least one piece of —$CH_2$— may be replaced by —O—, —COO—, —OCO— or —OCOO—, and at least one piece of —$CH_2$—$CH_2$— may be replaced by —CH=CH— or —C≡C—, and in the groups, at least one hydrogen may be replaced by fluorine or chlorine; a and b are independently 0, 1, 2, 3 or 4, and a sum of a and b is 0, 1, 2, 3 or 4; and c and e are independently 0, 1, 2, 3 or 4, and d is 1, 2, 3 or 4.

Advantageous Effects of Invention

One of advantages of the invention is to provide a liquid crystal composition containing a polar compound (or a polymer thereof) having a polymerizable group, in which the polar compound has high compatibility with a liquid crystal compound. Another advantage is to provide a liquid crystal composition that can achieve vertical alignment of liquid crystal molecules by action of a polymer generated from the polar compound. Another advantage is to provide a liquid crystal composition satisfying at least one of characteristics such as high maximum temperature of a nematic phase, low minimum temperature of the nematic phase, small viscosity, suitable optical anisotropy, large negative dielectric anisotropy, large specific resistance, high stability to ultraviolet light and high stability to heat. Another advantage is to provide a liquid crystal composition having a suitable balance regarding at least two of the characteristics. Another advantage is to provide a liquid crystal display device including such a composition. Another advantage is to provide an AM device having characteristics such as a short response time, a large voltage holding ratio, low threshold voltage, a large contrast ratio and a long service life.

DESCRIPTION OF EMBODIMENTS

Usage of terms herein is as described below. Terms "liquid crystal composition" and "liquid crystal display device" may be occasionally abbreviated as "composition" and "device," respectively. "Liquid crystal display device" is a generic term for a liquid crystal display panel and a liquid crystal display module. "Liquid crystal compound" is a generic term for a compound having a liquid crystal phase such as a nematic phase and a smectic phase, and a compound having no liquid crystal phase but to be mixed with the composition for the purpose of adjusting characteristics such as a temperature range of the nematic phase, viscosity and dielectric anisotropy. The compound has a six-membered ring such as 1,4-cyclohexylene and 1,4-phenylene, and has rod-like molecular structure. "Polymerizable compound" is a compound to be added for the purpose of forming a polymer in the composition. Therefore, a liquid crystal compound having alkenyl has no polymerizability.

The liquid crystal composition is prepared by mixing a plurality of liquid crystal compounds. An additive such as an optically active compound, an antioxidant, an ultraviolet light absorber, a dye, an antifoaming agent, the polymerizable compound, a polymerization initiator, a polymerization inhibitor and a polar compound is added to the liquid crystal composition when necessary. A proportion of the liquid crystal compounds is expressed in terms of weight percent (% by weight) based on the weight of the liquid crystal composition containing no additive, even after the additive has been added. A proportion of the additives is expressed in terms of weight percent (% by weight) based on the weight of the liquid crystal composition containing no additive. More specifically, a proportion of the liquid crystal compounds or the additives is calculated based on the total weight of the liquid crystal compounds. Weight parts per million (ppm) may be occasionally used. A proportion of the polymerization initiator and the polymerization inhibitor is exceptionally expressed based on the weight of the polymerizable compound.

"Maximum temperature of the nematic phase" may be occasionally abbreviated as "maximum temperature." "Minimum temperature of the nematic phase" may be occasionally abbreviated as "minimum temperature." An expression "having large specific resistance" means that the composition has large specific resistance in an initial stage, and the composition has the large specific resistance even after the device has been used for a long period of time. An expression "having a large voltage holding ratio" means that the device has a large voltage holding ratio at room temperature and also at a temperature close to the maximum temperature in an initial stage, and that the device has a large voltage holding ratio at room temperature and also at a temperature close to the maximum temperature even after the device has been used for a long period of time. In the composition or the device, the characteristics may be occasionally examined before and after an aging test (including an acceleration deterioration test). An expression "increase the dielectric anisotropy" means that a value of dielectric anisotropy positively increases in a composition having positive dielectric anisotropy, and the value of dielectric anisotropy negatively increases in a composition having negative dielectric anisotropy.

A compound represented by formula (1) may be occasionally abbreviated as "compound (1)." At least one compound selected from the group of compounds represented by formula (1) may be occasionally abbreviated as "compound (1)." "Compound (1)" means one compound, a mixture of two compounds or a mixture of three or more compounds represented by formula (1). A same rule applies also to any other compound represented by any other formula. An expression "at least one piece of 'A'" means that the number of 'A' is arbitrary. An expression "at least one piece of 'A' may be replaced by 'B'" means that, when the number of 'A' is 1, a position of 'A' is arbitrary, and also when the number of 'A' is 2 or more, positions thereof can be selected without restriction. A same rule applies also to an expression "at least one piece of 'A' is replaced by 'B'."

A symbol of terminal group $R^1$ is used in a plurality of compounds in chemical formulas of component compounds. In the compounds, two groups represented by two pieces of arbitrary $R^1$ may be identical or different. For example, in one case, $R^1$ of compound (1-1) is ethyl and $R^1$ of compound (1-2) is ethyl. In another case, $R^1$ of compound (1-1) is ethyl and $R^1$ of compound (1-2) is propyl. A same rule applies also to a symbol of any other terminal group or the like. In formula (1), when a subscript 'a' is 2, two of ring A exists. In the compound, two rings represented by two of ring A may be identical or different. A same rule applies also to two of arbitrary ring A when the subscript 'a' is larger than 2. A same rule applies also to other symbols. A same rule applies also to such a case where two pieces of -$Sp^{10}$-$P^5$ exists in compound (4-27).

Symbols such as A, B, C and D surrounded by a hexagonal shape correspond to rings such as ring A, ring B, ring C and ring D, respectively, and represent rings such as a six-membered ring and a condensed ring. An oblique line crossing one piece of the hexagonal shape represents that arbitrary hydrogen on the ring may be replaced by a group such as -Sp¹-P¹. A subscript such as 'c' represents the number of groups replaced. When a subscript 'c' is 0, no such replacement exists. When the subscript 'c' is 2 or more, a plurality of pieces of -Sp¹-P¹ exist on ring A. The plurality of groups represented by -Sp¹-P¹ may be identical or different. In an expression "ring A and ring B are independently X, Y or Z", "independently" is used because a plurality of subjects exist. When a subject is "ring A", "independently" is not used because the number of subject is one. When "ring A" is used in a plurality of formulas, a rule in "may be identical or different" applies to "ring A." A same rule applies also to other groups.

Then, 2-fluoro-1,4-phenylene means two divalent groups described below. In a chemical formula, fluorine may be leftward (L) or rightward (R). A same rule applies also to an asymmetrical divalent group formed by eliminating two hydrogen from a ring, such as tetrahydropyran-2,5-diyl. A same rule applies also to a divalent bonding group such as carbonyloxy (—COO— or —OCO—).

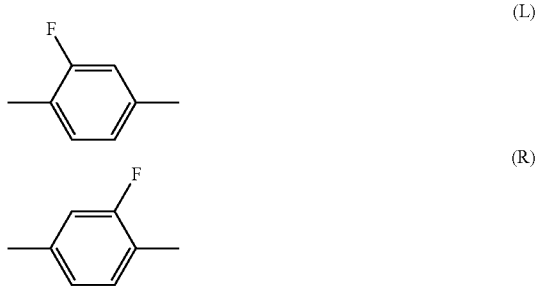

An expression such as "at least one piece of —CH$_2$— may be replaced by —O—" is used herein. In the above case, —CH$_2$—CH$_2$—CH$_2$— may be converted into —O—CH$_2$—O— by replacement of non-adjacent —CH$_2$— by —O—. However, adjacent —CH$_2$— is not replaced by —O—. The reason is that —O—O—CH$_2$— (peroxide) is formed in the replacement. More specifically, the expression means both "one piece of —CH$_2$— may be replaced by —O—" and "at least two pieces of non-adjacent —CH$_2$— may be replaced by —O—." A same rule applies not only to replacement by —O— but also to replacement by a divalent group such as —CH=CH— or —COO—. In formula (1), R¹ is alkyl having 1 to 25 carbons or the like. The carbon number of the alkyl may be occasionally increased by replacement of a kind thereof. The maximum carbon number is 30 in such a case. A same rule applies not only to a monovalent group such as R¹ but also to a divalent group such as alkylene.

Alkyl of a liquid crystal compound is straight-chain alkyl or branched-chain alkyl, but includes no cyclic alkyl. Straight-chain alkyl is preferred to branched-chain alkyl. A same rule applies also to a terminal group such as alkoxy and alkenyl. With regard to a configuration of 1,4-cyclohexylene, trans is generally preferred to cis.

The invention includes items described below.

Item 1. A liquid crystal composition that has negative dielectric anisotropy, and contains at least one compound selected from the group of polar compounds represented by formula (1) as a first additive:

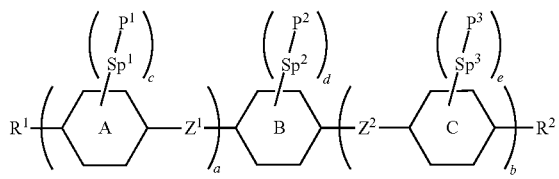

wherein, in formula (1), R¹ is hydrogen, fluorine, chlorine or alkyl having 1 to 25 carbons, and in the alkyl, at least one piece of —CH$_2$— may be replaced by —NR$^O$—, —O—, —S—, —CO—, —CO—O—, —O—CO—, —O—CO—O— or cycloalkylene having 3 to 8 carbons, and at least one tertiary carbon (>CH—) may be replaced by nitrogen (>N—), and in the groups, at least one hydrogen may be replaced by fluorine or chlorine, in which R$^O$ is hydrogen or alkyl having 1 to 12 carbons; R² is a polar a group having at least one of an oxygen atom having an OH structure, a sulfur atom having an SH structure and a nitrogen atom having a primary, secondary or tertiary amine structure; ring A, ring B and ring C are independently 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine; Z¹ and Z² are independently a single bond or alkylene having 1 to 10 carbons, and in the alkylene, at least one piece of —CH$_2$— may be replaced by —O—, —CO—, —COO— or —OCO—, and at least one piece of —CH$_2$—CH$_2$— may be replaced by —CH=CH—, —C(CH$_3$)=CH—, —CH=C(CH$_3$)— or —C(CH$_3$)=C(CH$_3$)—, and in the groups, at least one hydrogen may be replaced by fluorine or chlorine; P¹, P² and P³ are a polymerizable group; Sp¹, Sp² and Sp³ are independently a single bond or alkylene having 1 to 10 carbons, and in the alkylene, at least one piece of —CH$_2$— may be replaced by —O—, —COO—, —OCO— or —OCOO—, and at least one piece of —CH$_2$—CH$_2$— may be replaced by —CH=CH— or —C≡C—, and in the groups, at least one hydrogen may be replaced by fluorine or chlorine; a and b are independently 0, 1, 2, 3 or 4, and a sum of a and b is 0, 1, 2, 3 or 4; and c and e are independently 0, 1, 2, 3 or 4, and d is 1, 2, 3 or 4.

Item 2. The liquid crystal composition according to item 1, wherein, in formula (1), R² is a group represented by any one of formula (A1) to formula (A4):

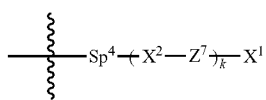

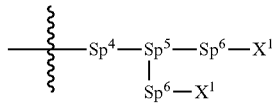

-continued

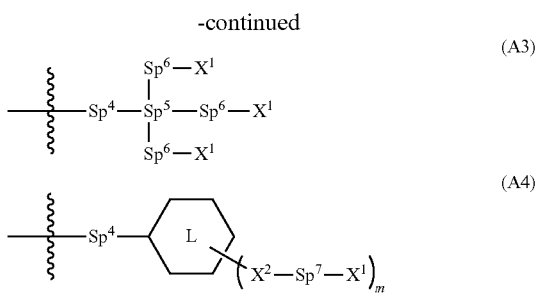

wherein, in formula (A1) to formula (A4), Sp$^4$, Sp$^6$ and Sp$^7$ are independently a single bond or a group (-Sp″-X″—), in which Sp″ is alkylene having 1 to 20 carbons, and in the alkylene, at least one piece of —CH$_2$— may be replaced by —O—, —S—, —NH—, —N(R$^0$)—, —CO—, —CO—O—, —O—CO—, —O—CO—O—, —S—CO—, —CO—S—, —N(R$^0$)—CO—O—, —O—CO—N(R$^0$)—, —N(R$^0$)—CO—N(R$^0$)—, —CH═CH— or —C≡C—, and in the groups, at least one hydrogen may be replaced by fluorine, chlorine or —CN, and X″ is —O—, —S—, —CO—, —CO—O—, —O—CO—, —O—CO—O—, —CO—N(R$^0$)—N(R$^0$)—CO—, —N(R$^0$)—CO—N(R$^0$)—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH═N—, —N═CH—, —N═N—, —CH═CR$^0$—, —CY$^2$═CY$^3$—, —C≡C—, —CH═CH—CO—O—, —O—CO—CH═CH— or a single bond, in which R$^0$ is hydrogen or alkyl having 1 to 12 carbons, and Y$^2$ and Y$^3$ are independently hydrogen, fluorine, chlorine or —CN; Sp$^5$ is >CH—, >CR$^{11}$—, >N— or >C<; X$^1$ is —OH, —OR$^{11}$, —COOH, —NH$_2$, —NHR$^{11}$, —N(R$^{11}$)$_2$, —SH or —SR$^{11}$,

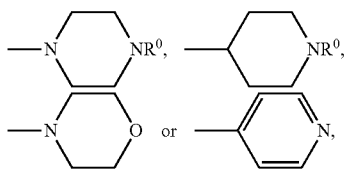

in which R$^0$ is hydrogen or alkyl having 1 to 12 carbons; X$^2$ is —O—, —CO—, —NH—, —NR$^{11}$—, —S— or a single bond; Z$^7$ is alkylene having 1 to 15 carbons, an alicyclic group having 5 or 6 carbons or a combination thereof, and in the groups, at least one hydrogen may be replaced by —OH, —OR$^{11}$, —COOH, —NH$_2$, —NHR$^{11}$, —N(R$^{11}$)$_2$, fluorine or chlorine; R$^{11}$ is alkyl having 1 to 15 carbons, and in the alkyl, at least one piece of —CH$_2$— may be replaced by —C≡C—, —CH═CH—, —COO—, —OCO—, —CO— or —O—, and in the groups, at least one hydrogen may be replaced by fluorine or chlorine; ring L is an aromatic group having 6 to 25 carbons or an alicyclic group having 3 to 25 carbons, and the groups may be a condensed ring, and in the groups, one to three hydrogens may be replaced by R$^L$; R$^L$ is —OH, —(CH$_2$)$_j$—OH, fluorine, chlorine, —CN, —NO$_2$, —NCO, —NCS, —OCN, —SCN, —C(═O)N(R$^0$)$_2$, —C(═O)R$^0$, —N(R$^0$)$_2$, —(CH$_2$)$_j$—N(R$^0$)$_2$, —SH, —SR$^0$, aryl having 6 to 20 carbons, heteroaryl having 6 to 20 carbons, alkyl having 1 to 25 carbons, alkoxy having 1 to 25 carbons, alkylcarbonyl having 2 to 25 carbons, alkoxycarbonyl having 2 to 25 carbons, alkylcarbonyloxy having 2 to 25 carbons or alkoxycarbonyloxy having 2 to 25 carbons, and in the groups, at least one hydrogen may be replaced by fluorine or chlorine, in which R$^0$ is hydrogen or alkyl having 1 to 12 carbons, and j is 1, 2, 3 or 4; k is 0, 1, 2 or 3; and m is 2, 3, 4 or 5.

Item 3. The liquid crystal composition according to item 1 or 2, wherein, in formula (1), P$^1$, P$^2$ and P$^3$ are independently a group selected from the group of polymerizable groups represented by formula (P-1) to formula (P-5):

wherein, in formula (P-1) to formula (P-5), M$^1$, M$^2$ and M$^3$ are independently hydrogen, fluorine, alkyl having 1 to 5 carbons, or alkyl having 1 to 5 carbons in which at least one hydrogen is replaced by fluorine or chlorine.

Item 4. The liquid crystal composition according to any one of items 1 to 3, wherein the first additive is at least one compound selected from the group of polar compounds represented by formula (1-1) to formula (1-15):

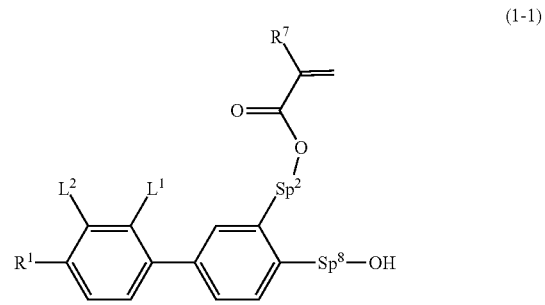

(1-2)
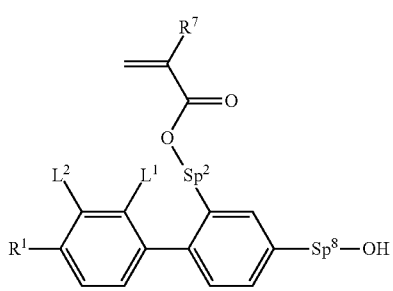
(1-3)
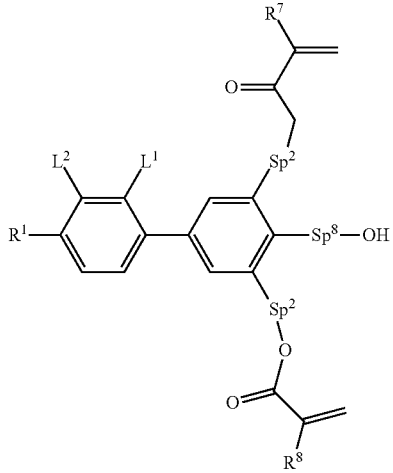
(1-4)
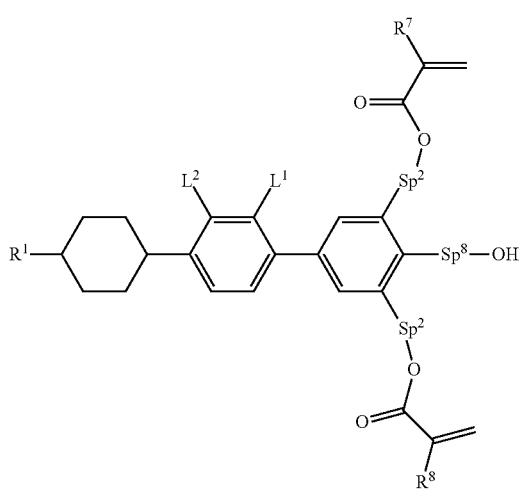
(1-5)
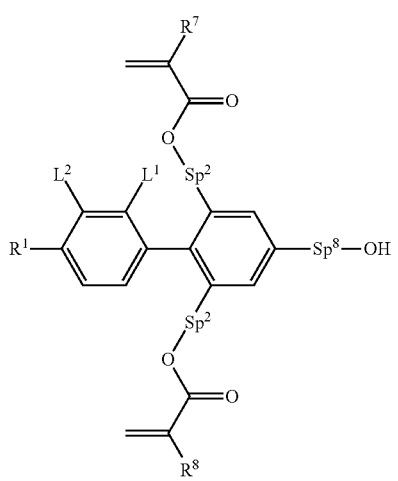
(1-6)
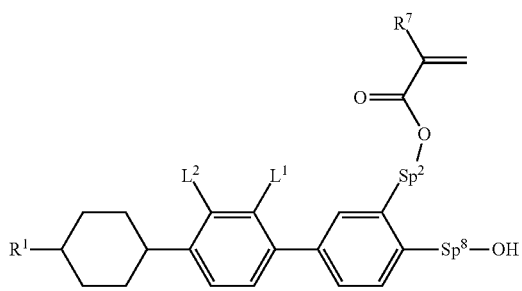
(1-7)
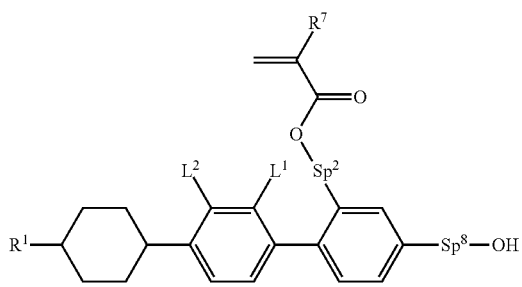
(1-8)
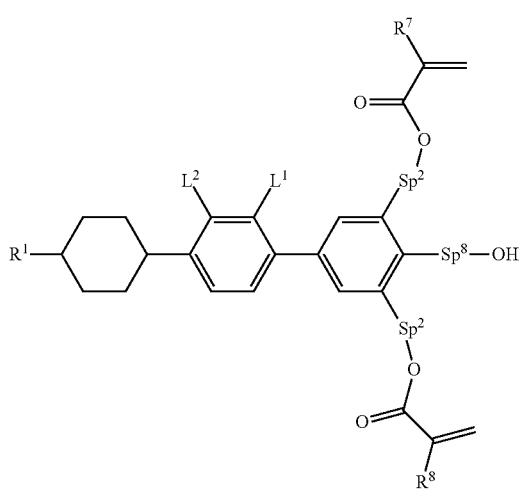

(1-9)
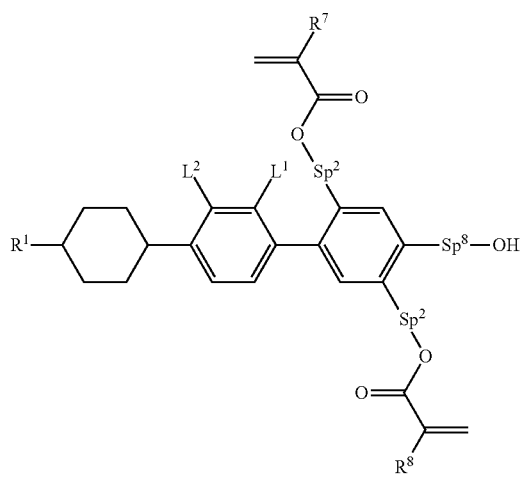
(1-10)
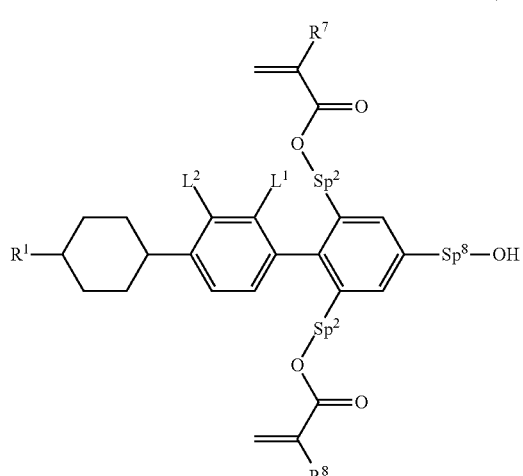
(1-11)
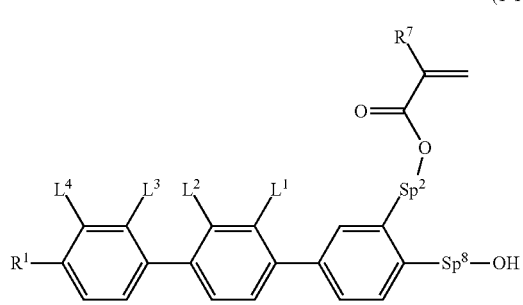
(1-12)
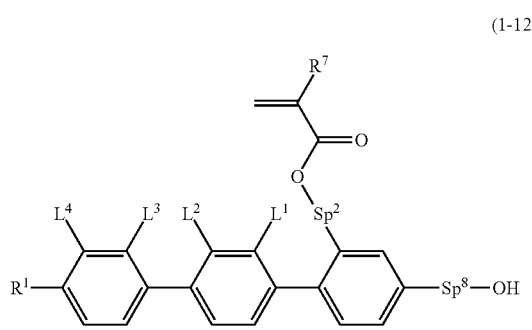
(1-13)
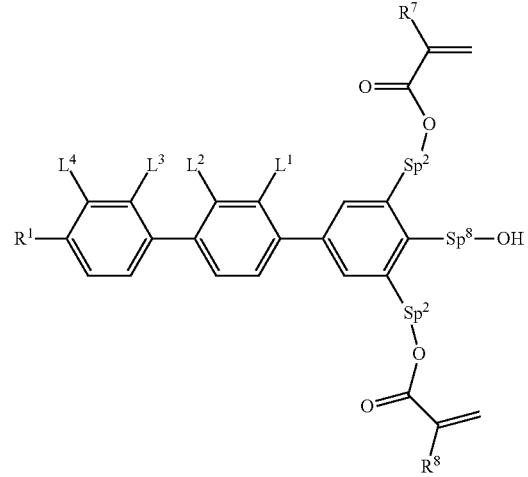
(1-14)
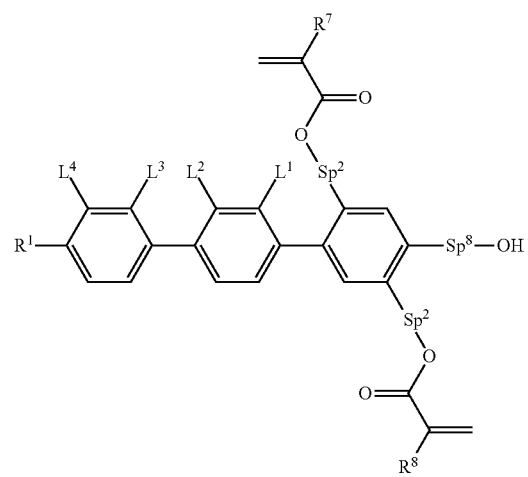
(1-15)
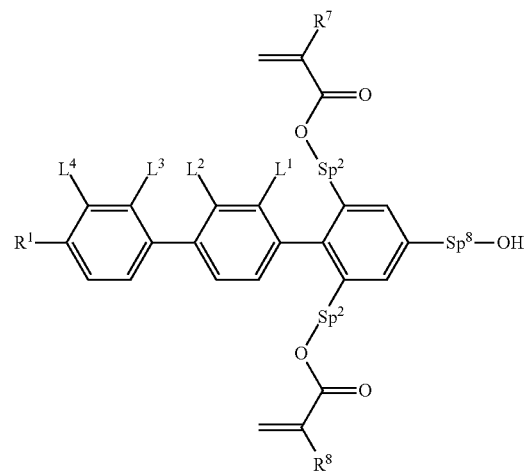
wherein, in formula (1-1) to formula (1-15), $R^1$ is hydrogen, fluorine, chlorine or alkyl having 1 to 25 carbons, and in the alkyl, at least one piece of —$CH_2$— may be replaced by —$NR^O$—, —O—, —S—, —CO—, —CO—O—, —O—CO—, —O—CO—O— or cycloalkylene having 3 to 8 carbons, and at least one tertiary carbon (>CH—) may be replaced by nitrogen (>N—), and in the groups, at least one hydrogen may be replaced by fluorine or chlorine, in which R⁰ is hydrogen or alkyl having 1 to 12 carbons; Sp² is a single bond or alkylene having 1 to 10 carbons, and in the alkylene, at least one piece of —CH₂— may be replaced by —O—, —COO—, —OCO— or —OCOO—, and at least one piece of —CH₂—CH₂— may be replaced by —CH=CH— or —C≡C—, and in the groups, at least one hydrogen may be replaced by fluorine or chlorine; Sp⁸ is a single bond, alkylene having 1 to 5 carbons, or alkylene having 1 to 5 carbons in which one piece of —CH₂— is replaced by —O—; L¹, L², L³ and L⁴ are independently hydrogen, fluorine, methyl or ethyl; and R⁷ and R⁸ are independently hydrogen or methyl.

Item 5. The liquid crystal composition according to any one of items 1 to 4, wherein a proportion of the first additive is 10% by weight or less based on the weight of the liquid crystal composition.

Item 6. The liquid crystal composition according to any one of items 1 to 5, containing at least one compound selected from the group of compounds represented by formula (2) as a first component:

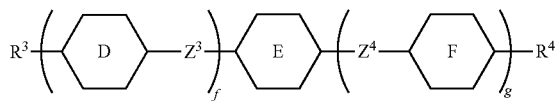
(2)

wherein, in formula (2), R³ and R⁴ are independently alkyl having 1 to 12 carbons, alkoxy having 1 to 12 carbons, alkenyl having 2 to 12 carbons or alkenyloxy having 2 to 12 carbons; ring D and ring F are independently 1,4-cyclohexylene, 1,4-cyclohexenylene, 1,4-phenylene, 1,4-phenylene in which at least one hydrogen is replaced by fluorine or chlorine or tetrahydropyran-2,5-diyl; ring E is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; Z³ and Z⁴ are independently a single bond, —CH₂CH₂—, —CH₂O—, —OCH₂—, —COO— or —OCO—; and f is 1, 2 or 3, g is 0 or 1, and a sum of f and g is 3 or less.

Item 7. The liquid crystal composition according to any one of items 1 to 6, containing at least one compound selected from the group of compounds represented by formula (2-1) to formula (2-21) as the first component:

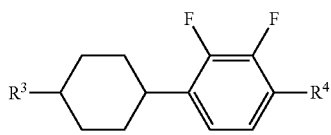
(2-1)

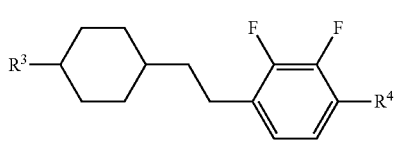
(2-2)

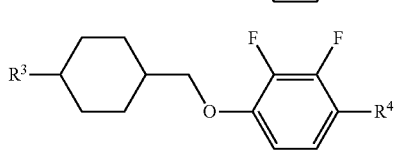
(2-3)

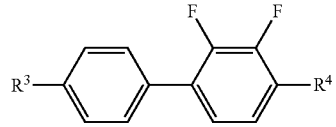
(2-4)

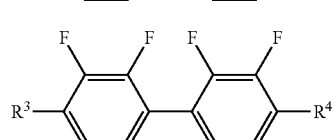
(2-5)

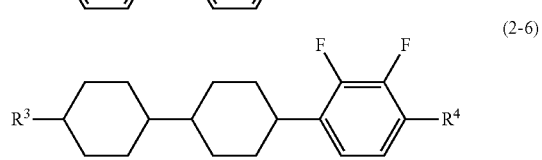
(2-6)

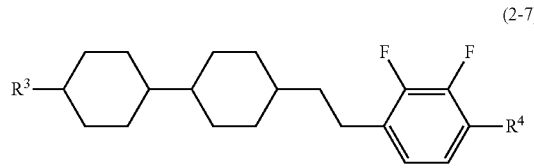
(2-7)

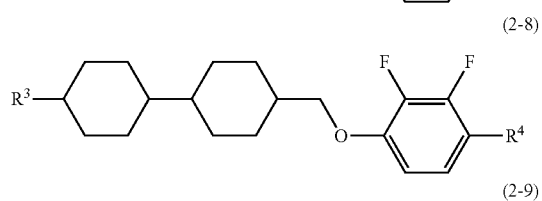
(2-8)

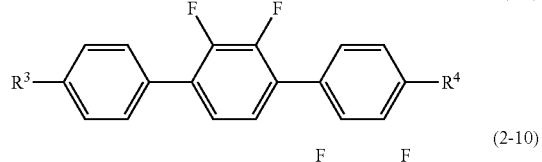
(2-9)

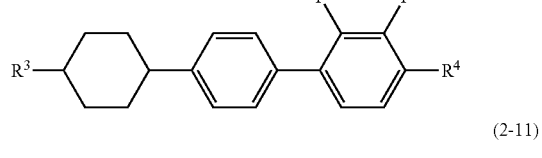
(2-10)

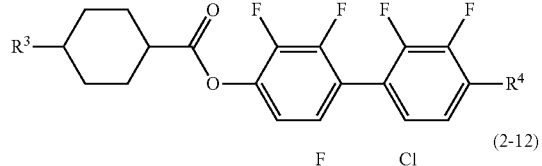
(2-11)

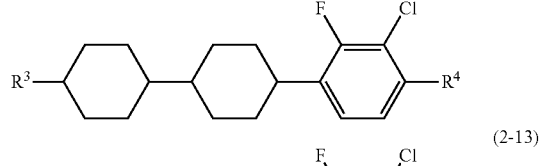
(2-12)

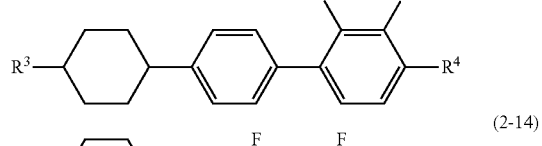
(2-13)

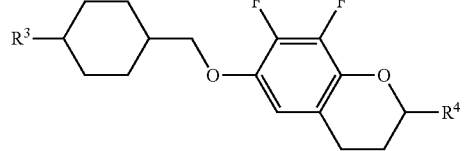
(2-14)

-continued (2-15)
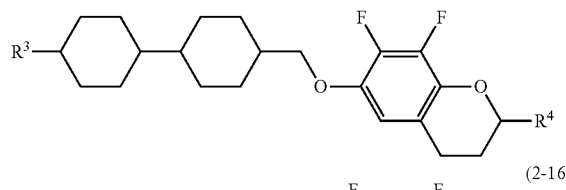

(2-16)
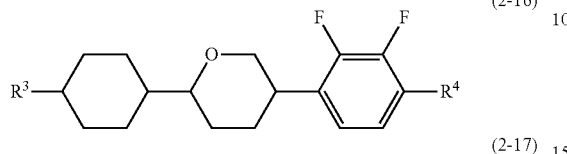

(2-17)
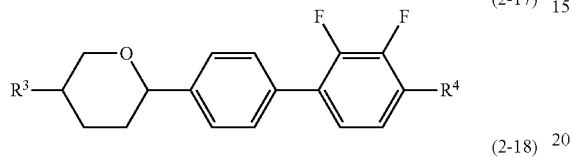

(2-18)
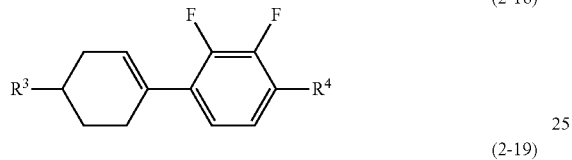

(2-19)
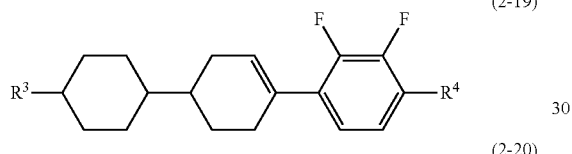

(2-20)
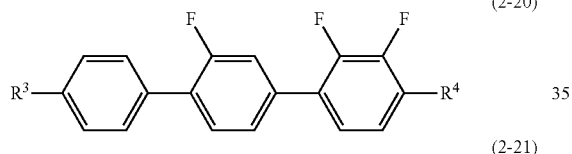

(2-21)
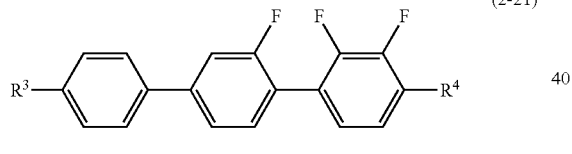

wherein, in formula (2-1) to formula (2-21), $R^3$ and $R^4$ are independently alkyl having 1 to 12 carbons, alkoxy having 1 to 12 carbons, alkenyl having 2 to 12 carbons or alkenyloxy having 2 to 12 carbons.

Item 8. The liquid crystal composition according to item 6 or 7, wherein a proportion of the first component is in the range of 10% by weight to 90% by weight based on the weight of the liquid crystal composition.

Item 9. The liquid crystal composition according to any one of items 1 to 8, containing at least one compound selected from the group of compounds represented by formula (3) as a second component:

(3)
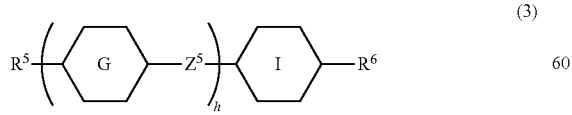

wherein, in formula (3), $R^5$ and $R^6$ are independently alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine; ring G and ring I are independently 1,4-cyclohexylene, 1,4-phenylene, 2-fluoro-1,4-phenylene or 2,5-difluoro-1,4-phenylene; $Z^5$ is a single bond, —CH$_2$CH$_2$—, —CH$_2$O—, —OCH$_2$—, —COO— or —OCO—; and h is 1, 2 or 3.

Item 10. The liquid crystal composition according to any one of items 1 to 9, containing at least one compound selected from the group of compounds represented by formula (3-1) to formula (3-13) as the second component:

(3-1)
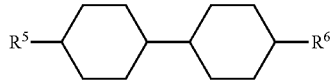

(3-2)
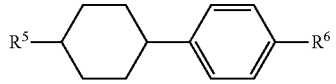

(3-3)
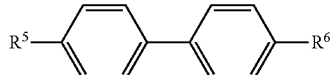

(3-4)
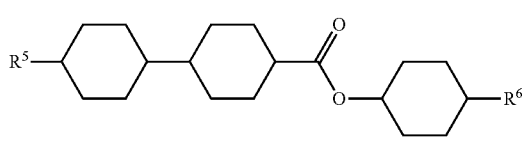

(3-5)

(3-6)

(3-7)
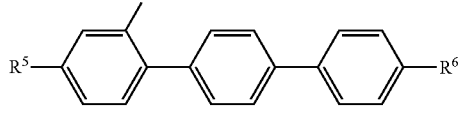

(3-8)
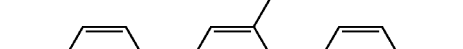

(3-9)
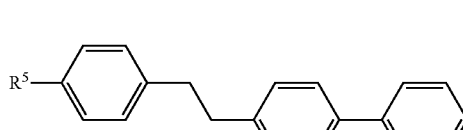

(3-10)
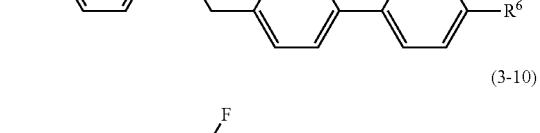

-continued

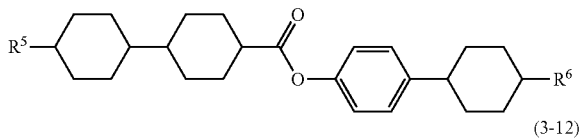
(3-11)

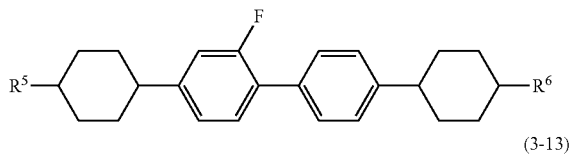
(3-12)

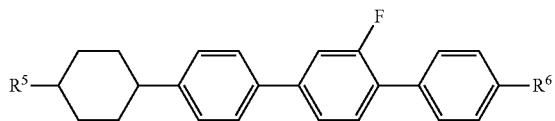
(3-13)

wherein, in formula (3-1) to formula (3-13), $R^5$ and $R^6$ are independently alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine.

Item 11. The liquid crystal composition according to item 9 or 10, wherein a proportion of the second component is in the range of 10% by weight to 70% by weight based on the weight of the liquid crystal composition.

Item 12. The liquid crystal composition according to any one of items 1 to 11, containing at least one compound selected from the group of polymerizable compounds represented by formula (4) as a second additive:

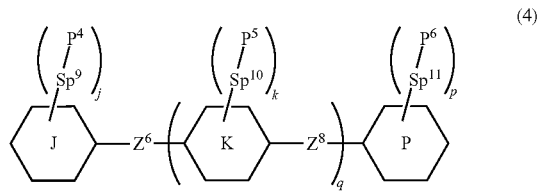
(4)

wherein, in formula (4), ring J and ring P are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine; ring K is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine; $Z^6$ and $Z^8$ are independently a single bond or alkylene having 1 to 10 carbons, and in the alkylene, at least one piece of —CH$_2$— may be replaced by —O—, —CO—, —COO— or —OCO—, and at least one piece of —CH$_2$CH$_2$— may be replaced by —CH=CH—, —C(CH$_3$)=CH—, —CH=C(CH$_3$)— or —C(CH$_3$)=C(CH$_3$)—, and in the groups, at least one hydrogen may be replaced by fluorine or chlorine; $P^4$, $P^5$ and $P^6$ are a polymerizable group; $Sp^9$, $Sp^{10}$ and $Sp^{11}$ are independently a single bond or alkylene having 1 to 10 carbons, and in the alkylene, at least one piece of —CH$_2$— may be replaced by —O—, —COO—, —OCO— or —OCOO—, and at least one piece of —CH$_2$CH$_2$— may be replaced by —CH=CH— or —C≡C—, and in the groups, at least one hydrogen may be replaced by fluorine or chlorine; q is 0, 1 or 2; and j, k and p are independently 0, 1, 2, 3 or 4, and a sum of j, k and p is 1 or more.

Item 13. The liquid crystal composition according to item 12, wherein, in formula (4), $P^4$, $P^5$ and $P^6$ are independently a group selected from the group of polymerizable groups represented by formula (P-1) to formula (P-5):

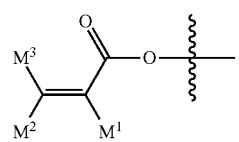
(P-1)

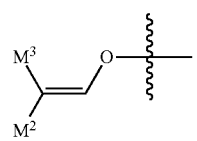
(P-2)

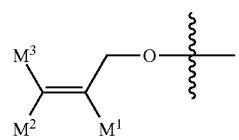
(P-3)

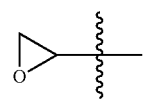
(P-4)

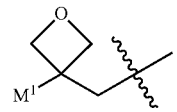
(P-5)

wherein, in formula (P-1) to formula (P-5), $M^1$, $M^2$ and $M^3$ are independently hydrogen, fluorine, alkyl having 1 to 5 carbons, or alkyl having 1 to 5 carbons in which at least one hydrogen is replaced by fluorine or chlorine.

Item 14. The liquid crystal composition according to any one of items 1 to 13, containing at least one compound selected from the group of polymerizable compounds represented by formula (4-1) to formula (4-28) as the second additive:

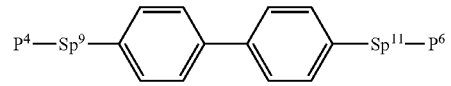
(4-1)

(4-2) 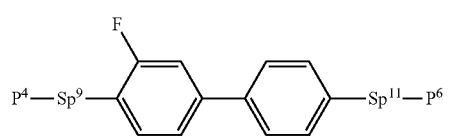
(4-3) 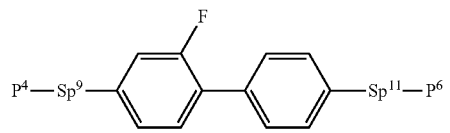
(4-4) 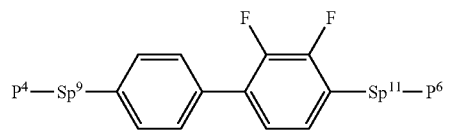
(4-5) 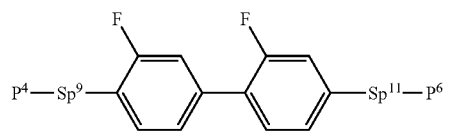
(4-6) 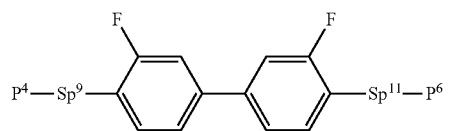
(4-7) 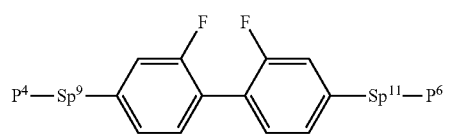
(4-8) 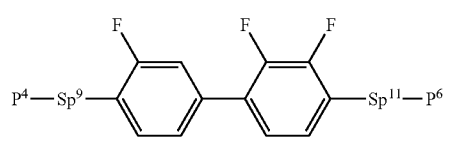
(4-9) 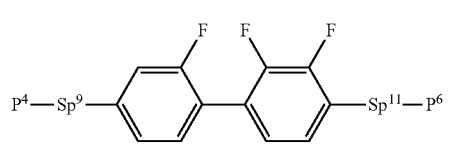
(4-10) 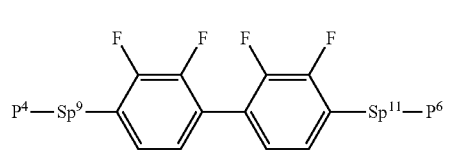
(4-11) 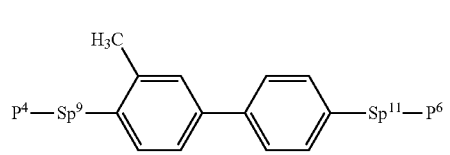
(4-12) 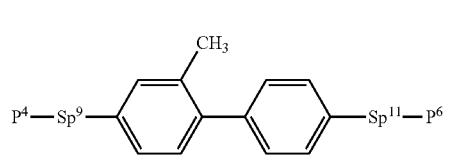
(4-13) 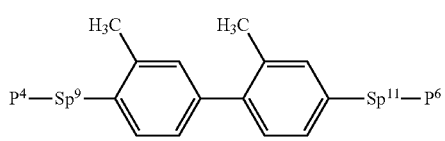
(4-14) 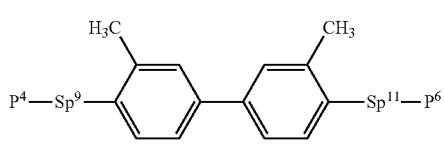
(4-15) 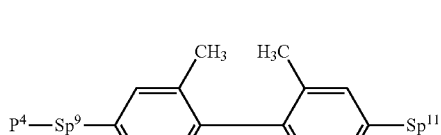
(4-16) 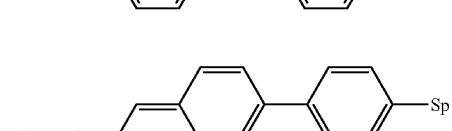
(4-17) 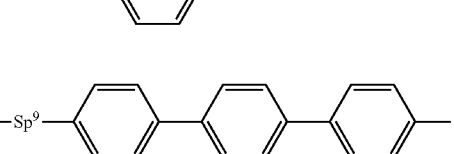
(4-18) 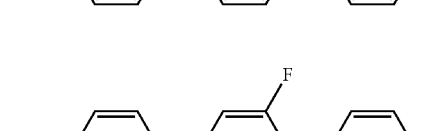
(4-19) 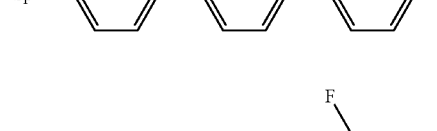
(4-20) 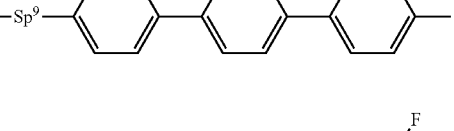
(4-20) 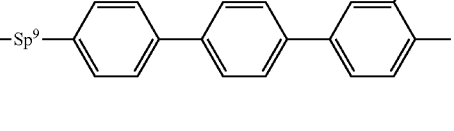
(4-21) 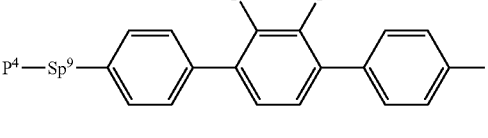
(4-22) 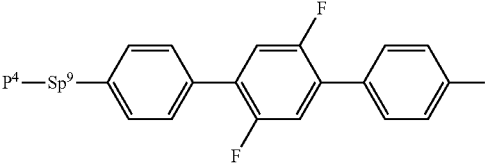

(4-23)
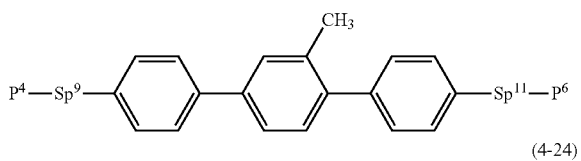

(4-24)
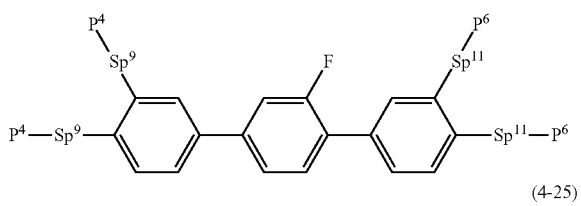

(4-25)
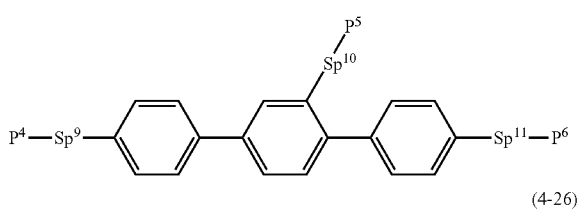

(4-26)
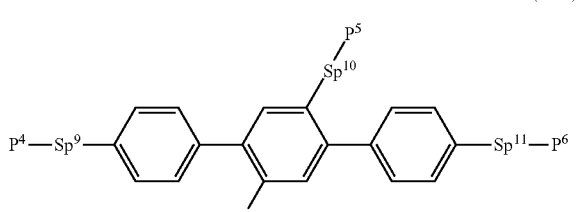

(4-27)
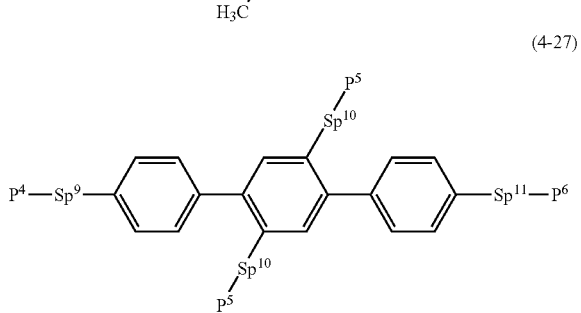

(4-28)
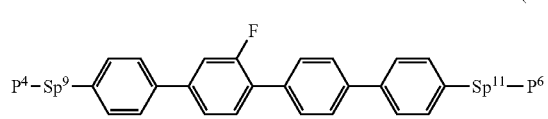

wherein, in formula (4-1) to formula (4-28), $P^4$, $P^5$ and $P^6$ are independently a group selected from the group of polymerizable groups represented by formula (P-1) to formula (P-3), in which $M^1$, $M^2$ and $M^3$ are independently hydrogen, fluorine, alkyl having 1 to 5 carbons, or alkyl having 1 to 5 carbons in which at least one hydrogen is replaced by fluorine or chlorine;

(P-1)
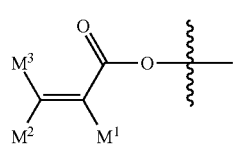

(P-2)
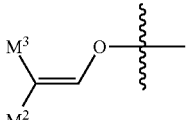

(P-3)
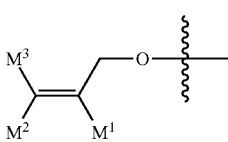

wherein $Sp^9$, $Sp^{10}$ and $Sp^{11}$ are independently a single bond or alkylene having 1 to 10 carbons, and in the alkylene, at least one piece of —CH$_2$— may be replaced by —O—, —COO—, —OCO— or —OCOO—, and at least one piece of —CH$_2$CH$_2$— may be replaced by —CH=CH— or —C≡C—, and in the groups, at least one hydrogen may be replaced by fluorine or chlorine.

Item 15. The liquid crystal composition according to any one of items 12 to 14, wherein a proportion of the second additive is in the range of 0.03% by weight to 10% by weight based on the weight of the liquid crystal composition.

Item 16. A liquid crystal display device, including the liquid crystal composition according to any one of items 1 to 15.

Item 17. The liquid crystal display device according to item 16, wherein an operating mode in the liquid crystal display device includes an IPS mode, a VA mode, an FFS mode or an FPA mode, and a driving mode in the liquid crystal display device includes an active matrix mode.

Item 18. A polymer sustained alignment mode liquid crystal display device, wherein the liquid crystal display device includes the liquid crystal composition according to any one of items 1 to 15, or a polymerizable compound in the liquid crystal composition is polymerized.

Item 19. A liquid crystal display device having no alignment film, wherein the liquid crystal display device includes the liquid crystal composition according to any one of items 1 to 15, or a polymerizable compound in the liquid crystal composition is polymerized.

Item 20. Use of the liquid crystal composition according to any one of items 1 to 15 in a liquid crystal display device.

Item 21. Use of the liquid crystal composition according to any one of items 1 to 15 in a polymer sustained alignment mode liquid crystal display device.

Item 22. Use of the liquid crystal composition according to any one of items 1 to 15 in a liquid crystal display device having no alignment film.

The invention further includes the following items: (a) a method to produce the liquid crystal display device by arranging the liquid crystal composition between two substrates, irradiating the composition with light while voltage is applied thereto, and polymerizing a polar compound having a polymerizable group contained in the composition; and (b) the liquid crystal composition, wherein a maximum temperature of a nematic phase is 70° C. or more, optical anisotropy (measured at 25° C.) at a wavelength of 589 nanometers is 0.08 or more, and dielectric anisotropy (measured at 25° C.) at a frequency of 1 kHz is −2 or less.

The invention further includes the following items: (c) the composition, wherein compound (5) to compound (7) described in JP 2006-199941 A include a liquid crystal compound having positive dielectric anisotropy, and at least one compound selected from the group of the compounds described above is contained; (d) the composition, containing at least two of polar compounds (1) described above; (e) the composition, further containing a polar compound different from polar compound (1); (f) the composition, containing one, two or at least three of additives such as the optically active compound, the antioxidant, the ultraviolet light absorber, the dye, the antifoaming agent, the polymerizable compound, the polymerization initiator, the polymerization inhibitor and the polar compound; (g) an AM device including the composition; (h) a device including the composition and having the TN mode, the ECB mode, the OCB mode, the IPS mode, the FFS mode, the VA mode or the FPA mode; (i) a transmissive device including the composition; (j) use of the composition as the composition having the nematic phase; and (k) use as an optically active composition by adding the optically active compound to the composition.

The composition of the invention will be described in the following order. First, a constitution of the composition will be described. Second, main characteristics of the component compounds and main effects of the compounds on the composition will be described. Third, a combination of components in the composition, a preferred proportion of the components and the basis thereof will be described. Fourth, a preferred embodiment of the component compounds will be described. Fifth, a preferred component compound will be described. Sixth, an additive that may be added to the composition will be described. Seventh, methods for synthesizing the component compounds will be described. Last, an application of the composition will be described.

First, the constitution of the composition will be described. The composition of the invention is classified into composition A and composition B. Composition A may further contain any other liquid crystal compound, an additive or the like in addition to the liquid crystal compound selected from compound (2) and compound (3). An expression "any other liquid crystal compound" means a liquid crystal compound different from compound (2) and compound (3). Such a compound is mixed with the composition for the purpose of further adjusting the characteristics. The additive includes the optically active compound, the antioxidant, the ultraviolet light absorber, the dye, the antifoaming agent, the polymerizable compound, the polymerization initiator, the polymerization inhibitor and the polar compound.

Composition B consists essentially of liquid crystal compounds selected from compound (2) and compound (3). An expression "essentially" means that the composition may contain the additive, but contains no any other liquid crystal compound. Composition B has the smaller number of components than composition A has. Composition B is preferred to composition A in view of cost reduction. Composition A is preferred to composition B in view of possibility of further adjusting the characteristics by mixing any other liquid crystal compound.

Second, the main characteristics of the component compounds and main effects of the compounds on the composition will be described. The main characteristics of the component compounds are summarized in Table 2 on the basis of advantageous effects of the invention. In Table 2, a symbol L stands for "large" or "high," a symbol M stands for "medium," and a symbol S stands for "small" or "low." The symbols L, M and S represent a classification based on a qualitative comparison among the component compounds, and a symbol '0' means that a value is nearly zero.

TABLE 2

| Characteristics of Compounds | | |
| --- | --- | --- |
| Characteristics | Compound (2) | Compound (3) |
| Maximum temperature | S to L | S to L |
| Viscosity | M to L | S to M |
| Optical anisotropy | M to L | S to L |
| Dielectric anisotropy | M to L[1)] | 0 |
| Specific resistance | L | L |

[1)]A value of dielectric anisotropy is negative, and the symbol shows magnitude of an absolute value.

Upon mixing the component compounds with the composition, the main effects of the component compounds on the characteristics of the composition are as described below. Compound (1) is adsorbed onto a substrate surface by action of a polar group to control alignment of liquid crystal molecules. Compound (1) is required to have high compatibility with a liquid crystal compound in order to obtain a desired effect. Compound (1) has a six-membered ring such as 1,4-cyclohexylene and 1,4-phenylene, and has rod-like molecular structure, and therefore is best for the purpose thereof. Compound (1) is polymerized to give a polymer. The polymer stabilizes alignment of the liquid crystal molecules, and therefore shortens a response time in the device, and improves image persistence. Compound (2) increases the dielectric anisotropy, and decreases the minimum temperature. Compound (3) decreases the viscosity. Compound (4) is polymerized to give a polymer. The polymer stabilizes alignment of the liquid crystal molecules, and therefore shortens a response time in the device, and improves image persistence. A polymer of compound (1) has interaction with the substrate surface from a viewpoint of alignment of the liquid crystal molecules, and therefore is presumed to be more effective than a polymer of compound (4).

Third, the combination of components in the composition, a preferred proportion of the components and the basis thereof will be described. A preferred combination of the components in the composition includes a combination of compound (1), compound (2) and compound (3), or a combination of compound (1), compound (2), compound (3) and compound (4).

Compound (1) is added to the composition for the purpose of controlling alignment of the liquid crystal molecules. A preferred proportion of compound (1) is about 0.05% by weight or more for aligning the liquid crystal molecules, and about 10% by weight or less for preventing poor display in the device. A further preferred proportion is in the range of about 0.1% by weight to about 7% by weight. A particularly preferred proportion is in the range of about 0.5% by weight to about 5% by weight.

A preferred proportion of compound (2) is about 10% by weight or more for increasing the dielectric anisotropy, and about 90% by weight or less for decreasing the minimum temperature. A further preferred proportion is in the range of about 20% by weight to about 85% by weight. A particularly preferred proportion is in the range of about 30% by weight to about 85% by weight.

A preferred proportion of compound (3) is about 10% by weight or more for increasing the maximum temperature or decreasing the minimum temperature, and about 90% by weight or less for increasing the dielectric anisotropy. A further preferred proportion is in the range of about 15% by weight to about 75% by weight. A particularly preferred proportion is in the range of about 15% by weight to about 60% by weight.

Compound (4) is added to the composition for the purpose of adapting the composition for the polymer sustained alignment mode device. A preferred proportion of compound (4) is about 0.03% by weight or more for increasing long term reliability of the device, and about 10% by weight or less for preventing poor display in the device. A further preferred proportion is in the range of about 0.1% by weight to about 2% by weight. A particularly preferred proportion is in the range of about 0.2% by weight to about 1.0% by weight.

Fourth, the preferred embodiment of the component compounds will be described. $R^2$ is a polar group in formula (1). Compound (1) is added to the composition, and therefore preferably stable. When compound (1) is added to the composition, the compound preferably does not decrease the voltage holding ratio of the device. Compound (1) preferably has low volatility. Preferred molar mass is 130 g/mol or more. Further preferred molar mass is in the range of 150 g/mol to 500 g/mol. Preferred compound (1) has a polymerizable group such as acryloyloxy (—OCO—CH═CH$_2$) and methacryloyloxy (—OCO—(CH$_3$)C═CH$_2$).

$R^2$ is a polar group. A suitable polar group has noncovalent bond interaction with a surface of a glass substrate or a metal oxide film. A preferred polar group has a hetero atom selected from the group of nitrogen, oxygen, sulfur and phosphorus. A preferred polar group has at least one or at least two hetero atoms. A further preferred polar group is a monovalent group derived therefrom by eliminating hydrogen from a compound selected from the group of alcohol, primary amine, secondary amine, tertiary amine, ketone, carboxylic acid, thiol, ester, ether, thioether and a combination thereof. The groups may have a straight-chain structure, a branched-chain structure, a cyclic structure or a combination thereof. A particularly preferred polar group has at least one oxygen atom having an OH structure or at least one nitrogen atom having a primary, secondary or tertiary amine structure.

Examples of polar group $R^2$ include a group represented by formula (A1) to formula (A4).

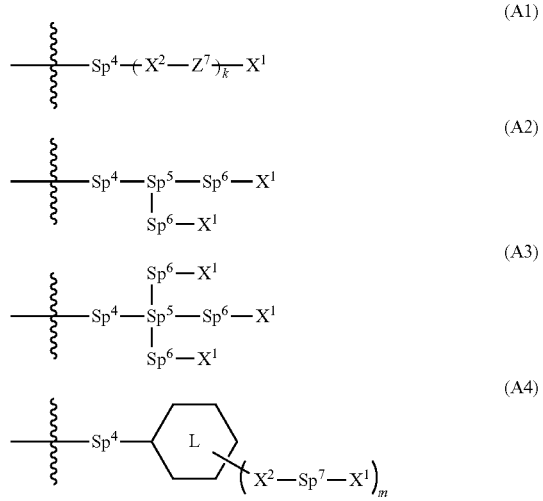

In formula (A1) to formula (A4), Sp$^4$, Sp$^6$ and Sp$^7$ are independently a single bond or a group (-Sp"-X"—), and X" is bonded to ring B or ring C. Sp" is alkylene having 1 to 20 carbons, and preferably alkylene having 1 to 12 carbons, and in the alkylene, at least one piece of —CH$_2$— may be replaced by —O—, —S—, —NH—, —N(R$^0$)—, —CO—, —CO—O—, —O—CO—, —O—CO—O—, —S—CO—, —CO—S—, —N(R$^0$)—CO—O—, —O—CO—N(R$^0$)—, —N(R$^0$)—CO—N(R$^0$)—, —CH═CH— or —C≡C—, and in the groups, at least one hydrogen may be replaced by fluorine, chlorine or —CN, and X" is —O—, —S—, —CO—, —CO—O—, —O—CO—, —O—CO—O—, —CO—N(R$^0$)—, —N(R$^0$)—CO—, —N(R$^0$)—CO—N(R$^0$)—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH═N—, —N═CH—, —N═N—, —CH═CR$^0$—, —CY$^2$═CY$^3$—, —C≡C—, —CH═CH—CO—O—, —O—CO—CH═CH— or a single bond, in which R$^0$ is hydrogen or alkyl having 1 to 12 carbons, and Y$^2$ and Y$^3$ are independently hydrogen, fluorine, chlorine or —CN. Preferred X" is —O—, —S—, —CO—, —COO—, —OCO—, —O—COO—, —CO—NR$^0$—, —NR$^0$—CO—, —NR$^0$—CO—NR$^0$— or a single bond. Sp$^5$ is >CH—, >CR$^{11}$—, >N— or >C<. More specifically, Sp$^5$ in formula (A2) means >CH—, >CR$^{11}$— or >N—, and Sp$^5$ in formula (A3) means >C<.

Preferred Sp" is —(CH$_2$)$_{p1}$—, —(CH$_2$CH$_2$O)$_{q1}$—CH$_2$CH$_2$—S—CH$_2$CH$_2$—S—CH$_2$CH$_2$— or —CH$_2$CH$_2$—NHCH$_2$CH$_2$—, in which p1 is an integer from 1 to 12 and q1 is an integer from 1 to 3. Preferred group (-Sp"-X"—) is —(CH$_2$)$_{p1}$—, —(CH$_2$)$_{p1}$—O—, —(CH$_2$)$_{p1}$—O—CO— or —(CH$_2$)$_{p1}$—O—CO—O—, in which p1 and q1 have the meaning described above. Further preferred group Sp" is ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

$X^1$ is —NH$_2$, —NHR$^{11}$, —N(R$^{11}$)$_2$, —OR$^{11}$, —OH, —COOH, —SH or —SR$^{11}$,

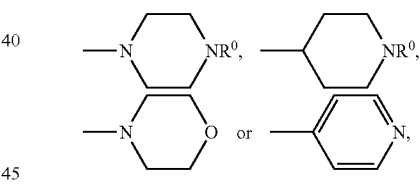

in which R$^{11}$ is alkyl having 1 to 15 carbons, and in the alkyl, at least one piece of —CH$_2$— may be replaced by —C≡C—, —CH═CH—, —COO—, —OCO—, —CO— or —O—, and in the groups, at least one hydrogen may be replaced by fluorine or chlorine, and R$^0$ is hydrogen or alkyl having 1 to 12 carbons.

$X^2$ is —O—, —CO—, —NH—, —NR$^{11}$—, —S— or a single bond, and $Z^7$ represents alkylene having 1 to 15 carbons, an alicyclic group having 5 to 6 carbons or a combination of at least one ring and alkylene, and in the groups, at least one hydrogen may be replaced by —OH, —OR$^{11}$, —COOH, —NH$_2$, —NHR$^{11}$, —N(R$^{11}$)$_2$, fluorine or chlorine, and R$^{11}$ has the meaning described above. Then, k is 0, 1, 2 or 3.

Particularly preferred nitrogen-containing group $R^2$ is —NH$_2$, —NH—(CH$_2$)$_{n3}$H, —(CH$_2$)$_n$—NH$_2$, —(CH$_2$)$_n$—NH—(CH$_2$)$_{n3}$H, —NH—(CH$_2$)$_n$—NH$_2$, —NH—(CH$_2$)$_n$—NH—(CH$_2$)$_{n3}$H, —(CH$_2$)$_{n1}$—NH—(CH$_2$)$_{n2}$—NH$_2$, —(CH$_2$)$_{n1}$—NH—(CH$_2$)$_{n2}$—(CH$_2$)$_{n3}$H, —O—(CH$_2$)—NH$_2$, —(CH$_2$)$_{n1}$—(CH$_2$)$_n$—NH$_2$, —(CH$_2$)$_{n1}$—NH—(CH$_2$)$_{n2}$—OH, —O—(CH$_2$)$_{n1}$—NH—(CH$_2$)$_{n2}$—NH$_2$, —O—(CH$_2$)$_{n1}$—NH—(CH$_2$)$_{n2}$—OH or —(CH$_2$)$_{n1}$—NH—(CH$_2$)$_{n2}$—NH—(CH$_2$)$_{n3}$H, in which n, n1, n2 and n3 are independently an integer from 1 to 12, and preferably 1, 2, 3 or 4.

Particularly preferred nitrogen-non-containing group R$^2$ is —OH, —(CH$_2$)$_n$—OH, —O—(CH$_2$)$_n$—OH, —[O—(CH$_2$)$_{n1}$—]$_{n2}$—OH, —COOH, —(CH$_2$)$_n$—COOH, —O—(CH$_2$)$_n$—COOH or —[O—(CH$_2$)$_{n1}$—]$_{n2}$—COOH, in which n, n1 and n2 are independently an integer from 1 to 12, and preferably 1, 2, 3 or 4.

From a viewpoint of high solubility in the liquid crystal composition, R$^2$ is particularly preferably —OH or —NH$_2$. Then, —OH has high anchor force, and therefore is preferred to —O—, —CO— or —COO—. A group having a plurality of hetero atoms (nitrogen, oxygen) is particularly preferred. A compound having such a polar group is effective even at a low concentration.

R$^1$ is hydrogen, fluorine, chlorine or alkyl having 1 to 25 carbons, and in the alkyl, at least one piece of —CH$_2$— may be replaced by —NR$^0$—, —O—, —S—, —CO—, —CO—O—, —O—CO—, —O—CO—O— or cycloalkylene having 3 to 8 carbons, and at least one tertiary carbon (>CH—) may be replaced by nitrogen (>N—), and in the groups, at least one hydrogen may be replaced by fluorine or chlorine, in which R$^0$ is hydrogen or alkyl having 1 to 12 carbons. Preferred R$^1$ is alkyl having 1 to 25 carbons.

P$^1$, P$^2$ and P$^3$ are independently a polymerizable group. Preferred P$^1$, P$^2$ or P$^3$ is a group selected from the group of polymerizable groups represented by formula (P-1) to formula (P-5). Further preferred P$^1$, P$^2$ or P$^3$ is a group represented by formula (P-1), formula (P-2) or formula (P-3). Particularly preferred P$^1$, P$^2$ or P$^3$ is a group represented by formula (P-1) or formula (P-2). Most preferred P$^1$, P$^2$ or P$^3$ is a group represented by formula (P-1). A preferred group represented by formula (P-1) is —OCO—CH=CH$_2$ or —OCO—C(CH$_3$)=CH$_2$. A wavy line in formula (P-1) to formula (P-5) shows a site to which bonding is made.

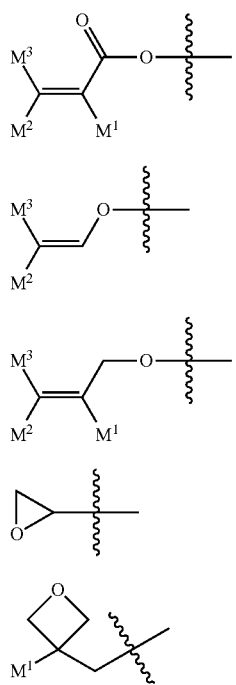

In formula (P-1) to formula (P-5), M$^1$, M$^2$ and M$^3$ are independently hydrogen, fluorine, alkyl having 1 to 5 carbons, or alkyl having 1 to 5 carbons in which at least one hydrogen is replaced by fluorine or chlorine. Preferred M$^1$, M$^2$ or M$^3$ is hydrogen or methyl for increasing reactivity. Further preferred M$^1$ is hydrogen or methyl, and further preferred M$^2$ or M$^3$ is hydrogen.

Sp$^1$, Sp$^2$ and Sp$^3$ are independently a single bond or alkylene having 1 to 10 carbons, and in the alkylene, at least one piece of —CH$_2$— may be replaced by —O—, —COO—, —OCO— or —OCOO—, and at least one piece of —CH$_2$—CH$_2$— may be replaced by —CH=CH— or —C≡C—, and in the groups, at least one hydrogen may be replaced by fluorine or chlorine. Preferred Sp$^1$, Sp$^2$ or Sp$^3$ is a single bond, —CH$_2$CH$_2$—, —CH$_2$O—, —OCH$_2$—, —COO—, —OCO—, —CO—CH=CH— or —CH=CH—O—. Further preferred Sp$^1$, Sp$^2$ or Sp$^3$ are a single bond. However, when ring A and ring C are phenyl, Sp$^1$ and Sp$^3$ are a single bond.

Ring A, ring B and ring C are independently 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine. Preferred ring A, ring B or ring C is 1,4-phenylene or 2-fluoro-1,4-phenylene.

Z$^1$ and Z$^2$ are independently a single bond or alkylene having 1 to 10 carbons, and in the alkylene, at least one piece of —CH$_2$— may be replaced by —O—, —CO—, —COO— or —OCO—, and at least one piece of —CH$_2$—CH$_2$— may be replaced by —CH=CH—, —C(CH$_3$)=CH—, —CH=C(CH$_3$)— or —C(CH$_3$)=C(CH$_3$)—, and in the groups, at least one hydrogen may be replaced by fluorine or chlorine. Preferred Z$^1$ or Z$^2$ is a single bond, —CH$_2$CH$_2$—, —CH$_2$O—, —OCH$_2$—, —COO— or —OCO—. Further preferred Z$^1$ or Z$^2$ is a single bond.

Then, a and b are independently 0, 1, 2, 3 or 4, and a sum of a and b is 0, 1, 2, 3 or 4. Preferred a or b is 0, 1 or 2. Then, c and e are independently 0, 1, 2, 3 or 4. Preferred c or e is 1 or 2. Then, d is 1, 2, 3 or 4. Preferred d is 1 or 2.

An aromatic group refers to aryl or substituted aryl. Heteroaryl represents an aromatic group having at least one hetero atom. Aryl and heteroaryl may be either monocyclic or polycyclic. More specifically, the above groups have at least one ring, the ring may be condensed (for example, naphthyl), two rings may be linked by a covalent bond (for example, biphenyl), or may have a combination of a condensed ring and a linked ring. Preferred heteroaryl has at least one hetero atom selected from the group of nitrogen, oxygen, sulfur and phosphorus.

Preferred aryl or heteroaryl may have 6 to 25 carbons, and may be a five-membered ring, a six-membered ring or a seven-membered ring. Preferred aryl or heteroaryl may be monocyclic, bicyclic or tricyclic. The above groups may be a condensed ring, or may be substituted.

Preferred aryl is a monovalent group derived therefrom by eliminating one hydrogen from benzene, biphenyl, terphenyl, [1,1':3',1"]terphenyl, naphthalene, anthracene, binaphtyl, phenanthrene, pyrene, dihydropyrene, chrysene, perylene, tetracene, pentacene, benzopyrene, fluorene, indene, indenofluorene and spirobifluorene.

Preferred heteroaryl is a monovalent group derived therefrom by eliminating one hydrogen from a five-membered ring compound such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole and 1,3,4-thiadiazole, or from a six-membered ring compound such as pyridine, pyridazine, pyrimidine, pyrazine, 1,3,5-triazine, 1,2,4-triazine, 1,2,3-triazine, 1,2,4,5-tetrazine, 1,2,3,4-tetrazine and 1,2,3,5-tetrazine.

Preferred heteroaryl is also a monovalent group derived therefrom by eliminating one hydrogen from a condensed ring compound such as indole, isoindole, indolizine, indazole, benzoimidazole, benzotriazol, purine, naphthimidazole, phenanthreneimidazole, pyridaimidazole, pyrazineimidazole, quinoxalineimidazole, benzoxazole, naphthaxazole, antroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene and benzothiadiazothiophene. Preferred heteroaryl is also a monovalent group derived therefrom by eliminating one hydrogen from a ring obtained by combining two groups selected from the five-membered ring, the six-membered ring and the condensed ring. The heteroaryl may be replaced by alkyl, alkoxy, thioalkyl, fluorine, fluoroalkyl, aryl or heteroaryl.

An alicyclic group may be saturated or may be unsaturated. More specifically, the above groups may have only a single bond or may have a combination of a single bond and a multiple bond. A saturated ring is preferred to an unsaturated ring.

An alicyclic group may have one ring, or a plurality of rings. Preferred examples of the groups include a monocyclic ring, a bicyclic ring or a tricyclic ring each having 3 to 25 carbons, and the groups may be a condensed ring or may be substituted. Preferred examples of the groups include a five-membered ring, a six-membered ring, a seven-membered ring or an eight-membered ring, and in the groups, at least one carbon may be replaced by silicon, at least one piece of >CH— may be replaced by >N—, and at least one piece of —CH$_2$— may be replaced by —O— or —S—.

A preferred alicyclic group is a divalent group derived therefrom by eliminating two hydrogens from a five-membered ring such as cyclopentane, tetrahydrofuran, tetrahydrothiofuran and pyrrolidine; a six-membered ring such as cyclohexane, cyclohexene, tetrahydropyran, tetrahydrothiopyran, 1,3-dioxane, 1,3-dithian and piperidine; a seven-membered ring such as cycloheptane; and a condensed ring such as tetrahydronaphthalene, decahydronaphthalene, indan, bicyclo[1.1.1]pentane, bicyclo[2.2.2]octane, Spiro[3.3]heptane and octahydro-4,7-methanoindan.

In formula (1-1) to formula (1-15), Sp$^8$ is a single bond, alkylene having 1 to 5 carbons, or alkylene having 1 to 5 carbons in which one piece of —CH$_2$— is replaced by —O—. L$^1$, L$^2$, L$^3$ and L$^4$ are independently hydrogen, fluorine, methyl or ethyl. R$^7$ and R$^8$ are independently hydrogen or methyl.

In formula (2) and formula (3), R$^3$ and R$^4$ are independently alkyl having 1 to 12 carbons, alkoxy having 1 to 12 carbons, alkenyl having 2 to 12 carbons or alkenyloxy having 2 to 12 carbons. Preferred R$^3$ or R$^4$ is alkyl having 1 to 12 carbons for increasing the stability, and alkoxy having 1 to 12 carbons for increasing the dielectric anisotropy. R$^5$ and R$^6$ are independently alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine. Preferred R$^5$ or R$^6$ is alkenyl having 2 to 12 carbons for decreasing the viscosity, and alkyl having 1 to 12 carbons for increasing the stability. Alkyl of the liquid crystal compound is straight-chain alkyl or branched-chain alkyl, but includes no cyclic alkyl. Straight-chain alkyl is preferred to branched-chain alkyl. A same rule applies also to a terminal group such as alkoxy and alkenyl.

Preferred alkyl is methyl, ethyl, propyl, butyl, pentyl, hexyl, heptyl or octyl. Further preferred alkyl is ethyl, propyl, butyl, pentyl or heptyl for decreasing the viscosity.

Preferred alkoxy is methoxy, ethoxy, propoxy, butoxy, pentyloxy, hexyloxy or heptyloxy. Further preferred alkoxy is methoxy or ethoxy for decreasing the viscosity.

Preferred alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. Further preferred alkenyl is vinyl, 1-propenyl, 3-butenyl or 3-pentenyl for decreasing the viscosity. A preferred configuration of —CH=CH— in the alkenyl depends on a position of a double bond. Trans is preferred in alkenyl such as 1-propenyl, 1-butenyl, 1-pentenyl, 1-hexenyl, 3-pentenyl and 3-hexenyl for decreasing the viscosity, for instance. Cis is preferred in alkenyl such as 2-butenyl, 2-pentenyl and 2-hexenyl.

Preferred alkenyloxy is vinyloxy, allyloxy, 3-butenyloxy, 3-pentenyloxy or 4-pentenyloxy. Further preferred alkenyloxy is allyloxy or 3-butenyloxy for decreasing the viscosity.

Specific examples of preferred alkyl in which at least one hydrogen is replaced by fluorine or chlorine include fluoromethyl, 2-fluoroethyl, 3-fluoropropyl, 4-fluorobutyl, 5-fluoropentyl, 6-fluorohexyl, 7-fluoroheptyl or 8-fluorooctyl. Further preferred examples include 2-fluoroethyl, 3-fluoropropyl, 4-fluorobutyl or 5-fluoropentyl for increasing the dielectric anisotropy.

Specific examples of preferred alkenyl in which at least one hydrogen is replaced by fluorine or chlorine include 2,2-difluorovinyl, 3,3-difluoro-2-propenyl, 4,4-difluoro-3-butenyl, 5,5-difluoro-4-pentenyl or 6,6-difluoro-5-hexenyl. Further preferred examples include 2,2-difluorovinyl or 4,4-difluoro-3-butenyl for decreasing the viscosity.

Ring D and ring F are independently 1,4-cyclohexylene, 1,4-cyclohexenylene, 1,4-phenylene, 1,4-phenylene in which at least one hydrogen is replaced by fluorine or chlorine, or tetrahydropyran-2,5-diyl. Specific examples of preferred "1,4-phenylene in which at least one hydrogen is replaced by fluorine or chlorine" include 2-fluoro-1,4-phenylene, 2,3-difluoro-1,4-phenylene or 2-chloro-3-fluoro-1,4-phenylene. Preferred ring D or ring F is 1,4-cyclohexylene for decreasing the viscosity, tetrahydropyran-2,5-diyl for increasing the dielectric anisotropy, and 1,4-phenylene for increasing the optical anisotropy. With regard to a configuration of 1,4-cyclohexylene, trans is preferred to cis for increasing the maximum temperature. Tetrahydropyran-2,5-diyl includes:

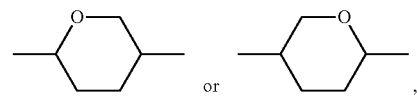

preferably

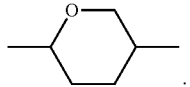

Ring E is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl. Preferred ring E is 2,3-difluoro-1,4-phenylene for decreasing the viscosity, 2-chloro-3-fluoro-1,4-phenylene for decreasing the optical anisotropy, and 7,8-difluorochroman-2,6-diyl for increasing the dielectric anisotropy.

Ring G and ring I are independently 1,4-cyclohexylene, 1,4-phenylene, 2-fluoro-1,4-phenylene or 2,5-difluoro-1,4-phenylene. Preferred ring G or ring I is 1,4-cyclohexylene for decreasing the viscosity or increasing the maximum temperature, and 1,4-phenylene for decreasing the minimum temperature. With regard to a configuration of 1,4-cyclohexylene, trans is preferred to cis for increasing the maximum temperature.

$Z^3$, $Z^4$ and $Z^5$ are independently a single bond, —CH$_2$CH$_2$—, —CH$_2$O—, —OCH$_2$—, —COO— or —OCO—. Preferred $Z^3$ or $Z^4$ is a single bond for decreasing the viscosity, —CH$_2$CH$_2$— for decreasing the minimum temperature, and —CH$_2$O— or —OCH$_2$— for increasing the dielectric anisotropy. Preferred $Z^5$ is a single bond for decreasing the viscosity, —CH$_2$CH$_2$— for decreasing the minimum temperature, and —COO— or —OCO— for increasing the maximum temperature.

Then f is 1, 2 or 3, g is 0 or 1, and a sum of f and g is 3 or less. Preferred f is 1 for decreasing the viscosity, and 2 or 3 for increasing the maximum temperature. Preferred g is 0 for decreasing the viscosity, and 1 for decreasing the minimum temperature. Then, h is 1, 2 or 3. Preferred h is 1 for decreasing the viscosity, and 2 or 3 for increasing the maximum temperature.

In formula (4), $P^4$, $P^5$ and $P^6$ are independently a polymerizable group. Preferred $P^4$, $P^5$ or $P^6$ is a group selected from the group of polymerizable groups represented by formula (P-1) to formula (P-5). Further preferred $P^4$, $P^5$ or $P^6$ is a group represented by formula (P-1), formula (P-2) or formula (P-3). Particularly preferred $P^4$, $P^5$ or $P^6$ is a group represented by formula (P-1) or formula (P-2). Most preferred $P^4$, $P^5$ or $P^6$ is a group represented by formula (P-1). A preferred group represented by formula (P-1) is —OCO—CH=CH$_2$ or —OCO—C(CH$_3$)=CH$_2$. A wavy line in formula (P-1) to formula (P-5) shows a site to which bonding is made.

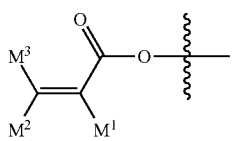

(P-1)

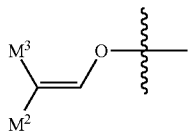

(P-2)

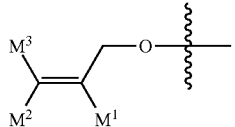

(P-3)

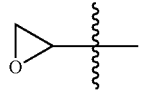

(P-4)

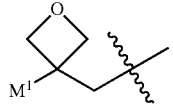

(P-5)

In formula (P-1) to formula (P-5), $M^1$, $M^2$ and $M^3$ are independently hydrogen, fluorine, alkyl having 1 to 5 carbons, or alkyl having 1 to 5 carbons in which at least one hydrogen is replaced by fluorine or chlorine. Preferred $M^1$, $M^2$ or $M^3$ is hydrogen or methyl for increasing reactivity. Further preferred $M^1$ is hydrogen or methyl, and further preferred $M^2$ or $M^3$ is hydrogen.

$Sp^9$, $Sp^{10}$ and $Sp^{11}$ are independently a single bond or alkylene having 1 to 10 carbons, and in the alkylene, at least one piece of —CH$_2$— may be replaced by —O—, —COO—, —OCO— or —OCOO—, and at least one piece of —CH$_2$CH$_2$— may be replaced by —CH=CH— or —C≡C—, and in the groups, at least one hydrogen may be replaced by fluorine or chlorine. Preferred $Sp^9$, $Sp^{10}$ or $Sp^{11}$ is a single bond, —CH$_2$CH$_2$—, —CH$_2$O—, —OCH$_2$—, —COO—, —OCO—, —CO—CH=CH— or —CH=CH—CO—. Further preferred $Sp^9$, $Sp^{10}$ or $Sp^{11}$ is a single bond.

Ring J and ring P are independently cyclohexyl, cyclohexenyl, phenyl, 1-naphthyl, 2-naphthyl, tetrahydropyran-2-yl, 1,3-dioxane-2-yl pyrimidine-2-yl or pyridine-2-yl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine. Preferred ring J or ring P is phenyl. Ring K is 1,4-cyclohexylene, 1,4-cyclohexenylene 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl naphthalene-2,7-diyl, tetrahydropyran-2,5-diyl, 1,3-dioxane-2,5-diyl, pyrimidine-2,5-diyl or pyridine-2,5-diyl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine. Preferred ring K is 1,4-phenylene or 2-fluoro-1,4-phenylene.

$Z^6$ and $Z^8$ are independently a single bond or alkylene having 1 to 10 carbons, and in the alkylene, at least one piece of —CH$_2$— may be replaced by —O—, —CO—, —COO— or —OCO—, and at least one piece of —CH$_2$CH$_2$— may be replaced by —CH=CH—, —C(CH$_3$)=CH—, —CH=C(CH$_3$)— or —C(CH$_3$)=C(CH$_3$)—, and in the groups, at least one hydrogen may be replaced by fluorine or chlorine. Preferred $Z^6$ or $Z^8$ is a single bond, —CH$_2$CH$_2$—, —CH$_2$O—, —OCH$_2$—, —COO— or —OCO—. Further preferred $Z^6$ or $Z^8$ is a single bond.

Then, q is 0, 1 or 2. Preferred q is 0 or 1. Then, j, k and p are independently 0, 1, 2, 3 or 4, and a sum of j, k and p is 1 or more. Preferred j, k or p is 1 or 2.

Fifth, the preferred component compound will be described. Preferred compound (1) includes compound (1-1) to compound (1-15) described in item 4. In the compounds, at least one of the first additives preferably includes compound (1-6), compound (1-8), compound (1-10), compound (1-11), compound (1-13) or compound (1-15). At least two of the first additives preferably include a combination of compound (1-1) and compound (1-11) or a combination of compound (1-3) and compound (1-8).

Preferred compound (2) includes compound (2-1) to compound (2-21) described in item 7. In the compounds, at least one of the first components preferably includes compound (2-1), compound (2-3), compound (2-4), compound (2-6), compound (2-8) or compound (2-10). At least two of the first components preferably include a combination of compound (2-1) and compound (2-6), a combination of compound (2-1) and compound (2-10), a combination of compound (2-3) and compound (2-6), a combination of compound (2-3) and compound (2-10), a combination of compound (2-4) and compound (2-6) or a combination of compound (2-4) and compound (2-8).

Preferred compound (3) includes compound (3-1) to compound (3-13) described in item 10. In the compounds, at least one of the second components preferably includes compound (3-1), compound (3-3), compound (3-5), compound (3-6), compound (3-8) or compound (3-9). At least two of the second components preferably include a combination of compound (3-1) and compound (3-3), a combination of compound (3-1) and compound (3-5) or a combination of compound (3-1) and compound (3-6).

Preferred compound (4) includes compound (4-1) to compound (4-28) described in item 14. In the compounds, at least one of the second additives preferably includes compound (4-1), compound (4-2), compound (4-24), compound (4-25), compound (4-26) or compound (4-27). At least two of the second additives preferably include a combination of compound (4-1) and compound (4-2), a combination of compound (4-1) and compound (4-18), a combination of compound (4-2) and compound (4-24), a combination of compound (4-2) and compound (4-25), a combination of compound (4-2) and compound (4-26), a combination of compound (4-25) and compound (4-26) or a combination of compound (4-18) and compound (4-24).

Sixth, the additive that may be added to the composition will be described. Such an additive includes the optically active compound, the antioxidant, the ultraviolet light absorber, the dye, the antifoaming agent, the polymerizable compound, the polymerization initiator, the polymerization inhibitor and the polar compound. The optically active compound is added to the composition for the purpose of inducing a helical structure in liquid crystal molecules to give a twist angle. Examples of such a compound include compound (5-1) to compound (5-5). A preferred proportion of the optically active compound is about 5% by weight or less. A further preferred proportion is in the range of about 0.01% by weight to about 2% by weight.

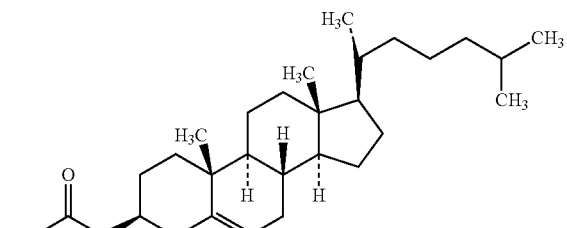

(5-1)

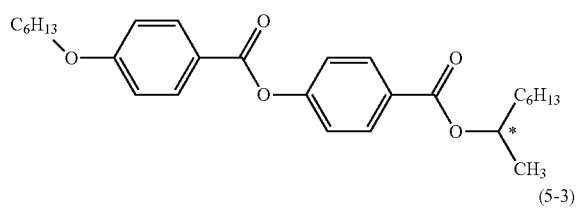

(5-2)

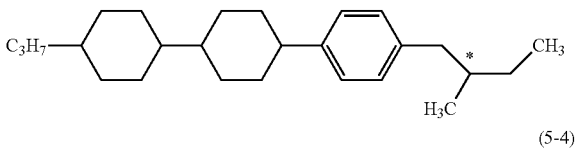

(5-3)

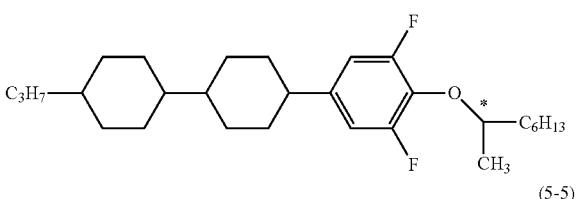

(5-4)

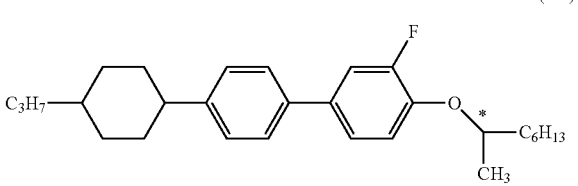

(5-5)

The antioxidant is added to the composition for preventing a decrease in the specific resistance caused by heating in air, or for maintaining a large voltage holding ratio at room temperature and also at a temperature close to the maximum temperature even after the device has been used for a long period of time. Specific examples of a preferred antioxidant include compound (6) in which n is an integer from 1 to 9.

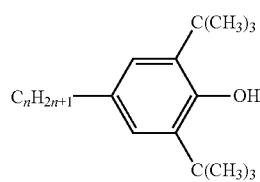

(6)

In compound (6), preferred n is 1, 3, 5, 7 or 9. Further preferred n is 7. Compound (6) in which n is 7 is effective in maintaining a large voltage holding ratio at room temperature and also at a temperature close to the maximum temperature even after the device has been used for a long period of time because such compound (6) has small volatility. A preferred proportion of the antioxidant is about 50 ppm or more for achieving an effect thereof, and about 600 ppm or less for avoiding a decrease in the maximum temperature or an increase in the minimum temperature. A further preferred proportion is in the range of about 100 ppm to about 300 ppm.

Specific examples of a preferred ultraviolet light absorber include a benzophenone derivative, a benzoate derivative and a triazole derivative. A light stabilizer such as an amine having steric hindrance is also preferred. A preferred proportion of the absorber or the stabilizer is about 50 ppm or more for achieving an effect thereof, and about 10,000 ppm or less for avoiding a decrease in the maximum temperature or an increase in the minimum temperature. A further preferred proportion is in the range of about 100 ppm to about 10,000 ppm.

A dichroic dye such as an azo dye or an anthraquinone dye is added to the composition to be adapted for a device having a guest host (GH) mode. A preferred proportion of the dye is in the range of about 0.01% by weight to about 10% by weight. The antifoaming agent such as dimethyl silicone oil or methyl phenyl silicone oil is added to the composition for preventing foam formation. A preferred proportion of the antifoaming agent is about 1 ppm or more for achieving an effect thereof, and about 1,000 ppm or less for preventing poor display. A further preferred proportion is in the range of about 1 ppm to about 500 ppm.

The polymerizable compound is used to be adapted for a polymer sustained alignment (PSA) mode device. Compound (1) and compound (4) are suitable for the purpose. Any other polymerizable compound that is different from compound (1) and compound (4) may be added to the composition together with compound (1) and compound (4). Specific examples of any other preferred polymerizable compound include a compound such as acrylate, methacrylate, a vinyl compound, a vinyloxy compound, propenyl ether, an epoxy compound (oxirane, oxetane) and vinyl ketone. Further preferred examples include acrylate or methacrylate. A preferred proportion of compound (1) and compound (4) is about 10% by weight or more based on the total weight of the polymerizable compound. A further preferred proportion is about 50% by weight or more. A particularly preferred proportion is about 80% by weight or more. A particularly preferred proportion is also 100% by weight. Reactivity of the polymerizable compound and a pretilt angle of liquid crystal molecules can be adjusted by changing a kind of compound (1) and compound (4), or by combining any other polymerizable compound with compound (1) and compound (4) at a suitable ratio. A short response time in the device can be achieved by optimizing the pretilt angle. A large contrast ratio and a long service life can be achieved because alignment of the liquid crystal molecules is stabilized.

The polymerizable compound such as compound (1) and compound (4) is polymerized by irradiation with ultraviolet light. The polymerizable compound may be polymerized in the presence of a suitable initiator such as a photopolymerization initiator. Suitable conditions for polymerization, suitable types of the initiator and suitable amounts thereof are known to those skilled in the art and are described in literature. For example, Irgacure 651 (registered trademark; BASF), Irgacure 184 (registered trademark; BASF) or Darocur 1173 (registered trademark; BASF), each being a photopolymerization initiator, is suitable for radical polymerization. A preferred proportion of the photopolymerization initiator is in the range of about 0.1% by weight to about 5% by weight based on the total weight of the polymerizable compound. A further preferred proportion is in the range of about 1% by weight to about 3% by weight.

Upon storing the polymerizable compound such as compound (1) and compound (4), the polymerization inhibitor may be added thereto for preventing polymerization. The polymerizable compound is ordinarily added to the composition without removing the polymerization inhibitor. Specific examples of the polymerization inhibitor include hydroquinone, a hydroquinone derivative such as methylhydroquinone, 4-t-butylcatechol, 4-methoxyphenol and phenothiazine.

Seventh, the methods for synthesizing the component compounds will be described. The compounds can be prepared according to known methods. Examples of the synthetic methods are described. A method for synthesizing compound (1) are described in a section of Examples. Compound (2-1) is prepared according to a method described in JP H2-503441 A. Compound (3-5) is prepared according to a method described in JP S57-165328 A. Compound (4-18) is prepared according to a method described in JP H7-101900 A. Some of compound (6) is commercially available. A compound in which n in formula (6) is 1 is available from Sigma-Aldrich Corporation. Compound (6) in which n is 7 or the like is prepared according to a method described in U.S. Pat. No. 3,660,505 B.

Any compounds whose synthetic methods are not described above can be prepared according to the methods described in books such as Organic Syntheses (John Wiley & Sons, Inc., Organic Reactions (John Wiley & Sons, Inc., Comprehensive Organic Synthesis (Pergamon Press) and New Experimental Chemistry Course (Shin Jikken Kagaku Koza in Japanese) (Maruzen Co., Ltd.). The composition is prepared according to a publicly known method using the thus obtained compounds. For example, the component compounds are mixed and dissolved in each other by heating.

Last, the application of the composition will be described. Most of the compositions have a minimum temperature of about −10° C. or lower, a maximum temperature of about 70° C. or higher, and optical anisotropy in the range of about 0.07 to about 0.20. A composition having optical anisotropy in the range of about 0.08 to about 0.25 may be prepared by controlling the proportion of the component compounds or by mixing any other liquid crystal compound. Further, a composition having optical anisotropy in the range of about 0.10 to about 0.30 may be prepared by trial and error. A device including the composition has the large voltage holding ratio. The composition is suitable for use in the AM device. The composition is particularly suitable for use in a transmissive AM device. The composition can be used as the composition having the nematic phase, or as the optically active composition by adding the optically active compound.

The composition can be used in the AM device. The composition can also be used in a PM device. The composition can also be used in an AM device and a PM device each having a mode such as the PC mode, the TN mode, the STN mode, the ECB mode, the OCB mode, the IPS mode, the FFS mode, the VA mode and the FPA mode. Use in an AM device having the TN mode, the OCB mode, the IPS mode or the FFS mode is particularly preferred. In the AM device having the IPS mode or the FFS mode, alignment of liquid crystal molecules when no voltage is applied may be parallel or perpendicular to a glass substrate. The devices may be of a reflective type, a transmissive type or a transflective type. Use in the transmissive device is preferred. The composition can also be used in an amorphous silicon-TFT device or a polycrystal silicon-TFT device. The composition can also be used in a nematic curvilinear aligned phase (NCAP) device prepared by microencapsulating the composition, or a polymer dispersed (PD) device in which a three-dimensional network-polymer is formed in the composition.

One example of a conventional method of producing the polymer sustained alignment mode device is as described below. A device having two substrates referred to as an array substrate and a color filter substrate is assembled. The substrates each have an alignment film. At least one of the substrates has an electrode layer. A liquid crystal compound is mixed to prepare a liquid crystal composition. A polymerizable compound is added to the composition. An additive may be further added thereto when necessary. The composition is injected into the device. The device is irradiated with light while voltage is applied to the device. Ultraviolet light is preferred. A polymerizable compound is polymerized by irradiation with light. A composition containing a polymer is formed by the polymerization. The polymer sustained alignment mode device is produced by such a procedure.

In the above procedure, when voltage is applied, liquid crystal molecules are aligned by action of an electric field. Molecules of the polymerizable compound are also aligned according to the above alignment. The polymerizable compound is polymerized by ultraviolet light in the above state, and therefore a polymer in which the alignment is maintained is formed. A response time in the device is shortened by an effect of the polymer. Image persistence is caused by poor operation of the liquid crystal molecules, and therefore is also simultaneously improved by the effect of the polymer. In addition, the polymerizable compound in the composition can be polymerized in advance, and the composition can also be arranged between the substrates of the liquid crystal display device.

Upon using a polar compound having a polymerizable group, such as compound (1), the alignment film is unnecessary in the substrates of the device. A device having no alignment film is produced from a substrate having no alignment film according to a procedure described two paragraphs above.

In the procedure, compound (1) is arranged on the substrate because a polar group interacts with a substrate surface. Liquid crystal molecules are aligned according to the above arrangement. When voltage is applied, the alignment of the liquid crystal molecules is further promoted. The polymerizable group is polymerized by ultraviolet light in the above state, and therefore a polymer in which the alignment is maintained is formed. The alignment of the liquid crystal molecules is additionally stabilized by an effect of the polymer, and a response time in the device is shortened. Image persistence is caused by poor operation of the liquid crystal molecules, and therefore is also simultaneously improved by the effect of the polymer.

EXAMPLES

The invention will be described in greater detail by way of Examples. The invention is not limited by the Examples. The invention includes a mixture of composition M1 and composition M2. The invention also includes a mixture prepared by mixing at least two of compositions in Examples. A compound prepared was identified by methods such as an NMR analysis. Characteristics of the compound, the composition and a device were measured by methods described below.

NMR analysis: For measurement, DRX-500 made by Bruker BioSpin Corporation was used. In $^1$H-NMR measurement, a sample was dissolved in a deuterated solvent such as $CDCl_3$, and measurement was carried out under conditions of room temperature, 500 MHz and 16 times of accumulation. Tetramethylsilane was used as an internal standard. In $^{19}$F-NMR measurement, $CFCl_3$ was used as an internal standard, and measurement was carried out under conditions of 24 times of accumulation. In explaining nuclear magnetic resonance spectra obtained, s, d, t, q, quin, sex and m stand for a singlet, a doublet, a triplet, a quartet, a quintet, a sextet and a multiplet, and br being broad, respectively.

Gas chromatographic analysis: For measurement, GC-14B Gas Chromatograph made by Shimadzu Corporation was used. A carrier gas was helium (2 mL per minute). A sample vaporizing chamber and a detector (FID) were set to 280° C. and 300° C., respectively. A capillary column DB-1 (length 30 m, bore 0.32 mm, film thickness 0.25 μm; dimethylpolysiloxane as a stationary liquid phase; non-polar) made by Agilent Technologies, Inc. was used for separation of component compounds. After the column was kept at 200° C. for 2 minutes, the column was heated to 280° C. at a rate of 5° C. per minute. A sample was prepared in an acetone solution (0.1% by weight), and then 1 microliter of the solution was injected into the sample vaporizing chamber. A recorder was C-R5A Chromatopac made by Shimadzu Corporation or the equivalent thereof. The resulting gas chromatogram showed a retention time of a peak and a peak area corresponding to each of the component compounds.

As a solvent for diluting the sample, chloroform, hexane or the like may also be used. The following capillary columns may also be used for separating component compounds: HP-1 (length 30 m, bore 0.32 mm, film thickness 0.25 μm) made by Agilent Technologies, Inc., Rtx-1 (length 30 m, bore 0.32 mm, film thickness 0.25 μm) made by Restek Corporation and BP-1 (length 30 m, bore 0.32 mm, film thickness 0.25 μm) made by SGE International Pty. Ltd. A capillary column CBP1-M50-025 (length 50 m, bore 0.25 mm, film thickness 0.25 μm) made by Shimadzu Corporation may also be used for the purpose of preventing an overlap of peaks of the compounds.

A proportion of liquid crystal compounds contained in the composition may be calculated by a method as described below. A mixture of liquid crystal compounds is analyzed by gas chromatograph (FID). An area ratio of each peak in the gas chromatogram corresponds to the ratio of the liquid crystal compounds. When the capillary columns described above were used, a correction coefficient of each of the liquid crystal compounds may be regarded as 1 (one). Accordingly, the proportion (% by weight) of the liquid crystal compounds can be calculated from the area ratio of each peak.

Sample for measurement: When characteristics of the composition and the device were measured, the composition was used as a sample as was. Upon measuring characteristics of a compound, a sample for measurement was prepared by mixing the compound (15% by weight) with a base liquid crystal (85% by weight). Values of characteristics of the compound were calculated, according to an extrapolation method, using values obtained by measurement. (Extrapolated value)={(measured value of a sample)−0.85×(measured value of a base liquid crystal)}/0.15. When a smectic phase (or crystals) precipitated at the ratio thereof at 25° C., a ratio of the compound to the base liquid crystal was changed step by step in the order of (10% by weight:90% by weight), (5% by weight:95% by weight) and (1% by weight: 99% by weight). Values of maximum temperature, optical anisotropy, viscosity and dielectric anisotropy with regard to the compound were determined according to the extrapolation method.

A base liquid crystal described below was used. A proportion of the component compound was expressed in terms of weight percent (% by weight).

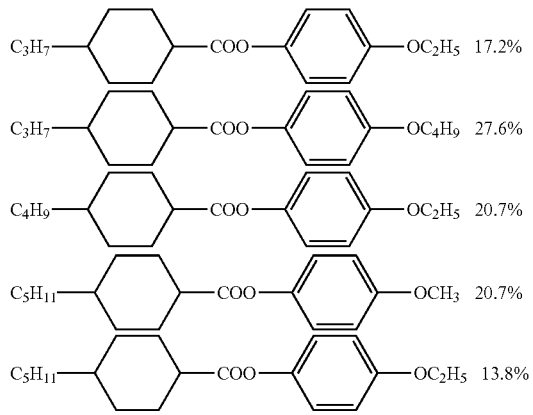

Measuring method: Characteristics were measured according to methods described below. Most of the methods are described in the Standard of Japan Electronics and Information Technology Industries Association (hereinafter, abbreviated as JEITA) discussed and established in JEITA (JEITA ED-2521B), or a modification of the methods was also used. No thin film transistor (TFT) was attached to a TN device used for measurement.

(1) Maximum temperature of nematic phase (NI; ° C.): A sample was placed on a hot plate in a melting point apparatus equipped with a polarizing microscope, and heated at a rate of 1° C. per minute. Temperature when part of the sample began to change from a nematic phase to an isotropic liquid was measured. A maximum temperature of the nematic phase may be occasionally abbreviated as "maximum temperature."

(2) Minimum temperature of nematic phase ($T_c$; ° C.): Samples each having a nematic phase were put in glass vials and kept in freezers at temperatures of 0° C., −10° C., −20° C., −30° C. and −40° C. for 10 days, and then liquid crystal phases were observed. For example, when the sample was maintained in the nematic phase at −20° C. and changed to crystals or a smectic phase at −30° C., $T_c$ was expressed as $T_c$<−20° C. A minimum temperature of the nematic phase may be occasionally abbreviated as "minimum temperature."

(3) Viscosity (bulk viscosity; η; measured at 20° C.; mPa·s): For measurement, a cone-plate (E type) rotational viscometer made by Tokyo Keiki Inc. was used.

(4) Viscosity (rotational viscosity; γ1; measured at 25° C.; mPa·s): Measurement was carried out according to a method described in M. Imai et al., Molecular Crystals and Liquid Crystals, Vol. 259, p. 37 (1995). A sample was injected into a VA device in which a distance (cell gap) between two glass substrates was 20 micrometers. Voltage was applied stepwise to the device in the range of 39 V to 50 V at an increment of 1 V. After a period of 0.2 second with no voltage application, voltage was repeatedly applied under conditions of only one rectangular wave (rectangular pulse; 0.2 second) and no voltage application (2 seconds). A peak current and a peak time of transient current generated by the applied voltage were measured. A value of rotational viscosity was obtained from the measured values and calculation equation (8) described on page 40 of the paper presented by M. Imai et al. Dielectric anisotropy required for the calculation was measured according to a method described in measurement (6).

(5) Optical anisotropy (refractive index anisotropy; Δn; measured at 25° C.): Measurement was carried out by an Abbe refractometer with a polarizing plate mounted on an ocular, using light at a wavelength of 589 nanometers. A surface of a main prism was rubbed in one direction, and then a sample was added dropwise onto the main prism. A refractive index (n∥) was measured when a direction of polarized light was parallel to a direction of rubbing. A refractive index (n⊥) was measured when the direction of polarized light was perpendicular to the direction of rubbing. A value of optical anisotropy was calculated from an equation: Δn=n∥−n⊥.

(6) Dielectric anisotropy (Δε; measured at 25° C.): A value of dielectric anisotropy was calculated from an equation: Δε=ε∥−ε⊥. A dielectric constant (ε∥ and ε⊥) was measured as described below.

(1) Measurement of dielectric constant (ε∥): An ethanol (20 mL) solution of octadecyltriethoxysilane (0.16 mL) was applied to a well-cleaned glass substrate. After rotating the glass substrate with a spinner, the glass substrate was heated at 150° C. for 1 hour. A sample was put in a VA device in which a distance (cell gap) between two glass substrates was 4 micrometers, and the device was sealed with an ultraviolet-curable adhesive. Sine waves (0.5 V, 1 kHz) were applied to the device, and after 2 seconds, a dielectric constant (ε∥) of liquid crystal molecules in a major axis direction was measured.

(2) Measurement of dielectric constant (ε⊥): A polyimide solution was applied to a well-cleaned glass substrate. After calcining the glass substrate, rubbing treatment was applied to the alignment film obtained. A sample was injected into a TN device in which a distance (cell gap) between two glass substrates was 9 micrometers and a twist angle was 80 degrees. Sine waves (0.5 V, 1 kHz) were applied to the device, and after 2 seconds, a dielectric constant (ε⊥) of liquid crystal molecules in a minor axis direction was measured.

(7) Threshold voltage (Vth; measured at 25° C.; V): For measurement, an LCD-5100 luminance meter made by Otsuka Electronics Co., Ltd. was used. A light source was a halogen lamp. A sample was put in a normally black mode VA device in which a distance (cell gap) between two glass substrates was 4 micrometers and a rubbing direction was anti-parallel, and the device was sealed with an ultraviolet-curable adhesive. A voltage (60 Hz, rectangular waves) to be applied to the device was stepwise increased from 0 V to 20 V at an increment of 0.02 V. On the occasion, the device was irradiated with light from a direction perpendicular to the device, and an amount of light transmitted through the device was measured. A voltage-transmittance curve was prepared, in which the maximum amount of light corresponds to 100% transmittance and the minimum amount of light corresponds to 0% transmittance. A threshold voltage is expressed in terms of voltage at 10%; transmittance.

(8) Voltage holding ratio (VHR-1; measured at 25° C.; %): A TN device used for measurement had a polyimide alignment film, and a distance (cell gap) between two glass substrates was 5 micrometers. A sample was injected into the device, and then the device was sealed with an ultraviolet-curable adhesive. A pulse voltage (60 microseconds at 5 V)

was applied to the TN device, and the device was charged. A decaying voltage was measured for 16.7 milliseconds with a high-speed voltmeter, and area A between a voltage curve and a horizontal axis in a unit cycle was determined. Area B is an area without decay. A voltage holding ratio is expressed in terms of a percentage of area A to area B.

(9) Voltage holding ratio (VHR-2; measured at 80° C.; %): A voltage holding ratio was measured according to procedures identical with the procedures described above except that measurement was carried out at 80° C. in place of 25° C. The thus obtained value was expressed in terms of VHR-2.

(10) Voltage holding ratio (VHR-3; measured at 25° C.; %): Stability to ultraviolet light was evaluated by measuring a voltage holding ratio after a device was irradiated with ultraviolet light. A TN device used for measurement had a polyimide alignment film, and a cell gap was 5 micrometers. A sample was injected into the device, and the device was irradiated with light for 20 minutes. A light source was an ultra high-pressure mercury lamp USH-500D (made by Ushio, Inc., and a distance between the device and the light source was 20 centimeters. In measurement of VHR-3, a decaying voltage was measured for 16.7 milliseconds. A composition having large VHR-3 has large stability to ultraviolet light. A value of VHR-3 is preferably 90% or more, and further preferably 95% or more.

(11) Voltage holding ratio (VHR-4; measured at 25° C.; %): Stability to heat was evaluated by measuring a voltage holding ratio after a TN device into which a sample was injected was heated in a constant-temperature bath at 80° C. for 500 hours. In measurement of VHR-4, a decaying voltage was measured for 16.7 milliseconds. A composition having large VHR-4 has large stability to heat.

(12) Response time ($\tau$; measured at 25° C.; ms): For measurement, an LCD-5100 luminance meter made by Otsuka Electronics Co., Ltd. was used. A light source was a halogen lamp. A low-pass filter was set to 5 kHz. A sample was put in a VA device having no alignment film in which a distance (cell gap) between two glass substrates was 3.5 micrometers. The device was sealed with an ultraviolet-curable adhesive. The device was irradiated with ultraviolet light of 78 mW/cm$^2$ (405 nm) for 449 seconds (35J) while a voltage of 30 V was applied to the device. A multi-metal lamp M04-L41 for ultraviolet curing made by EYE GRAPHICS CO., LTD. was used for irradiation with ultraviolet light. Rectangular waves (120 Hz) were applied to the device. On the occasion, the device was irradiated with light from a direction perpendicular to the device, and an amount of light transmitted through the device was measured. The maximum amount of light corresponds to 100% transmittance, and the minimum amount of light corresponds to 0% transmittance. The maximum voltage of the rectangular wave was set so as to obtain 90% transmittance. The minimum voltage of the rectangular wave was set to 2.5V at 0% transmittance. A response time was expressed in terms of time required for a change from 10% transmittance to 90% transmittance (rise time; millisecond).

(13) Elastic constant (K11: splay elastic constant, K33: bend elastic constant; measured at 25° C.; pN): For measurement, Elastic Constant Measurement System Model EC-1 made by TOYO Corporation was used. A sample was injected into a vertical alignment device in which a distance (cell gap) between two glass substrates was 20 micrometers. An electric charge of 20 V to 0 V was applied to the device, and electrostatic capacity and applied voltage were measured. The measured values of electrostatic capacity (C) and applied voltage (V) were fitted to equation (2.98) and equation (2.101) on page 75 of "Liquid Crystal Device Handbook" (Ekisho Debaisu Handobukku, in Japanese; Nikkan Kogyo Shimbun, Ltd.), and values of elastic constant were obtained from equation (2.100).

(14) Specific resistance ($\rho$; measured at 25° C.; $\Omega$cm): In a vessel equipped with electrodes, 1.0 milliliter of sample was put. A direct current voltage (10 V) was applied to the vessel, and a direct current after 10 seconds was measured. Specific resistance was calculated from the following equation: (specific resistance)={(voltage)×(electric capacity of a vessel)}/{(direct current)×(dielectric constant of vacuum)}.

(15) Pretilt angle (degree): A spectral ellipsometer M-2000U (made by J. A. Woollam Co., Inc.) was used for measurement of a pretilt angle.

(16) Alignment stability (liquid crystal orientation axis stability): A change in a liquid crystal orientation axis on a side of an electrode of a liquid crystal display device was evaluated. A liquid crystal orientation angle ø (before) on the side of the electrode before stress application was measured, and then after rectangular waves (4.5 V, 60 Hz) were applied to the device for 20 minutes, a short circuit was formed for 1 second, and liquid crystal orientation angles ø(after) on the side of the electrode were measured again after 1 second and after 5 minutes, respectively. From the measured values, changes Δø (deg.) in the liquid crystal orientation angles after 1 second and after 5 minutes were calculated, respectively, by using the following equation:

$$\Delta ø \text{ (deg.)} = ø \text{ (after)} - ø \text{ (before)} \qquad \text{(Equation 2)}$$

The above measurement was carried out with reference to J. Hilfiker, B. Johs, C. Herzinger, J. F. Elman, E. Montbach, D. Bryant, and P. J. Bos, Thin Solid Films, 455-456, (2004) 596-600. Smaller Δø can be reasonably referred to as being smaller in a change ratio and better in stability of the liquid crystal orientation axis.

Synthesis Example 1

Compound (1-1) was prepared according to methods described below.

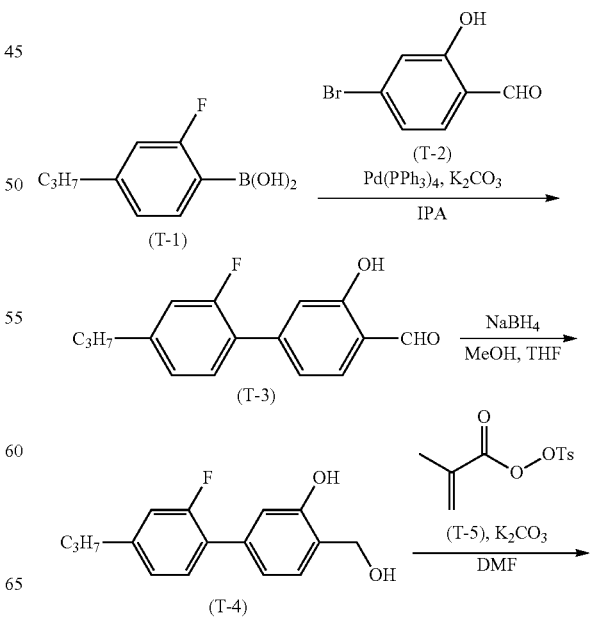

-continued

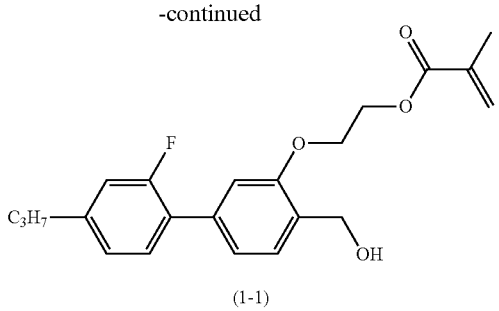

(1-1)

First Step:

Compound (T-1) (4.98 g), compound (T-2) (5.00 g), potassium carbonate (6.88 g), tetrakis(triphenylphosphine) palladium (0.289 g) and isopropyl alcohol (IPA; 100 mL) were put in a reaction vessel, and the resulting mixture was refluxed under heating at 80° C. for 2 hours. The resulting reaction mixture was poured into water, and neutralized by using 1N hydrochloric acid, and then subjected to extraction with ethyl acetate. Combined organic layers were washed with brine, and dried over anhydrous magnesium sulfate. The solution was concentrated under reduced pressure, and the residue was purified by silica gel chromatography (toluene) to obtain compound (T-3) (6.38 g; 99%).

Second Step:

Sodium borohydride (1.88 g) and methanol (90 mL) were put in a reaction vessel, and the resulting mixture was cooled down to 0° C. A THF (40 mL) solution of compound (T-3) (6.38 g) was slowly added dropwise thereto, and stirred for 8 hours while returning to room temperature. The resulting reaction mixture was poured into water, and an aqueous layer was subjected to extraction with ethyl acetate. Combined organic layers were washed with water, and dried over anhydrous magnesium sulfate. The solution was concentrated under reduced pressure, and the residue was purified by silica gel chromatography (toluene:ethyl acetate=3:1 in a volume ratio). The residue was further purified by recrystallization from a mixed solvent of heptane and toluene (a volume ratio, 1:1) to obtain compound (T-4) (5.50 g; 85%).

Third Step:

Compound (T-4) (0.600 g), potassium carbonate (0.637 g) and DMF (6 mL) were put in a reaction vessel, and the resulting mixture was stirred at 80° C. for 1 hour. The resulting reaction mixture was cooled down to room temperature, and then a DMF (6 mL) solution of compound (T-5) (0.983 g) prepared according to the technique described in JP 2013-177561 A was slowly added dropwise, and stirred at 80° C. for 8 hours. The resulting reaction mixture was poured into water, and an aqueous layer was subjected to extraction with toluene. Combined organic layers were washed with water, and dried over anhydrous magnesium sulfate. The solution was concentrated under reduced pressure, and the residue was purified by silica gel chromatography (toluene:ethyl acetate=7:1 in a volume ratio) to obtain compound (1-1) (0.350 g; 40%).

$^1$H-NMR: Chemical shifts δ (ppm; CDCl$_3$): 7.35-7.29 (m, 2H), 7.15-7.10 (m, 1H), 7.07-6.94 (m, 3H), 6.14 (s, 1H), 5.60 (s, 1H), 4.71 (d, 6.6 Hz, 2H), 4.58 (t, J=4.5 Hz, 2H), 4.32 (t, J=4.5 Hz, 2H), 2.65-2.58 (m, 3H), 1.95 (s, 3H), 1.72-1.63 (m, 2H), 0.98 (t, J=7.5 Hz, 3H).

Examples of the composition will be described below. The component compounds were represented using symbols according to definitions in Table 3 described below. In Table 3, the configuration of 1,4-cyclohexylene is trans. A parenthesized number next to a symbolized compound represents a chemical formula to which the compound belongs. A symbol (-) means any other liquid crystal compound. A proportion (percentage) of the liquid crystal compound is expressed in terms of weight percent by weight) based on the weight of the liquid crystal composition containing no additive. Values of characteristics of the composition were summarized in a last part.

TABLE 3

| Method for Description of Compounds using Symbols R—(A$_1$)—Z$_1$— ... —Z$_n$—(A$_n$)—R' | |
|---|---|
| 1) Left-terminal Group R— | Symbol |
| FC$_n$H$_{2n}$— | Fn— |
| C$_n$H$_{2n+1}$— | n- |
| C$_n$H$_{2n+1}$O— | nO— |
| C$_m$H$_{2m+1}$OC$_n$H$_{2n}$— | mOn— |
| CH$_2$=CH— | V— |
| C$_n$H$_{2n+1}$—CH=CH— | nV— |
| CH$_2$=CH—C$_n$H$_{2n}$— | Vn— |
| C$_m$H$_{2m+1}$—CH=CH—C$_n$H$_{2n}$— | mVn— |
| CF$_2$=CH— | VFF— |
| CF$_2$=CH—C$_n$H$_{2n}$— | VFFn— |
| CH$_2$=CH—COO— | AC— |
| CH$_2$=C(CH$_3$)—COO— | MAC— |
| 2) Right-terminal Group —R' | Symbol |
| —C$_n$H$_{2n+1}$ | -n |
| —OC$_n$H$_{2n+1}$ | —On |
| —CH=CH$_2$ | —V |
| —CH=CH—C$_n$H$_{2n+1}$ | —Vn |
| —C$_n$H$_{2n}$—CH=CH$_2$ | —nV |
| —C$_m$H$_{2m}$—CH=CH—C$_n$H$_{2n+1}$ | —mVn |
| —CH=CF$_2$ | —VFF |
| —OCO—CH=CH$_2$ | —AC |
| —OCO—C(CH$_3$)=CH$_2$ | —MAC |
| —F | —F |
| —CN | —C |
| 3) Bonding Group —Z$_n$— | Symbol |
| —C$_n$H$_{2n}$— | n |
| —COO— | E |
| —CH=CH— | V |
| —C≡C— | T |
| —CH=CHO— | VO |
| —OCH=CH— | OV |
| —CH$_2$O— | 1O |
| —OCH$_2$— | O1 |
| 4) Ring —A$_n$— | Symbol |
| (cyclohexane) | H |
| (benzene) | B |
| (fluorobenzene) | B(F) |
| (difluorobenzene) | B(2F) |

TABLE 3-continued

Method for Description of Compounds using Symbols
R—(A$_1$)—Z$_1$— . . . —Z$_n$—(A$_n$)—R'

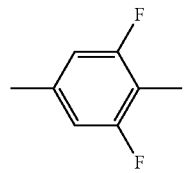 B(F,F)

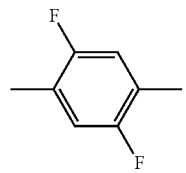 B(2F,5F)

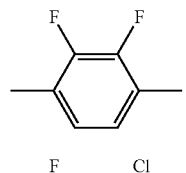 B(2F,3F)

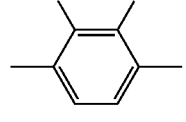 B(2F,3CL)

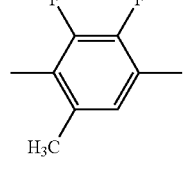 B(2F,3F,6Me)

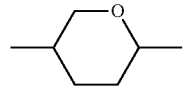 dh

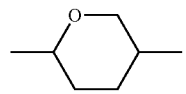 Dh

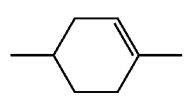 ch

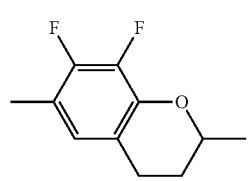 Cro(7F,8F)

5) Examples of Description

Example 1 V-HBB-2

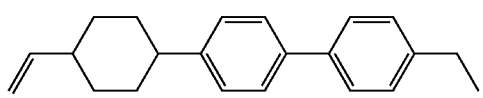

Example 2 3-HHB(2F,3F)—O2

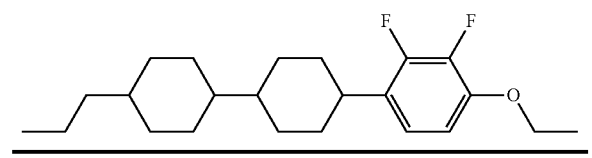

Examples of a Device

1. Raw Material

A composition to which a polar compound was added was injected into a device having no alignment film. After the device was irradiated with ultraviolet light, vertical alignment of liquid crystal molecules in the device was examined. A raw material will be described first. The raw material was appropriately selected from compositions (M1) to (M15), polar compounds (PC-1) to (PC-12) and polymerizable compounds (RM-1) to (RM-9). The composition is as described below.

| Composition M1 | | |
|---|---|---|
| 3-HB(2F,3F)-O2 | (2-1) | 10% |
| 5-HB(2F,3F)-O2 | (2-1) | 7% |
| 2-BB(2F,3F)-O2 | (2-4) | 7% |
| 3-BB(2F,3F)-O2 | (2-4) | 7% |
| 3-B(2F,3F)B(2F,3F)-O2 | (2-5) | 3% |
| 2-HHB(2F,3F)-O2 | (2-6) | 5% |
| 3-HHB(2F,3F)-O2 | (2-6) | 10% |
| 2-HBB(2F,3F)-O2 | (2-10) | 8% |
| 3-HBB(2F,3F)-O2 | (2-10) | 10% |
| 2-HH-3 | (3-1) | 14% |
| 3-HB-O1 | (3-2) | 5% |
| 3-HHB-1 | (3-5) | 3% |
| 3-HHB-O1 | (3-5) | 3% |
| 3-HHB-3 | (3-5) | 4% |
| 2-BB(F)B-3 | (3-8) | 4% |

NI=73.2° C.; Tc<−20° C.; Δn=0.113; Δε=−4.0; Vth=2.18 V; η=22.6 mPa·s.

| Composition M2 | | |
|---|---|---|
| 3-HB(2F,3F)-O4 | (2-1) | 6% |
| 3-H2B(2F,3F)-O2 | (2-2) | 8% |
| 3-H1OB(2F,3F)-O2 | (2-3) | 4% |
| 3-BB(2F,3F)-O2 | (2-4) | 7% |
| 2-HHB(2F,3F)-O2 | (2-6) | 7% |
| 3-HHB(2F,3F)-O2 | (2-6) | 7% |
| 3-HH2B(2F,3F)-O2 | (2-7) | 7% |
| 5-HH2B(2F,3F)-O2 | (2-7) | 4% |
| 2-HBB(2F,3F)-O2 | (2-10) | 5% |
| 3-HBB(2F,3F)-O2 | (2-10) | 5% |
| 4-HBB(2F,3F)-O2 | (2-10) | 6% |
| 2-HH-3 | (3-1) | 12% |
| 1-BB-5 | (3-3) | 12% |
| 3-HHB-1 | (3-5) | 4% |
| 3-HHB-O1 | (3-5) | 3% |
| 3-HBB-2 | (3-6) | 3% |

NI=82.8° C.; Tc<−30° C.; Δn=0.118; Δε=−4.4; Vth=2.13 V; η=22.5 mPa·s.

| Composition M3 | | |
|---|---|---|
| 3-HB(2F,3F)-O2 | (2-1) | 7% |
| 5-HB(2F,3F)-O2 | (2-1) | 7% |
| 3-BB(2F,3F)-O2 | (2-4) | 8% |
| 3-HHB(2F,3F)-O2 | (2-6) | 5% |
| 5-HHB(2F,3F)-O2 | (2-6) | 4% |
| 3-HH1OB(2F,3F)-O2 | (2-8) | 4% |
| 2-BB(2F,3F)B-3 | (2-9) | 5% |
| 2-HBB(2F,3F)-O2 | (2-10) | 3% |
| 3-HBB(2F,3F)-O2 | (2-10) | 8% |
| 4-HBB(2F,3F)-O2 | (2-10) | 5% |
| 5-HBB(2F,3F)-O2 | (2-10) | 8% |
| 3-HH-V | (3-1) | 27% |
| 3-HH-V1 | (3-1) | 6% |
| V-HHB-1 | (3-5) | 3% |

NI=78.1° C.; Tc<−30° C.; Δn=0.107; Δε=−3.2; Vth=2.02 V; η=15.9 mPa·s.

| Composition M4 | | |
|---|---|---|
| 3-HB(2F,3F)-O2 | (2-1) | 10% |
| 5-HB(2F,3F)-O2 | (2-1) | 10% |
| 3-H2B(2F,3F)-O2 | (2-2) | 8% |
| 5-H2B(2F,3F)-O2 | (2-2) | 8% |
| 2-HBB(2F,3F)-O2 | (2-10) | 6% |
| 3-HBB(2F,3F)-O2 | (2-10) | 8% |
| 4-HBB(2F,3F)-O2 | (2-10) | 7% |
| 5-HBB(2F,3F)-O2 | (2-10) | 7% |
| 3-HDhB(2F,3F)-O2 | (2-16) | 5% |
| 3-HH-4 | (3-1) | 14% |
| V-HHB-1 | (3-5) | 10% |
| 3-HBB-2 | (3-6) | 7% |

NI=88.5° C.; Tc<−30° C.; Δn=0.108; Δε=−3.8; Vth=2.25 V; η=24.6 mPa·s; VHR-1=99.1%; VHR-2=98.2%; VHR-3=97.8%.

| Composition M5 | | |
|---|---|---|
| 3-HB(2F,3F)-O2 | (2-1) | 7% |
| 3-HB(2F,3F)-O4 | (2-1) | 8% |
| 3-H2B(2F,3F)-O2 | (2-2) | 8% |
| 3-BB(2F,3F)-O2 | (2-4) | 10% |
| 2-HHB(2F,3F)-O2 | (2-6) | 4% |
| 3-HHB(2F,3F)-O2 | (2-6) | 7% |
| 3-HHB(2F,3F)-1 | (2-6) | 6% |
| 2-HBB(2F,3F)-O2 | (2-10) | 6% |
| 3-HBB(2F,3F)-O2 | (2-10) | 6% |
| 4-HBB(2F,3F)-O2 | (2-10) | 5% |
| 5-HBB(2F,3F)-O2 | (2-10) | 4% |
| 3-HEB(2F,3F)B(2F,3F)-O2 | (2-11) | 3% |
| 3-H1OCro(7F,8F)-5 | (2-14) | 3% |
| 3-HDhB(2F,3F)-O2 | (2-16) | 5% |
| 3-HH-O1 | (3-1) | 5% |
| 1-BB-5 | (3-3) | 4% |
| V-HHB-1 | (3-5) | 4% |
| 5-HB(F)BH-3 | (3-12) | 5% |

NI=81.1° C.; Tc<−30° C.; Δn=0.119; Δε=−4.5; Vth=1.69 V; η=31.4 mPa·s.

| Composition M6 | | |
|---|---|---|
| 3-HB(2F,3F)-O4 | (2-1) | 15% |
| 3-HBB(2F,3F)-O2 | (2-10) | 8% |
| 4-HBB(2F,3F)-O2 | (2-10) | 5% |
| 5-HBB(2F,3F)-O2 | (2-10) | 7% |
| 3-dhBB(2F,3F)-O2 | (2-17) | 5% |
| 3-chB(2F,3F)-O2 | (2-18) | 7% |
| 2-HchB(2F,3F)-O2 | (2-19) | 8% |
| 5-HH-V | (3-1) | 18% |
| 7-HB-1 | (3-2) | 5% |
| V-HHB-1 | (3-5) | 7% |
| V2-HHB-1 | (3-5) | 7% |
| 3-HBB(F)B-3 | (3-13) | 8% |

NI=98.8° C.; Tc<−30° C.; Δn=0.111; Δε=−3.2; Vth=2.47 V; η=23.9 mPa·s.

| Composition M7 | | |
|---|---|---|
| 3-H2B(2F,3F)-O2 | (2-2) | 18% |
| 5-H2B(2F,3F)-O2 | (2-2) | 17% |
| 3-HDhB(2F,3F)-O2 | (2-16) | 5% |
| 3-HHB(2F,3CL)-O2 | (2-12) | 5% |
| 3-HBB(2F,3CL)-O2 | (2-13) | 8% |
| 5-HBB(2F,3CL)-O2 | (2-13) | 7% |
| 3-HH-V | (3-1) | 11% |
| 3-HH-VFF | (3-1) | 7% |
| F3-HH-V | (3-1) | 10% |
| 3-HHEH-3 | (3-4) | 4% |
| 3-HB(F)HH-2 | (3-10) | 4% |
| 3-HHEBH-3 | (3-11) | 4% |

NI=77.5° C.; Tc<−30° C.; Δn=0.084; Δε=−2.6; Vth=2.43 V; η=22.8 mPa·s.

| Composition M8 | | |
|---|---|---|
| 3-HB(2F,3F)-O2 | (2-1) | 8% |
| 3-H2B(2F,3F)-O2 | (2-2) | 10% |
| 3-BB(2F,3F)-O2 | (2-4) | 10% |
| 2O-BB(2F,3F)-O2 | (2-4) | 3% |
| 2-HHB(2F,3F)-O2 | (2-6) | 4% |
| 3-HHB(2F,3F)-O2 | (2-6) | 7% |
| 2-HHB(2F,3F)-1 | (2-6) | 5% |
| 2-BB(2F,3F)B-3 | (2-9) | 6% |
| 2-BB(2F,3F)B-4 | (2-9) | 6% |
| 2-HBB(2F,3F)-O2 | (2-10) | 4% |
| 3-HBB(2F,3F)-O2 | (2-10) | 7% |
| 3-HH1OCro(7F,8F)-5 | (2-15) | 4% |
| 3-HDhB(2F,3F)-O2 | (2-16) | 6% |
| 3-dhBB(2F,3F)-O2 | (2-17) | 4% |
| 3-HH-V | (3-1) | 11% |
| 1-BB-5 | (3-3) | 5% |

NI=70.6° C.; Tc<−20° C.; Δn=0.129; Δε=−4.3; Vth=1.69 V; η=27.0 mPa·s.

| Composition M9 | | |
|---|---|---|
| 3-HB(2F,3F)-O4 | (2-1) | 14% |
| 3-H1OB(2F,3F)-O2 | (2-3) | 3% |
| 3-BB(2F,3F)-O2 | (2-4) | 10% |
| 2-HHB(2F,3F)-O2 | (2-6) | 7% |
| 3-HHB(2F,3F)-O2 | (2-6) | 7% |
| 3-HH1OB(2F,3F)-O2 | (2-8) | 6% |
| 2-HBB(2F,3F)-O2 | (2-10) | 4% |
| 3-HBB(2F,3F)-O2 | (2-10) | 6% |
| 4-HBB(2F,3F)-O2 | (2-10) | 4% |
| 3-HH-V | (3-1) | 14% |
| 1-BB-3 | (3-3) | 3% |
| 3-HHB-1 | (3-5) | 4% |
| 3-HHB-O1 | (3-5) | 4% |
| V-HHB-2 | (3-6) | 4% |
| 1-BB(F)B-2V | (3-8) | 6% |
| 5-HBBH-1O1 | (—) | 4% |

NI=93.0° C.; Tc<−30° C.; Δn=0.123; Δε=−4.0; Vth=2.27 V; η=29.6 mPa·s.

| Composition M10 | | |
|---|---|---|
| 3-HB(2F,3F)-O4 | (2-1) | 6% |
| 3-H2B(2F,3F)-O2 | (2-2) | 8% |
| 3-H1OB(2F,3F)-O2 | (2-3) | 5% |
| 3-BB(2F,3F)-O2 | (2-4) | 10% |
| 2-HHB(2F,3F)-O2 | (2-6) | 7% |
| 3-HHB(2F,3F)-O2 | (2-6) | 7% |
| 5-HHB(2F,3F)-O2 | (2-6) | 7% |
| 2-HBB(2F,3F)-O2 | (2-10) | 4% |
| 3-HBB(2F,3F)-O2 | (2-10) | 7% |
| 5-HBB(2F,3F)-O2 | (2-10) | 6% |
| 3-HH-V | (3-1) | 11% |
| 1-BB-3 | (3-3) | 6% |
| 3-HHB-1 | (3-5) | 4% |
| 3-HHB-O1 | (3-5) | 4% |
| 3-HBB-2 | (3-6) | 4% |
| 3-B(F)BB-2 | (3-7) | 4% |

NI=87.6° C.; Tc<−30° C.; Δn=0.126; Δε=−4.5; Vth=2.21 V; η=25.3 mPa·s.

| Composition M11 | | |
|---|---|---|
| 3-HB(2F,3F)-O4 | (2-1) | 6% |
| 3-H2B(2F,3F)-O2 | (2-2) | 8% |
| 3-H1OB(2F,3F)-O2 | (2-3) | 4% |
| 3-BB(2F,3F)-O2 | (2-4) | 7% |
| 2-HHB(2F,3F)-O2 | (2-6) | 6% |
| 3-HHB(2F,3F)-O2 | (2-6) | 10% |
| 5-HHB(2F,3F)-O2 | (2-6) | 8% |
| 2-HBB(2F,3F)-O2 | (2-10) | 5% |
| 3-HBB(2F,3F)-O2 | (2-10) | 7% |
| 5-HBB(2F,3F)-O2 | (2-10) | 5% |
| 2-HH-3 | (3-1) | 12% |
| 1-BB-3 | (3-3) | 6% |
| 3-HHB-1 | (3-5) | 3% |
| 3-HHB-O1 | (3-5) | 4% |
| 3-HBB-2 | (3-6) | 6% |
| 3-B(F)BB-2 | (3-7) | 3% |

NI=93.0° C.; Tc<−20° C.; Δn=0.124; Δε=−4.5; Vth=2.22 V; η=25.0 mPa·s.

| Composition M12 | | |
|---|---|---|
| 3-HB(2F,3F)-O2 | (2-1) | 7% |
| 5-HB(2F,3F)-O2 | (2-1) | 7% |
| 3-BB(2F,3F)-O2 | (2-4) | 8% |
| 3-HHB(2F,3F)-O2 | (2-6) | 4% |
| 5-HHB(2F,3F)-O2 | (2-6) | 5% |
| 3-HH1OB(2F,3F)-O2 | (2-8) | 5% |
| 2-BB(2F,3F)B-3 | (2-9) | 4% |
| 2-HBB(2F,3F)-O2 | (2-10) | 3% |
| 3-HBB(2F,3F)-O2 | (2-10) | 8% |
| 4-HBB(2F,3F)-O2 | (2-10) | 5% |
| 5-HBB(2F,3F)-O2 | (2-10) | 8% |
| 3-HH-V | (3-1) | 33% |
| V-HHB-1 | (3-5) | 3% |

NI=76.4° C.; Tc<−30° C.; Δn=0.104; Δε=−3.2; Vth=2.06 V; η=15.6 mPa·s.

| Composition M13 | | |
|---|---|---|
| 2-H1OB(2F,3F)-O2 | (2-3) | 6% |
| 3-H1OB(2F,3F)-O2 | (2-3) | 4% |
| 3-BB(2F,3F)-O2 | (2-4) | 3% |
| 2-HH1OB(2F,3F)-O2 | (2-8) | 14% |
| 2-HBB(2F,3F)-O2 | (2-10) | 7% |
| 3-HBB(2F,3F)-O2 | (2-10) | 11% |
| 5-HBB(2F,3F)-O2 | (2-10) | 9% |
| 2-HH-3 | (3-1) | 5% |
| 3-HH-VFF | (3-1) | 30% |
| 1-BB-3 | (3-3) | 5% |
| 3-HHB-1 | (3-5) | 3% |
| 3-HBB-2 | (3-6) | 3% |

NI=78.3° C.; Tc<−20° C.; Δn=0.103; Δε=−3.2; Vth=2.17 V; η=17.7 mPa·s.

| Composition M14 | | |
|---|---|---|
| 3-HB(2F,3F)-O2 | (2-1) | 5% |
| 5-HB(2F,3F)-O2 | (2-1) | 7% |
| 3-BB(2F,3F)-O2 | (2-4) | 8% |
| 3-HHB(2F,3F)-O2 | (2-6) | 5% |
| 5-HHB(2F,3F)-O2 | (2-6) | 4% |
| 3-HH1OB(2F,3F)-O2 | (2-8) | 5% |
| 2-BB(2F,3F)B-3 | (2-9) | 4% |
| 2-HBB(2F,3F)-O2 | (2-10) | 3% |
| 3-HBB(2F,3F)-O2 | (2-10) | 9% |
| 4-HBB(2F,3F)-O2 | (2-10) | 4% |
| 5-HBB(2F,3F)-O2 | (2-10) | 8% |
| 3-HH-V | (3-1) | 27% |
| 3-HH-V1 | (3-1) | 6% |
| V-HHB-1 | (3-5) | 5% |

NI=81.2° C.; Tc<−20° C.; Δn=0.107; Δε=−3.2; Vth=2.11 V; η=15.5 mPa·s.

| Composition M15 | | |
|---|---|---|
| 3-H2B(2F,3F)-O2 | (2-2) | 7% |
| 3-HHB(2F,3F)-O2 | (2-6) | 8% |
| 2-HchB(2F,3F)-O2 | (2-19) | 8% |
| 3-HH1OB(2F,3F)-O2 | (2-8) | 5% |
| 2-BB(2F,3F)B-3 | (2-9) | 7% |
| 2-BB(2F,3F)B-4 | (2-9) | 7% |
| 3-HDhB(2F,3F)-O2 | (2-16) | 3% |
| 5-HDhB(2F,3F)-O2 | (2-16) | 4% |
| 4-HH-V | (3-1) | 15% |
| 3-HH-V1 | (3-1) | 6% |
| 1-HH-2V1 | (3-1) | 6% |
| 3-HH-2V1 | (3-1) | 4% |
| V2-BB-1 | (3-3) | 5% |
| 1V2-BB-1 | (3-3) | 5% |
| 3-HHB-1 | (3-5) | 6% |
| 3-HB(F)BH-3 | (3-12) | 4% |

NI=88.7° C.; Tc<−30° C.; Δn=0.115; Δε=−1.9; Vth=2.82 V; η=17.3 mPa·s.

The first additives include polar compounds (PC-1) to (PC-12).

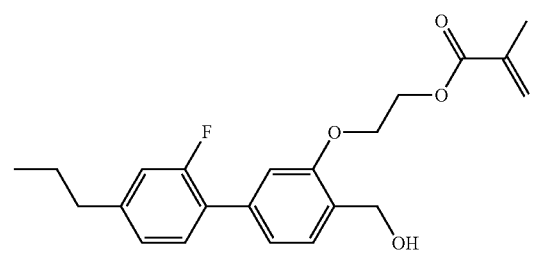

(PC-1)

(PC-2) 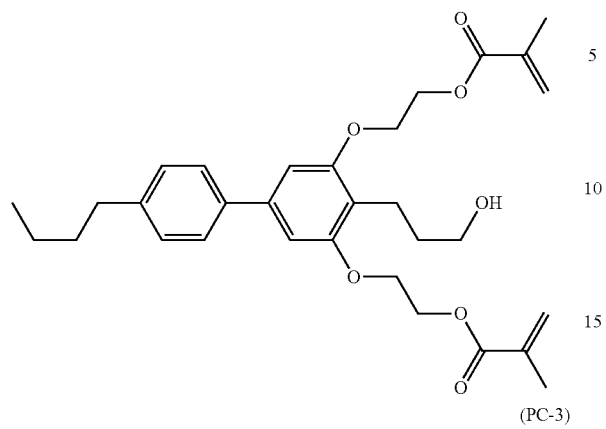
(PC-8) 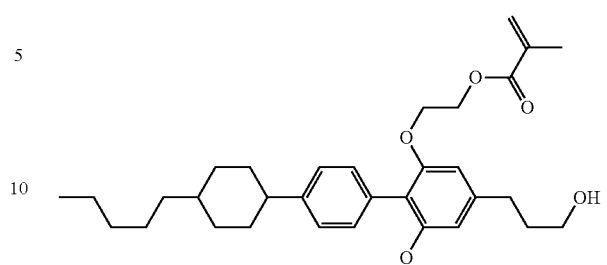
(PC-3)
(PC-9) 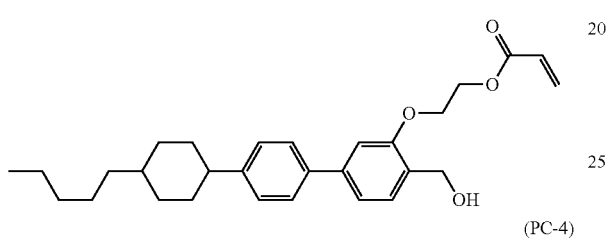
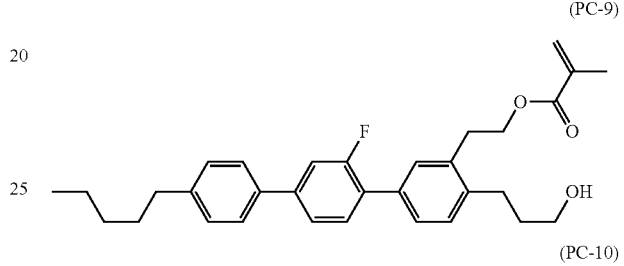
(PC-4)
(PC-10) 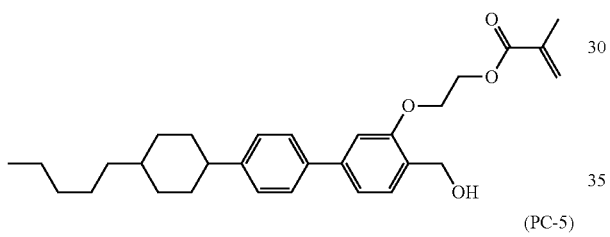
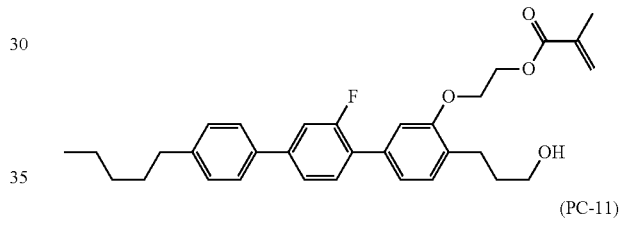
(PC-5)
(PC-11)
(PC-6)
(PC-12) 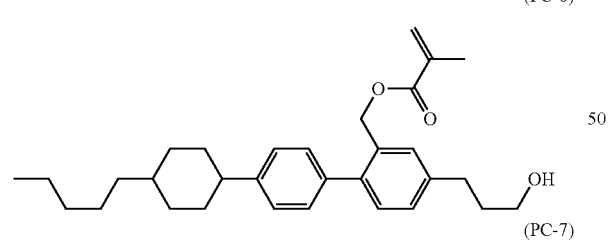
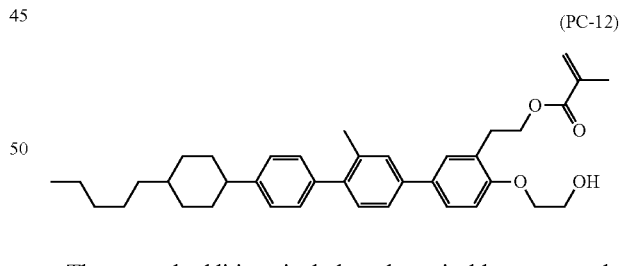
The second additives include polymerizable compounds (RM-1) to (RM-9).
(PC-7) 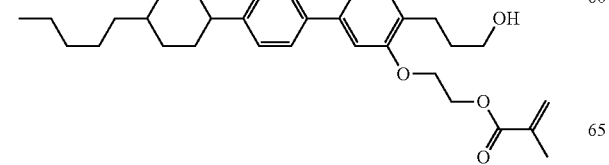
(RM-1) 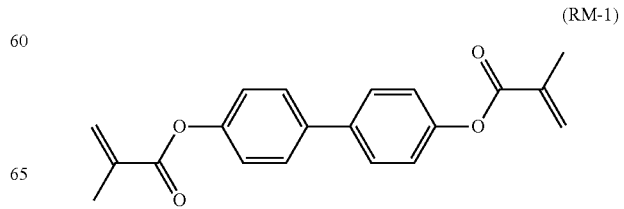

(RM-2)
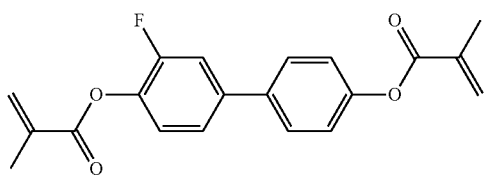

(RM-3)
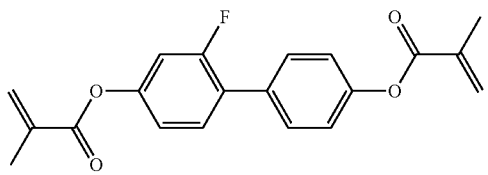

(RM-4)
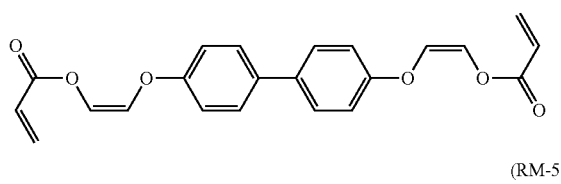

(RM-5)
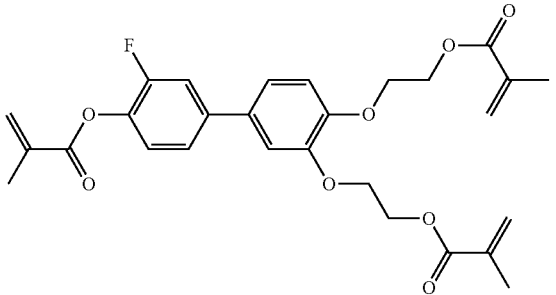

(RM-6)
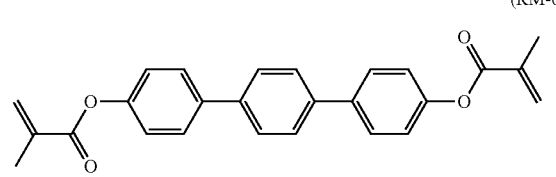

(RM-7)
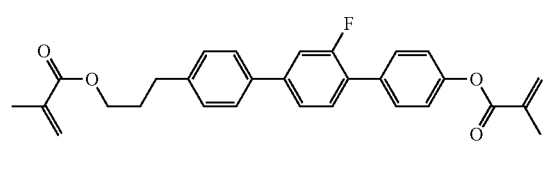

(RM-8)
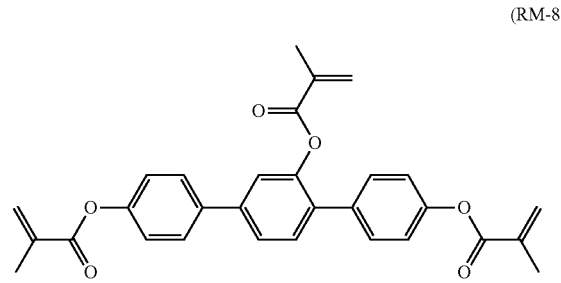

(RM-9)
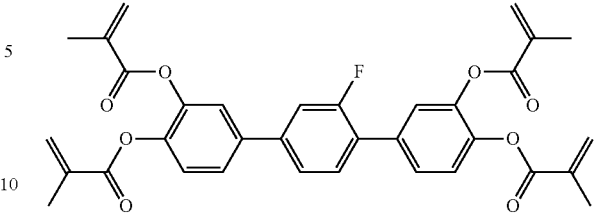

2. Vertical Alignment of Liquid Crystal Molecules

Example 1

Polar compound (PC-1) was added to composition (M1) at a proportion of 5% by weight. The resulting mixture was injected, on a hot stage at 100° C., into a device having no alignment film in which a distance (cell gap) between two glass substrates was 4.0 micrometers. Polar compound (PC-1) was polymerized by irradiating the device with ultraviolet light (28J) using an ultra-high pressure mercury lamp USH-250-BY (made by Ushio, Inc.). The device was set to a polarizing microscope in which a polarizer and an analyzer are arranged perpendicular to each other, and the device is irradiated with light from below and presence or absence of light leakage was observed. When liquid crystal molecules were sufficiently aligned to prevent light from passing through the device, vertical alignment was judged as "good." When light that had passed through the device was observed, the vertical alignment was represented as "poor."

Examples 2 to 25 and Comparative Example 1

A device having no alignment film was prepared by using a mixture of a composition and a polar compound. Presence or absence of light leakage was observed in a manner similar to Example 1. The results were summarized in Table 4. In Example 25, polymerizable compound (RM-1) was also added at a proportion of 0.5% by weight. In Comparative Example 1, polar compound (PC-13) described below was selected for comparison. The compound has no polymerizability, and therefore is different from compound (1).

(PC-13)
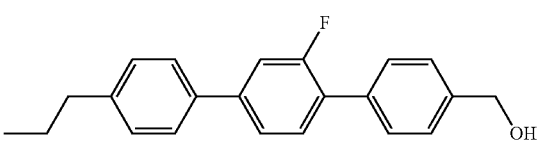

TABLE 4

Vertical alignment of liquid crystal molecules

| Examples | Liquid crystal composition | Polar compound (5% by weight) | Polymerizable compound (0.5% by weight) | Vertical alignment |
|---|---|---|---|---|
| 1 | M1 | PC-1 | — | Good |
| 2 | M2 | PC-2 | — | Good |
| 3 | M3 | PC-3 | — | Good |
| 4 | M4 | PC-4 | — | Good |

TABLE 4-continued

Vertical alignment of liquid crystal molecules

| Examples | Liquid crystal composition | Polar compound (5% by weight) | Polymerizable compound (0.5% by weight) | Vertical alignment |
|---|---|---|---|---|
| 5 | M5 | PC-5 | — | Good |
| 6 | M6 | PC-6 | — | Good |
| 7 | M7 | PC-7 | — | Good |
| 8 | M8 | PC-8 | — | Good |
| 9 | M9 | PC-9 | — | Good |
| 10 | M10 | PC-10 | — | Good |
| 11 | M11 | PC-11 | — | Good |
| 12 | M12 | PC-12 | — | Good |
| 13 | M13 | PC-1 | — | Good |
| 14 | M14 | PC-2 | — | Good |
| 15 | M15 | PC-3 | — | Good |
| 16 | M1 | PC-4 | — | Good |
| 17 | M2 | PC-5 | — | Good |
| 18 | M3 | PC-6 | — | Good |
| 19 | M4 | PC-7 | — | Good |
| 20 | M5 | PC-8 | — | Good |
| 21 | M6 | PC-9 | — | Good |
| 22 | M7 | PC-10 | — | Good |
| 23 | M8 | PC-11 | — | Good |
| 24 | M9 | PC-12 | — | Good |
| 25 | M10 | PC-1 | RM-1 | Good |
| Comparative Example 1 | M1 | PC-13 | — | Poor |

As shown in table 4, in Examples 1 to 24, a kind of the composition or the polar compound was changed, but no light leakage was observed. The above results indicate that the vertical alignment was good even without the alignment film in the device, and the liquid crystal molecules were stably aligned. In Example 25, polymerizable compound (RM-1) was further added, but the same result was obtained. On the other hand, in Comparative Example 1, light leakage was observed. The above result indicates that the vertical alignment was poor.

INDUSTRIAL APPLICABILITY

A liquid crystal composition of the invention can be used in a liquid crystal projector, a liquid crystal television and so forth.

What is claimed is:

1. A liquid crystal composition that has negative dielectric anisotropy, and contains at least one compound selected from the group of polar compounds represented by formula (1) as a first additive:

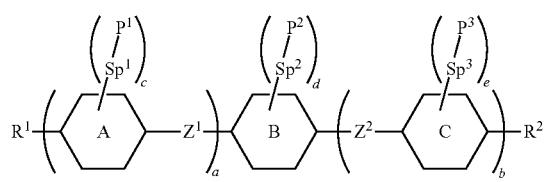

(1)

wherein, in formula (1), $R^1$ is hydrogen, fluorine, chlorine or alkyl having 1 to 25 carbons, and in the alkyl, at least one piece of —$CH_2$— may be replaced by —$NR^0$—, —O—, —S—, —CO—, —CO—O—, —O—CO—, —O—CO—O— or cycloalkylene having 3 to 8 carbons, and at least one tertiary carbon (>CH—) may be replaced by nitrogen (>N—), and in the groups, at least one hydrogen may be replaced by fluorine or chlorine, in which $R^0$ is hydrogen or alkyl having 1 to 12 carbons; $R^2$ is a polar a group having at least one of an oxygen atom having an OH structure, a sulfur atom having an SH structure and a nitrogen atom having a primary, secondary or tertiary amine structure; ring A, ring B and ring C are independently 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine; $Z^1$ and $Z^2$ are independently a single bond or alkylene having 1 to 10 carbons, and in the alkylene, at least one piece of —$CH_2$— may be replaced by —O—, —CO—, —COO— or —OCO—, and at least one piece of —$CH_2$—$CH_2$— may be replaced by —CH=CH—, —C($CH_3$)=CH—, —CH=C($CH_3$)— or —C($CH_3$)=C($CH_3$)—, and in the groups, at least one hydrogen may be replaced by fluorine or chlorine; $P^1$, $P^2$ and $P^3$ are a polymerizable group; $Sp^1$, $Sp^2$ and $Sp^3$ are independently a single bond or alkylene having 1 to 10 carbons, and in the alkylene, at least one piece of —$CH_2$— may be replaced by —O—, —COO—, —OCO— or —OCOO—, and at least one piece of —$CH_2$—$CH_2$— may be replaced by —CH=CH— or —C≡C—, and in the groups, at least one hydrogen may be replaced by fluorine or chlorine; a and b are independently 0, 1, 2, 3 or 4, and a sum of a and b is 0, 1, 2, 3 or 4; and c and e are independently 0, 1, 2, 3 or 4, and d is 1, 2, 3 or 4.

2. The liquid crystal composition according to claim 1, wherein, in formula (1), $R^2$ is a group represented by any one of formula (A1) to formula (A4):

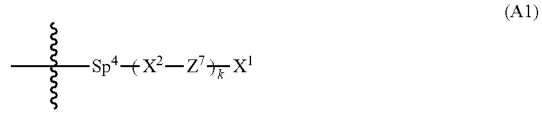

(A1)

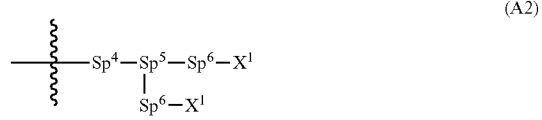

(A2)

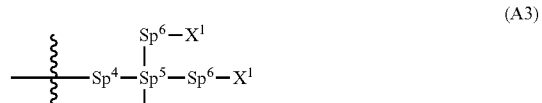

(A3)

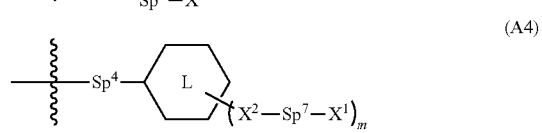

(A4)

wherein, in formula (A1) to formula (A4), $Sp^4$, $Sp^6$ and $Sp^7$ are independently a single bond or a group (-Sp"-X"—), in which Sp" is alkylene having 1 to 20 carbons, and in the alkylene, at least one piece of —$CH_2$— may be replaced by —O—, —S—, —NH—, —N(R⁰)—, —CO—, —CO—O—, —O—CO—, —O—CO—O—, —S—CO—, —CO—S—, —N(R⁰)—CO—O—, —O—CO—N(R⁰)—, —N(R⁰)—CO—N(R⁰)—, —CH=CH— or —C≡C—, and in the groups, at least one hydrogen may be replaced by fluorine, chlorine or —CN, and X" is —O—, —S—, —CO—, —CO—O—, —O—CO—, —O—CO—O—, —CO—N(R⁰)—, —N(R⁰)—CO—, —N(R⁰)—CO—N(R⁰)—, —OCH₂—, —CH₂O—, —SCH₂—, —CH₂S—, —CF₂O—, —OCF₂—, —CF₂S—, —SCF₂—, —CF₂CH₂—, —CH₂CF₂—, —CF₂CF₂—, —CH=N—, —N=CH—, —N=N—, —CH=CR⁰—, —CY²=CY³—, —C≡C—, —CH=CH—CO—O—, —O—CO—CH=CH— or a single bond, in which R⁰ is hydrogen or alkyl having 1 to 12 carbons, and Y² and Y³ are independently hydrogen, fluorine, chlorine or —CN; Sp⁵ is >CH—, >CR¹¹—, >N— or >C<; X¹ is —OH, —OR¹¹, —COOH, —NH₂, —NHR¹¹, —N(R¹¹)₂, —SH or —SR¹¹,

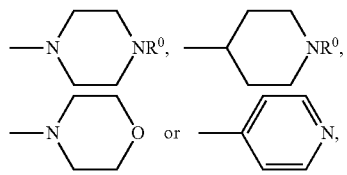

in which R⁰ is hydrogen or alkyl having 1 to 12 carbons; X² is —O—, —CO—, —NH—, —NR¹¹—, —S— or a single bond; Z⁷ is alkylene having 1 to 15 carbons, an alicyclic group having 5 or 6 carbons or a combination thereof, and in the groups, at least one hydrogen may be replaced by —OH, —OR¹¹, —COOH, —NH₂, —NHR¹¹, —N(R¹¹)₂, fluorine or chlorine; R¹¹ is alkyl having 1 to 15 carbons, and in the alkyl, at least one piece of —CH₂— may be replaced by —C≡C—, —CH=CH—, —COO—, —OCO—, —CO— or —O—, and in the groups, at least one hydrogen may be replaced by fluorine or chlorine; ring L is an aromatic group having 6 to 25 carbons or an alicyclic group having 3 to 25 carbons, and the groups may be a condensed ring, and in the groups, one to three hydrogens may be replaced by R^L; R^L is —OH, —(CH₂)ⱼ—OH, fluorine, chlorine, —CN, —NO₂, —NCO, —NCS, —OCN, —SCN, —C(=O)N(R⁰)₂, —C(=O)R⁰, —N(R⁰)₂, —(CH₂)ⱼ—N(R⁰)₂, —SH, —SR⁰, aryl having 6 to 20 carbons, heteroaryl having 6 to 20 carbons, alkyl having 1 to 25 carbons, alkoxy having 1 to 25 carbons, alkylcarbonyl having 2 to 25 carbons, alkoxycarbonyl having 2 to 25 carbons, alkylcarbonyloxy having 2 to 25 carbons or alkoxycarbonyloxy having 2 to 25 carbons, and in the groups, at least one hydrogen may be replaced by fluorine or chlorine, in which R⁰ is hydrogen or alkyl having 1 to 12 carbons, and j is 1, 2, 3 or 4; k is 0, 1, 2 or 3; and m is 2, 3, 4 or 5.

3. The liquid crystal composition according to claim 1, wherein, in formula (1), P¹, P² and P³ are independently a group selected from the group of polymerizable groups represented by formula (P-1) to formula (P-5):

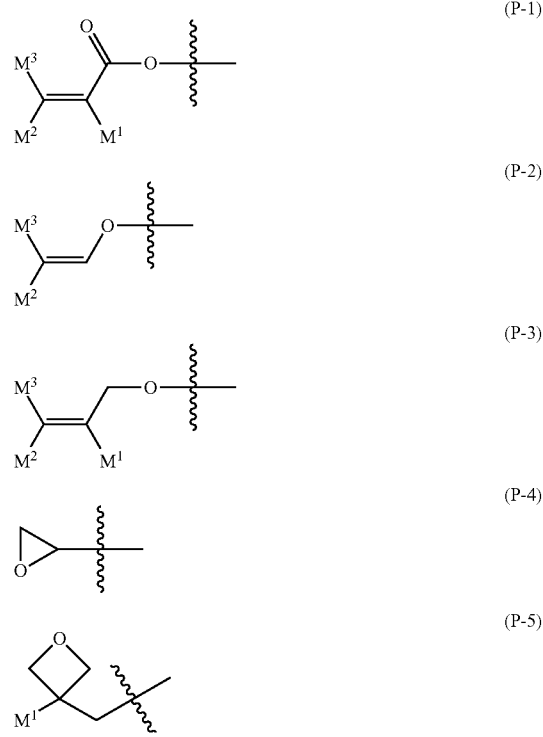

wherein, in formula (P-1) to formula (P-5), M¹, M² and M³ are independently hydrogen, fluorine, alkyl having 1 to 5 carbons, or alkyl having 1 to 5 carbons in which at least one hydrogen is replaced by fluorine or chlorine.

4. The liquid crystal composition according to claim 1, wherein the first additive is at least one compound selected from the group of polar compounds represented by formula (1-1) to formula (1-15):

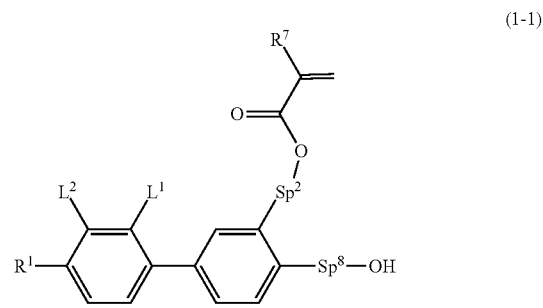

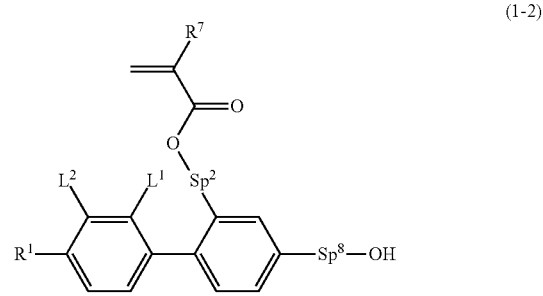

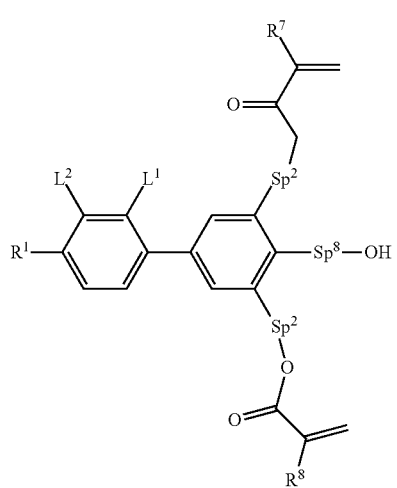 (1-3)
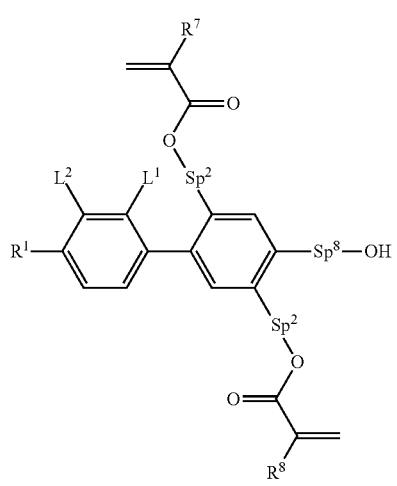 (1-4)
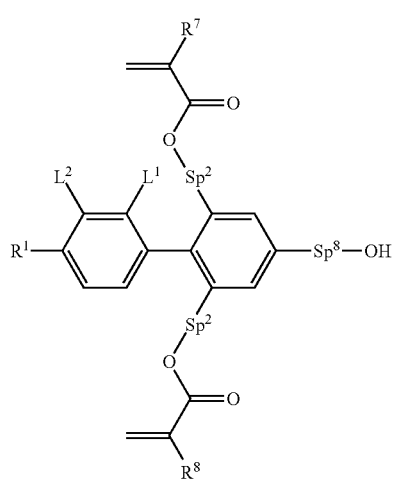 (1-5)
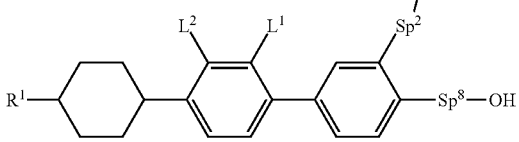 (1-6)
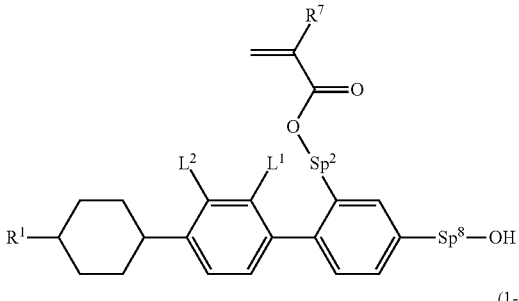 (1-7)
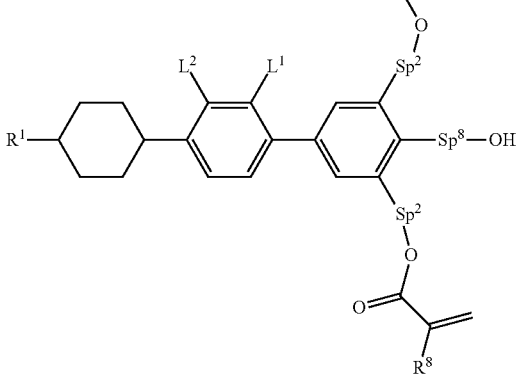 (1-8)
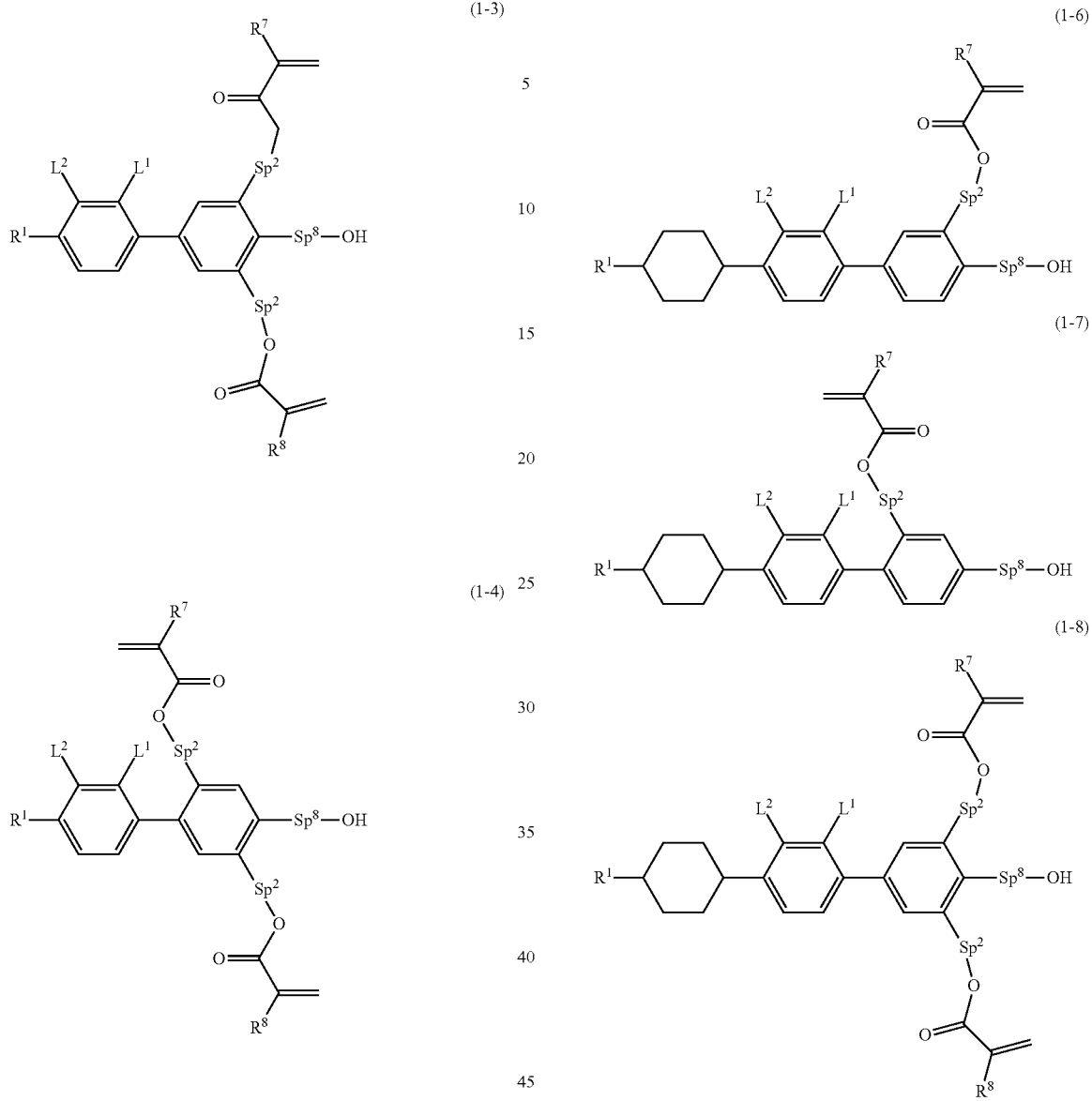 (1-9)

(1-10)
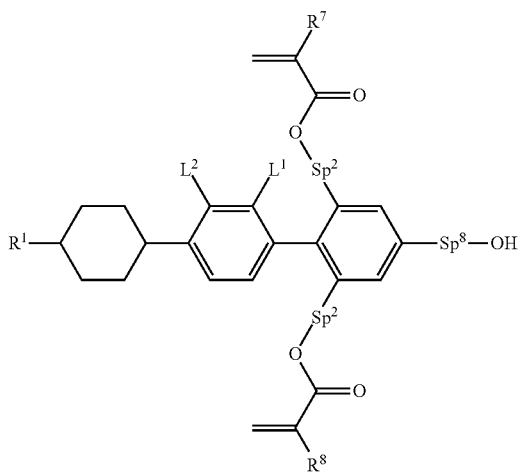

(1-11)
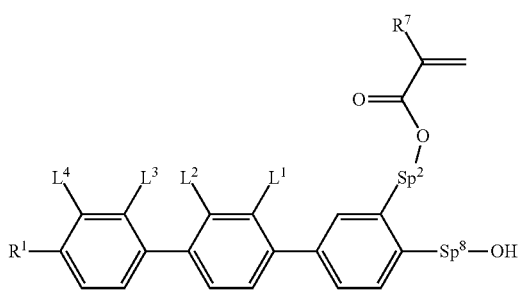

(1-12)
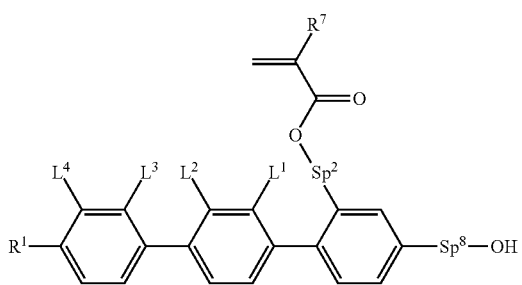

(1-13)
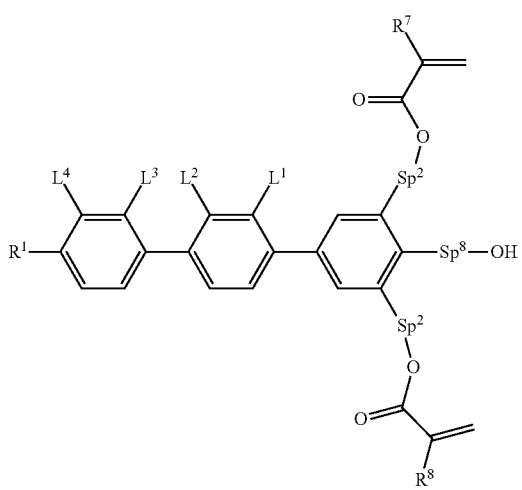

(1-14)
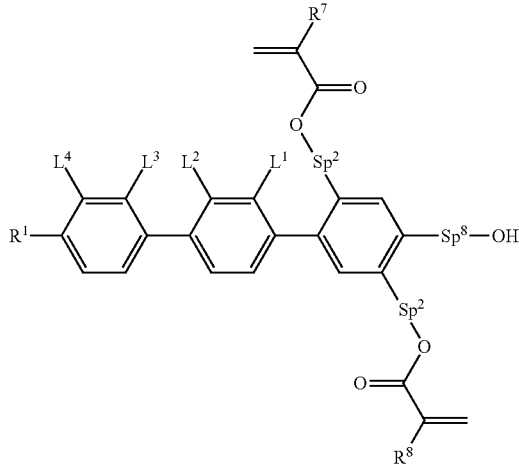

(1-15)
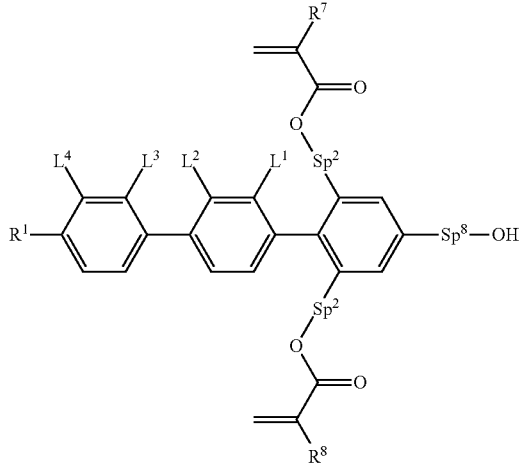

wherein, in formula (1-1) to formula (1-15), R' is hydrogen, fluorine, chlorine or alkyl having 1 to 25 carbons, and in the alkyl, at least one piece of —$CH_2$— may be replaced by —$NR^O$—, —O—, —S—, —CO—, —CO—O—, —O—CO—, —O—CO—O— or cycloalkylene having 3 to 8 carbons, and at least one tertiary carbon (>CH—) may be replaced by nitrogen (>N—), and in the groups, at least one hydrogen may be replaced by fluorine or chlorine, in which $R^O$ is hydrogen or alkyl having 1 to 12 carbons; $Sp^2$ is a single bond or alkylene having 1 to 10 carbons, and in the alkylene, at least one piece of —$CH_2$— may be replaced by —O—, —COO—, —OCO— or —OCOO—, and at least one piece of —$CH_2$—$CH_2$— may be replaced by —CH=CH— or —C≡C—, and in the groups, at least one hydrogen may be replaced by fluorine or chlorine; $Sp^8$ is a single bond, alkylene having 1 to 5 carbons, or alkylene having 1 to 5 carbons in which one piece of —$CH_2$— is replaced by —O—; $L^1$, $L^2$, $L^3$ and $L^4$ are independently hydrogen, fluorine, methyl or ethyl; and $R^7$ and $R^8$ are independently hydrogen or methyl.

5. The liquid crystal composition according to claim 1, wherein a proportion of the first additive is 10% by weight or less based on the weight of the liquid crystal composition.

6. The liquid crystal composition according to claim 1, containing at least one compound selected from the group of compounds represented by formula (2) as a first component:

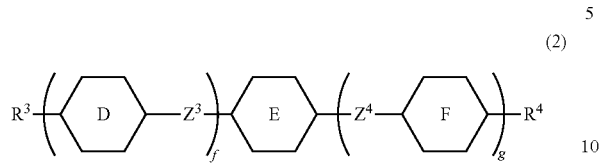
(2)

wherein, in formula (2), $R^3$ and $R^4$ are independently alkyl having 1 to 12 carbons, alkoxy having 1 to 12 carbons, alkenyl having 2 to 12 carbons or alkenyloxy having 2 to 12 carbons; ring D and ring F are independently 1,4-cyclohexylene, 1,4-cyclohexenylene, 1,4-phenylene, 1,4-phenylene in which at least one hydrogen is replaced by fluorine or chlorine or tetrahydropyran-2,5-diyl; ring E is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^3$ and $Z^4$ are independently a single bond, —CH$_2$CH$_2$—, —CH$_2$O—, —OCH$_2$—, —COO— or —OCO—; and f is 1, 2 or 3, g is 0 or 1, and a sum of f and g is 3 or less.

7. The liquid crystal composition according to claim 6, containing at least one compound selected from the group of compounds represented by formula (2-1) to formula (2-21) as the first component:

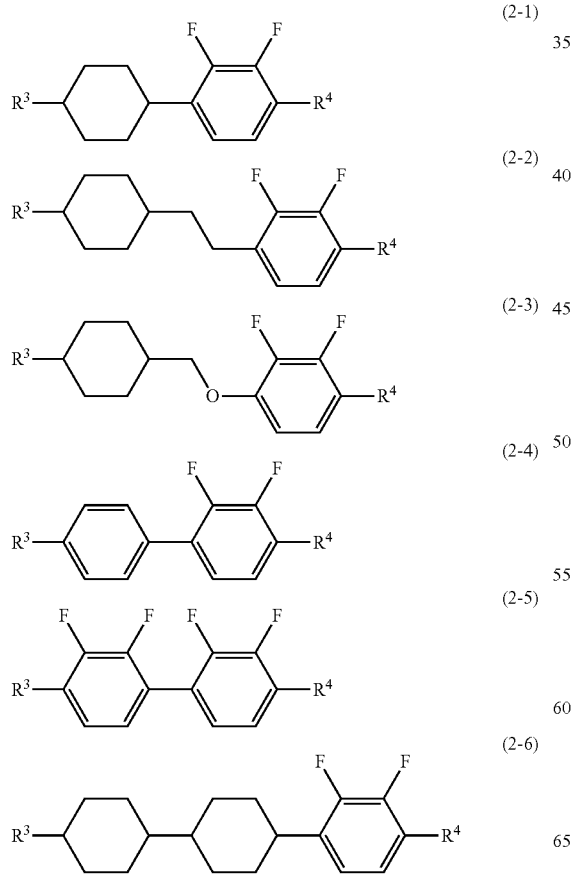

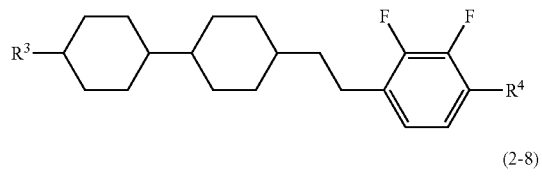
(2-7)

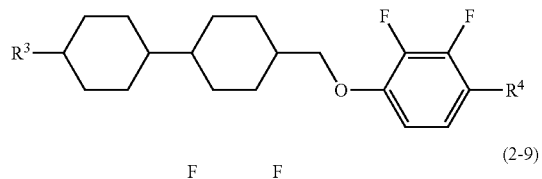
(2-8)

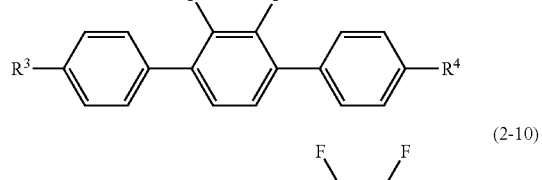
(2-9)

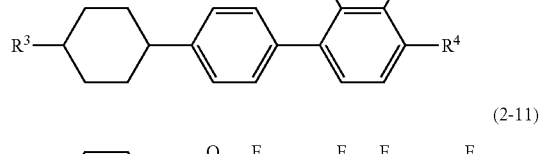
(2-10)

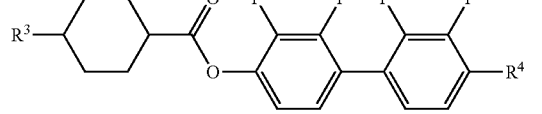
(2-11)

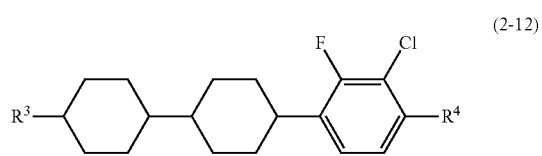
(2-12)

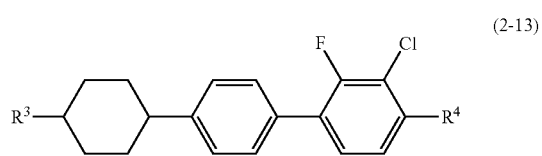
(2-13)

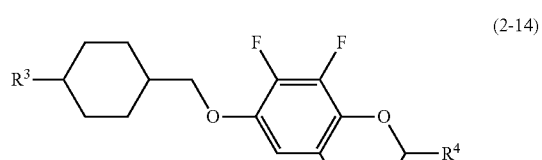
(2-14)

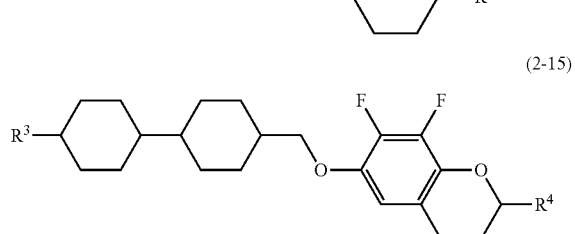
(2-15)

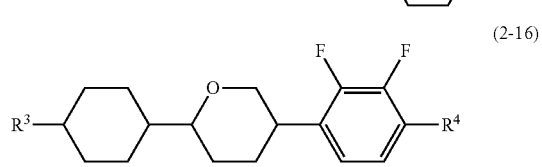
(2-16)

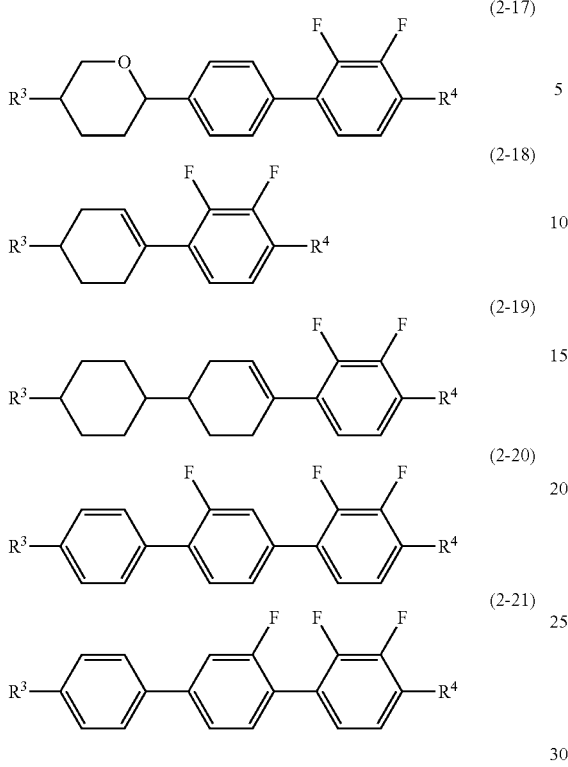

wherein, in formula (2-1) to formula (2-21), $R^3$ and $R^4$ are independently alkyl having 1 to 12 carbons, alkoxy having 1 to 12 carbons, alkenyl having 2 to 12 carbons or alkenyloxy having 2 to 12 carbons.

8. The liquid crystal composition according to claim 6, wherein a proportion of the first component is in the range of 10% by weight to 90% by weight based on the weight of the liquid crystal composition.

9. The liquid crystal composition according to claim 1, containing at least one compound selected from the group of compounds represented by formula (3) as a second component:

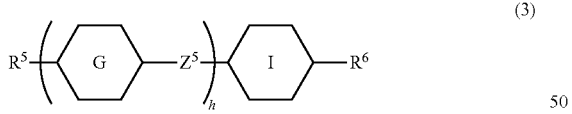

wherein, in formula (3), $R^5$ and $R^6$ are independently alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine; ring G and ring I are independently 1,4-cyclohexylene, 1,4-phenylene, 2-fluoro-1,4-phenylene or 2,5-difluoro-1,4-phenylene; $Z^5$ is a single bond, —CH$_2$CH$_2$—, —CH$_2$O—, —OCH$_2$—, —COO— or —OCO—; and h is 1, 2 or 3.

10. The liquid crystal composition according to claim 9, containing at least one compound selected from the group of compounds represented by formula (3-1) to formula (3-13) as the second component:

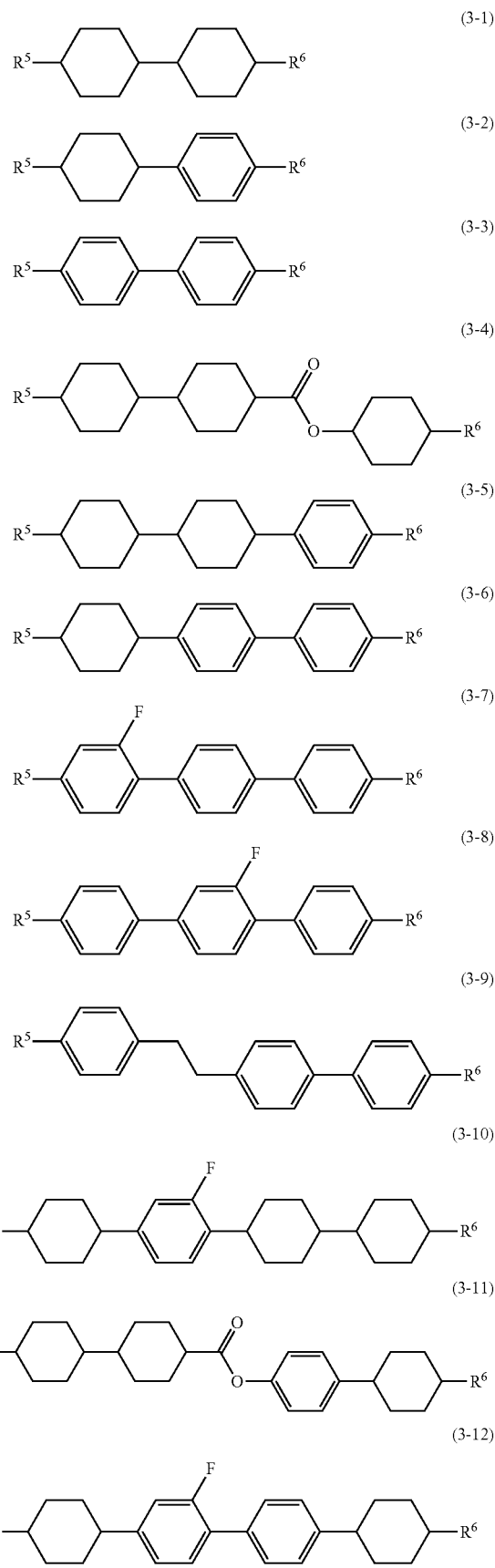

-continued (3-13)

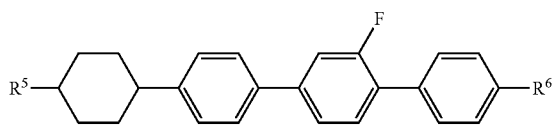

wherein, in formula (3-1) to formula (3-13), $R^5$ and $R^6$ are independently alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine.

11. The liquid crystal composition according to claim 9, wherein a proportion of the second component is in the range of 10% by weight to 70% by weight based on the weight of the liquid crystal composition.

12. The liquid crystal composition according to claim 1, containing at least one compound selected from the group of polymerizable compounds represented by formula (4) as a second additive:

(4)

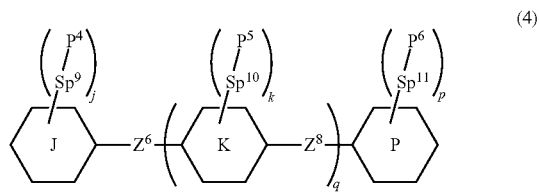

wherein, in formula (4), ring J and ring P are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine; ring K is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine; $Z^6$ and $Z^8$ are independently a single bond or alkylene having 1 to 10 carbons, and in the alkylene, at least one piece of —CH$_2$— may be replaced by —O—, —CO—, —COO— or —OCO—, and at least one piece of —CH$_2$CH$_2$— may be replaced by —CH═CH—, —C(CH$_3$)═CH—, —CH═C(CH$_3$)— or —C(CH$_3$)═C(CH$_3$)—, and in the groups, at least one hydrogen may be replaced by fluorine or chlorine; $P^4$, $P^5$ and $P^6$ are a polymerizable group; $Sp^9$, $Sp^{10}$ and $Sp^{11}$ are independently a single bond or alkylene having 1 to 10 carbons, and in the alkylene, at least one piece of —CH$_2$— may be replaced by —O—, —COO—, —OCO— or —OCOO—, and at least one piece of —CH$_2$CH$_2$— may be replaced by —CH═CH— or —C≡C—, and in the groups, at least one hydrogen may be replaced by fluorine or chlorine; q is 0, 1 or 2; and j, k and p are independently 0, 1, 2, 3 or 4, and a sum of j, k and p is 1 or more.

13. The liquid crystal composition according to claim 12, wherein, in formula (4), $P^4$, $P^5$ and $P^6$ are independently a group selected from the group of polymerizable groups represented by formula (P-1) to formula (P-5):

(P-1)

(P-2)

(P-3)

(P-4)

(P-5)

wherein, in formula (P-1) to formula (P-5), $M^1$, $M^2$ and $M^3$ are independently hydrogen, fluorine, alkyl having 1 to 5 carbons, or alkyl having 1 to 5 carbons in which at least one hydrogen is replaced by fluorine or chlorine.

14. The liquid crystal composition according to claim 12, containing at least one compound selected from the group of polymerizable compounds represented by formula (4-1) to formula (4-28) as the second additive:

(4-1)

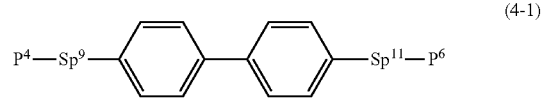

(4-2)

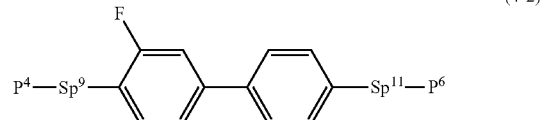

(4-3)

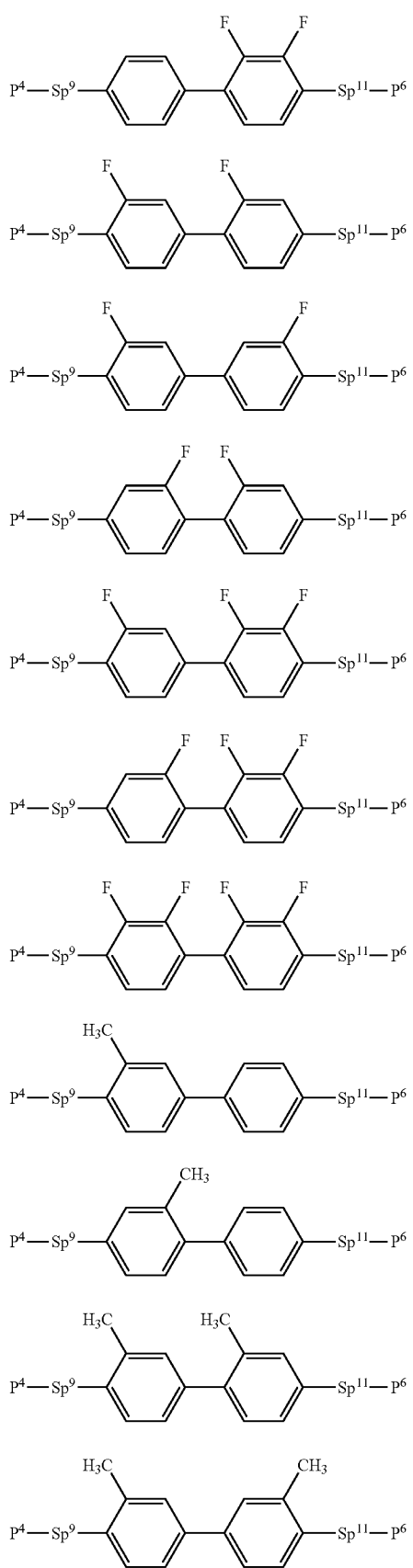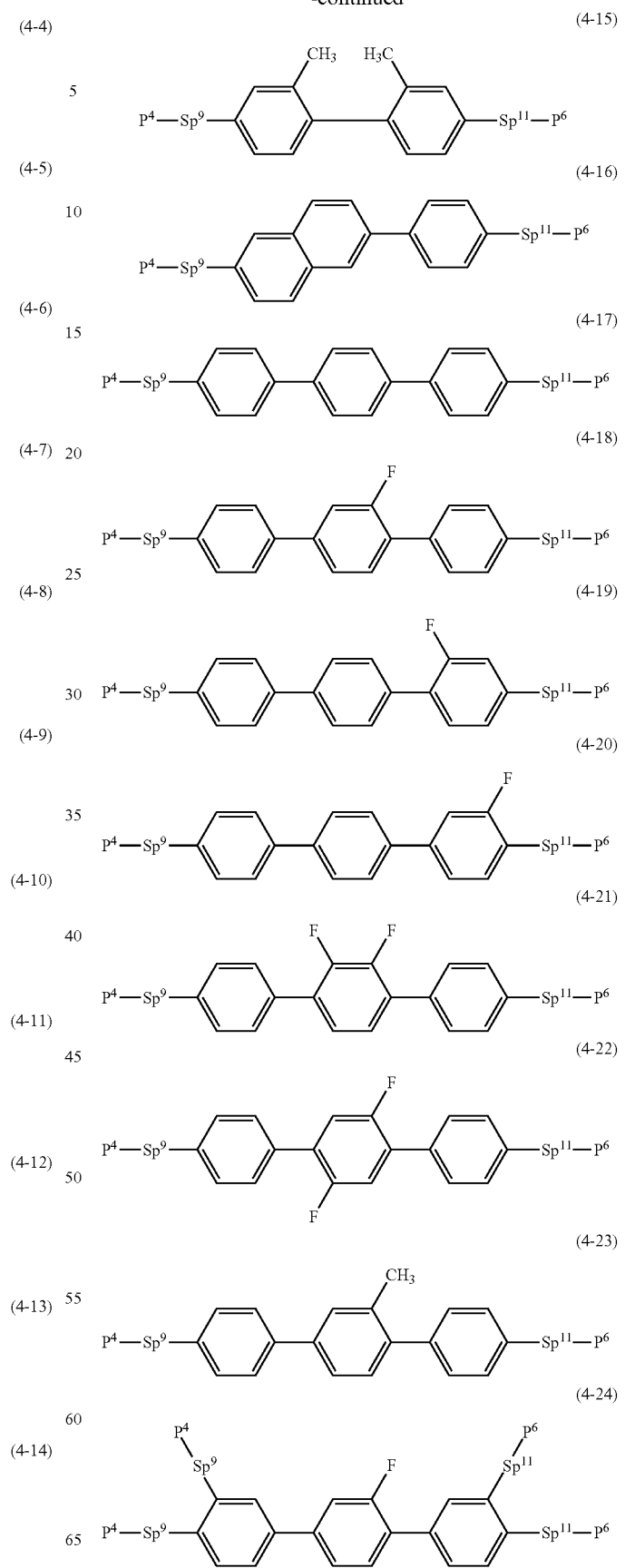

(4-25)

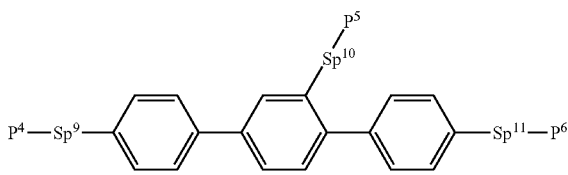

(4-26)

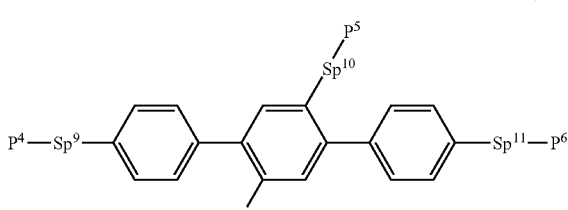

(4-27)

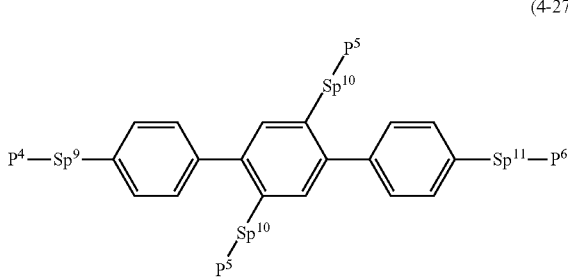

(4-28)

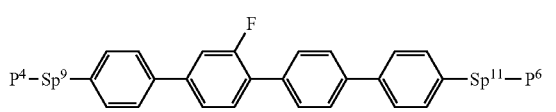

wherein, in formula (4-1) to formula (4-28), $P^4$, $P^5$ and $P^6$ are independently a group selected from the group of polymerizable groups represented by formula (P-1) to formula (P-3), in which $M^1$, $M^2$ and $M^3$ are independently hydrogen, fluorine, alkyl having 1 to 5 carbons, or alkyl having 1 to 5 carbons in which at least one hydrogen is replaced by fluorine or chlorine;

(P-1)

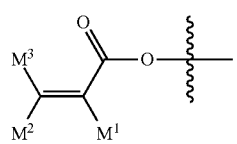

(P-2)

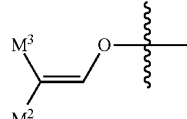

(P-3)

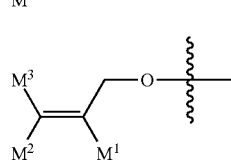

wherein $Sp^9$, $Sp^{10}$ and $Sp^{11}$ are independently a single bond or alkylene having 1 to 10 carbons, and in the alkylene, at least one piece of —$CH_2$— may be replaced by —O—, —COO—, —OCO— or —OCOO—, and at least one piece of —$CH_2CH_2$— may be replaced by —CH=CH— or —C≡C—, and in the groups, at least one hydrogen may be replaced by fluorine or chlorine.

15. The liquid crystal composition according to claim 12, wherein a proportion of the second additive is in the range of 0.03% by weight to 10% by weight based on the weight of the liquid crystal composition.

16. A liquid crystal display device, including the liquid crystal composition according to claim 1.

17. A polymer sustained alignment mode liquid crystal display device, wherein the liquid crystal display device includes the liquid crystal composition according to claim 12, or a polymerizable compound in the liquid crystal composition is polymerized.

18. A liquid crystal display device having no alignment film, wherein the liquid crystal display device includes the liquid crystal composition according to claim 1, or a polymerizable compound in the liquid crystal composition is polymerized.

19. The liquid crystal composition according to claim 6, containing at least one compound selected from the group of compounds represented by formula (3) as a second component:

(3)

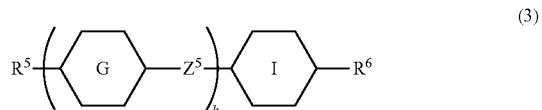

wherein, in formula (3), $R^5$ and $R^6$ are independently alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine; ring G and ring I are independently 1,4-cyclohexylene, 1,4-phenylene, 2-fluoro-1,4-phenylene or 2,5-difluoro-1,4-phenylene; $Z^5$ is a single bond, —$CH_2CH_2$—, —$CH_2O$—, —$OCH_2$—, —COO— or —OCO—; and h is 1, 2 or 3.

20. The liquid crystal composition according to claim 19, containing at least one compound selected from the group of polymerizable compounds represented by formula (4) as a second additive:

(4)

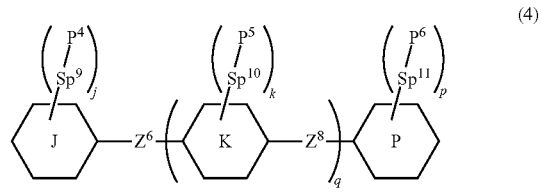

wherein, in formula (4), ring J and ring P are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine;

ring K is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine; $Z^6$ and $Z^8$ are independently a single bond or alkylene having 1 to 10 carbons, and in the alkylene, at least one piece of —$CH_2$— may be replaced by —O—, —CO—, —COO— or —OCO—, and at least one piece of —$CH_2CH_2$— may be replaced by —CHCH—, —$C(CH_3)$=CH—, —CH=$C(CH_3)$— or —$C(CH_3)$=$C(CH_3)$—, and in the groups, at least one hydrogen may be replaced by fluorine or chlorine; $P^4$, $P^5$ and $P^6$ are a polymerizable group; $Sp^9$, $Sp^{10}$ and $Sp^{11}$ are independently a single bond or alkylene having 1 to 10 carbons, and in the alkylene, at least one piece of —$CH_2$— may be replaced by —O—, —COO—, —OCO— or —OCOO—, and at least one piece of —$CH_2CH_2$— may be replaced by —CH=CH— or —C≡C—, and in the groups, at least one hydrogen may be replaced by fluorine or chlorine; q is 0, 1 or 2; and j, k and p are independently 0, 1, 2, 3 or 4, and a sum of j, k and p is 1 or more.

* * * * *